US012553072B2

(12) United States Patent
Zhang et al.

(10) Patent No.: US 12,553,072 B2
(45) Date of Patent: Feb. 17, 2026

(54) D-XYLULOSE 4-EPIMERASE, MUTANTS AND USES THEREOF

(71) Applicant: National Center of Technology Innovation for Synthetic Biology Co., Ltd., Tianjin (CN)

(72) Inventors: Yi-Heng Percival Zhang, Tianjin (CN); Wei Zhou, Tianjin (CN)

(73) Assignee: National Center of Technology Innovation for Synthetic Biology Co., Ltd., Tianjin (CN)

( * ) Notice: Subject to any disclaimer, the term of this patent is extended or adjusted under 35 U.S.C. 154(b) by 849 days.

(21) Appl. No.: 17/790,417

(22) PCT Filed: Dec. 2, 2020

(86) PCT No.: PCT/CN2020/133395

§ 371 (c)(1),
(2) Date: Jan. 19, 2023

(87) PCT Pub. No.: WO2021/135796

PCT Pub. Date: Jul. 8, 2021

(65) Prior Publication Data

US 2023/0220433 A1 Jul. 13, 2023

(30) Foreign Application Priority Data

Dec. 31, 2019 (CN) ......................... 201911404948.2

(51) Int. Cl.
*C12P 19/24* (2006.01)
*C12N 9/90* (2006.01)
*C12P 19/02* (2006.01)

(52) U.S. Cl.
CPC ................ *C12P 19/24* (2013.01); *C12N 9/90* (2013.01); *C12P 19/02* (2013.01); *C12Y 501/03004* (2013.01)

(58) Field of Classification Search
CPC . C12P 19/24; C12P 19/02; C12N 9/90; C12Y 501/03004; C12Y 501/03005
See application file for complete search history.

(56) References Cited

U.S. PATENT DOCUMENTS

| | | | |
|---|---|---|---|
| 6,506,897 B1 | 1/2003 | Antila et al. | |
| 10,544,409 B2 * | 1/2020 | Yang | C12P 19/02 |
| 11,060,119 B2 * | 7/2021 | Zanghellini | C12N 9/90 |
| 2010/0151548 A1 | 6/2010 | Eckhard et al. | |

FOREIGN PATENT DOCUMENTS

| | | |
|---|---|---|
| CN | 101675069 | 3/2010 |
| CN | 105431541 | 3/2016 |
| CN | 108884454 | 11/2016 |
| CN | 106754776 | 5/2017 |
| CN | 108368498 | 8/2018 |
| CN | 109415715 | 3/2019 |
| JP | 2002262899 | 9/2002 |
| KR | 101610911 | 4/2016 |
| WO | WO 2016201110 | 12/2016 |

OTHER PUBLICATIONS

Broun et al., Catalytic plasticity of fatty acid modification enzymes underlying chemical diversity of plant lipids. Science, 1998, vol. 282: 1315-1317. (Year: 1998).*

Devos et al., Practical limits of function prediction. Proteins: Structure, Function, and Genetics. 2000, vol. 41: 98-107. (Year: 2000).*

Seffernick et al., Melamine deaminase and Atrazine chlorohydrolase: 98 percent identical but functionally different. J. Bacteriol., 2001, vol. 183 (8): 2405-2410. (Year: 2001).*

Whisstock et al., Prediction of protein function from protein sequence. Q. Rev. Biophysics., 2003, vol. 36 (3): 307-340. (Year: 2003).*

Witkowski et al., Conversion of b-ketoacyl synthase to a Malonyl Decarboxylase by replacement of the active cysteine with glutamine. Biochemistry, 1999, vol. 38: 11643-11650. (Year: 1999).*

Beerens et al., "Enzymes for the biocatalytic production of rare sugars," J. Ind. Microbiol. Biotechnol., Feb. 2012, 39(6):823-834.

Bhosale et al., "Molecular and Industrial Aspects of Glucose Isomerase," Microbiological Reviews, Jun. 1996, 60(2):280-300, 21 pages.

Extended European Search Report in European Appln No. EP20909683, dated May 15, 2023, 8 pages.

Geneseq Accession No. BCQ11595, "Rhodothermus marinus derived protein, SEQ: 1," Jun. 16, 2016, 1 page.

Geneseq Accession No. BFA16968, "Thermotoga neapolitana hexuronate C4-epimerase mutant #63," Mar. 22, 2018, 1 page.

Geneseq Accession No. BGB27161, "Thermotoga petrophila hexuronate C4-epimerase S125D," Mar. 21, 2019, 1 page.

Izumori et al. "Induction of d-Ribose Isomerase by 1-Ribose in *Mycobacterium smegmatis*," Agric. Biol. Chem., Jan. 1980, 44(1):223-225.

Izumori et al., "Pentose metabolism in *Mycobacterium smegmetis*: comparison of L-arabinose isomerase induced by L-arabinose and D-galactose," J. Bacteriol., Jan. 1978, 133(1):413-414.

Kim et al., "Highly efficient RNA-guided genome editing in human cells via delivery of purified Cas9 ribonucleoproteins," Genome Research, Apr. 2014, 24(6):1012-1019.

(Continued)

*Primary Examiner* — Ganapathirama Raghu
(74) *Attorney, Agent, or Firm* — Fish & Richardson P.C.

(57) ABSTRACT

The present disclosure relates to D-xylulose 4-epimerase, mutants thereof, and uses thereof. Specifically, the present disclosure relates to a polypeptide having D-xylulose 4-epimerase activity, a method for preparing said polypeptide, and use of said polypeptide in the preparation of L-pentose using D-xylose or D-xylulose as a raw material. Compared with the traditional preparation method in the prior art, the new method for preparing L-pentose discovered in the present disclosure has simpler production process and reduces the cost of producing L-pentose.

18 Claims, 9 Drawing Sheets

Specification includes a Sequence Listing.

(56) References Cited

OTHER PUBLICATIONS

Morimoto et al., "Relationships between lipolysis induced by various lipolytic agents and hormone-sensitive lipase in rat fat cells," Journal of Lipid Research, Jan. 2001, 42(1):120-127.
Mortlock, "[102] d-Arabinose isomerase," Methods in Enzymology, Carbohydrate Metabolism, 1966, 9:583-585.
Park et al., Characterization of a recombinant thermostable L-rhamnose isomerase from Thermotoga maritima ATCC 43589 and its application in the production of L-lyxose and L-mannose, Biotechnol. Lett., Sep. 2010, 32(12):1947-1953.
Rodionova et al., "Tagaturonate-fructuronate epimerase UxaE, a novel enzyme in the hexuronate catabolic network in Thermotoga maritima," Environmental Microbiology, Jul. 2012, 14(11):2920-2934.
Uechi et al., "Gene cloning and characterization of L-ribulose 3-epimerase from Mesorhizobium loti and its application to rare sugar production," Biosci. Biotechnol. Biochem., Mar. 2013, 77(3):511-515.
Uniprot Accession No. Q9WYS1, "Tagaturonate/fructuronate epimerase," Apr. 22, 2020, 2 pages.
Wu et al., "Complete Oxidation of Xylose for Bioelectricity Generation by Reconstructing a Bacterial Xylose Utilization Pathway in vitro," ChemCatChem, Jan. 2018, 10(9):2030-2035.
You et al., "Simple Cloning: direct transformation of PCR product (DNA multimer) to *Escherichia coli* and Bacillus subtilis," Appl. Environ. Microbiol., Mar. 2012, 78(5):1593-1595.
GenBank Accession No. CP011108.1, "Thermotoga maritima strain Tma100, complete genome," Aug. 25, 2020, 2 pages.
GenBank Accession No. WP_004081526.1, "D-tagaturonate epimerase UxaE [Thermotoga maritima]," Jul. 10, 2019, 1 page.
International Search Report in International Appln. No. PCT/CN2020/133395, dated Mar. 9, 2021, 12 pages (with English Translation).
Kim, "In Vitro Synthetic Biology Platform and Protein Engineering for Biorefinery," Dissertation for the degree of Doctor of Philosophy, Virginia Polytechnic Institute and State University, Department of Biological Systems Engineering, May 2017, 149 pages.
Office Action in Chinese Appln. No. 201911404948.2, dated Jun. 6, 2022, 13 pages (with English Translation).

* cited by examiner

SEQUENCE LISTING

```
<160> NUMBER OF SEQ ID NOS: 128

<210> SEQ ID NO 1
<211> LENGTH: 1446
<212> TYPE: DNA
<213> ORGANISM: Thermotoga maritima MSB8

<400> SEQUENCE: 1

atggtcttga aagtgttcaa agaccacttt ggaaggggat acgaagttta cgaaaagtct      60

tatagagaaa aggattctct ttctttcttc ttgacaaagg aagaggaagg aaaaattctg     120

gtggtggctg gagaaaaggc acctgaaggt ctgtcgtttt tcaaaaaaca gcgggcggag     180

ggtgtttcgt tctttttctg tgagagaaat catgagaact tggaagttct cagaaaatac     240

tttccagatc tcaaaccagt tcgagcggga ttgagagcgt cttttggaac aggtgacaga     300

ctcggtatca ccacaccggc tcacgtgagg gcgttgaagg attcagggct ttttcccatc     360

tttgcgcagc agtcggtgag ggagaacgag agaacgggaa ggacctggag agatgtgctg     420

gacgatgcca catggggagt tttccaggag ggatacagtg agggattcgg agcggatgca     480

gaccatgtga agcggccgga ggatcttgtt tcggctgcaa gggaaggttt caccatgttc     540

acaatcgatc cttcggatca tgtgaggaat ctttcaaaac ttacagaaaa ggaaagaaat     600

gagaaattcg aagagattct gagaaaggaa aggatcgaca ggatctatct cggtaagaaa     660

tactctgttc tcggtgagaa gatcgaattc gatgagaaga atctcagaga tgcggcgctc     720

gtgtattacg atgcgattgc ccacgtggat atgatgtatc aaattttgaa agacgaaacc     780

ccggatttcg acttcgaagt gtcagttgac gaaacagaaa ctcctacgag tcctctcttc     840

cacattttcg ttgtggaaga actcagacga agaggtgtgg agttcaccaa tcttgccctg     900

agattcatcg gcgaatggga aaagggaata gattacaagg gggatcttgc acagttcgag     960

agagaaatca aaatgcacgc agaaatcgca aggatgttcg aaggatacaa aatatcactc    1020
```

```
cactctggaa gcgacaaatt ttccgtgtat cctgcttttg cttccgcgac aggaggcctt   1080

ttccacgtga agacagccgg aacgagttat cttgaggcgg tgaaggtcat atccatggtc   1140

aacccggagc tcttccggga gatctacagg tgtactctcg atcactttga ggaagacaga   1200

aagtcctatc acatatctgc ggatctgtcg aaagttccgg aagtagagaa agtgaaagat   1260

gaagatcttc caggtctttt tgaagacatc aacgtgagac agttgatcca cgtcacctac   1320

ggctctgttc tgaaagatgc atctttgaaa gaacggctat ttaagacgct tgaacaaaac   1380

gaggaactct tttacgaaac tgtggcaaaa catataaaaa ggcacgtgga tctgctggag   1440

gggtga                                                              1446
```

<210> SEQ ID NO 2
<211> LENGTH: 481
<212> TYPE: PRT
<213> ORGANISM: Thermotoga maritima MSB8

<400> SEQUENCE: 2

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285
```

```
Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 3
<211> LENGTH: 481
<212> TYPE: PRT
<213> ORGANISM: Thermotoga neapolitana

<400> SEQUENCE: 3

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Gly Glu Glu Gly Lys Ile Leu Val Val Ala Gly Glu Lys Ala Pro
        35                  40                  45

Glu Gly Leu Ser Phe Phe Lys Lys Gln Arg Val Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175
```

```
Phe Thr Met Phe Thr Ile Asp Pro Ser Asp His Val Arg Asn Leu Ser
            180                 185                 190

Lys Leu Ser Glu Arg Glu Lys Asn Glu Met Phe Glu Glu Ile Leu Lys
        195                 200                 205

Lys Glu Arg Ile Asp Arg Ile Tyr Leu Gly Lys Lys Tyr Thr Val Leu
    210                 215                 220

Gly Glu Arg Leu Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Ala Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Lys
465                 470                 475                 480

Gly


<210> SEQ ID NO 4
<211> LENGTH: 482
<212> TYPE: PRT
<213> ORGANISM: Thermotoga sp. SG1

<400> SEQUENCE: 4

Met Ser Leu Lys Val Phe Lys Asp His Phe Gly Arg Gly Tyr Glu Val
1               5                   10                  15

Tyr Glu Gly Ser Tyr Arg Glu Lys Glu Gly Phe Ser Phe Phe Leu Val
            20                  25                  30

Lys Gly Glu Glu Gly Lys Val Leu Val Ile Ser Gly Glu Lys Val Pro
        35                  40                  45

Glu Gly Ala Ser Phe Phe Lys Lys His His Val Asp Glu Lys Thr Phe
    50                  55                  60
```

```
Phe Phe Cys Glu Lys Ser His Glu Asn Leu Glu Ile Leu Arg Lys His
65                  70                  75                  80

Phe Pro Asp Leu Lys Pro Thr Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Arg Gly Ser Gly Leu Phe Pro Val Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Thr Glu Gly Phe Gly Ala Asp Ala
145                 150                 155                 160

Asp His Val Lys Asn Pro Glu Asp Leu Val Ala Ala Ala Lys Glu Gly
                165                 170                 175

Phe Ser Met Phe Thr Ile Asp Pro Ser Asp His Val Arg Asn Leu Ser
            180                 185                 190

Lys Leu Ser Glu Arg Glu Lys Asn Glu Met Phe Glu Glu Ile Leu Lys
        195                 200                 205

Lys Glu Arg Ile Asp Arg Ile Tyr Leu Gly Lys Arg Tyr Thr Ile Leu
    210                 215                 220

Gly Glu Arg Leu Glu Phe Asp Glu Lys Ser Leu Arg Asp Ala Ala Leu
225                 230                 235                 240

Val Tyr Tyr Asp Ala Ile Thr His Val Asp Met Met Tyr Gln Ile Leu
                245                 250                 255

Lys Glu Glu Ile Ser Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Gly Leu Phe Glu
305                 310                 315                 320

Lys Glu Ile Lys Met His Ala Glu Ile Ser Arg Met Phe Glu Gly Tyr
                325                 330                 335

Lys Leu Ser Leu His Ser Gly Ser Asp Lys Phe Ser Val Tyr Pro Ala
            340                 345                 350

Phe Ser Ser Ala Thr Asp Gly Leu Phe His Val Lys Thr Ala Gly Thr
        355                 360                 365

Ser Tyr Leu Glu Ala Ile Lys Val Ile Ser Met Val Ser Pro Ala Leu
    370                 375                 380

Phe Arg Glu Ile Tyr Arg Cys Ala Leu Glu His Phe Glu Glu Asp Arg
385                 390                 395                 400

Lys Ser Tyr His Ile Ser Ala Asp Leu Ser Lys Val Pro Asp Val Glu
                405                 410                 415

Lys Val Glu Asp Glu Asp Leu Pro Ala Leu Phe Glu Asp Thr Asn Val
            420                 425                 430

Arg Gln Leu Ile His Val Thr Tyr Gly Ser Val Leu Lys Asp Lys Ser
        435                 440                 445

Leu Lys Glu Arg Ile Phe Glu Ala Leu Asp Arg Asn Glu Lys Leu Phe
    450                 455                 460

Tyr Glu Thr Val Glu Ser His Ile Lys Arg His Val Asp Leu Leu Arg
465                 470                 475                 480

Gly Asp
```

<210> SEQ ID NO 5
<211> LENGTH: 490
<212> TYPE: PRT
<213> ORGANISM: Thermotoga caldifontis

<400> SEQUENCE: 5

```
Met Ser Asp Phe Leu Gln Arg Phe Glu Arg Leu Thr Gln Phe Arg Met
1               5                   10                  15

Lys Pro Tyr Ala Ser Ser Val Arg Lys Thr Arg Asp Ala Thr Phe Phe
            20                  25                  30

Leu Val Arg Asp Asp Arg Ser Lys Tyr Leu Val Val Ile Gly Lys Arg
        35                  40                  45

Gly Ile Cys Glu Arg Phe Glu Gly Gln Lys Ile Gly Glu Ile Glu Gln
    50                  55                  60

Asp Asp Val Leu Leu Cys Pro Met Asn Asn Lys Asn Cys Glu Thr Leu
65                  70                  75                  80

Thr Glu Phe Leu Pro Ser Leu Lys Pro Ala Thr Cys Thr Met Lys Leu
                85                  90                  95

Ser Phe Gly Phe Gly Asp Arg Leu Gly Val Ala Thr Ala Ala His Ala
            100                 105                 110

Gln Cys Val Asn Lys Glu Lys Cys Phe Pro Val Phe Ala Gln Gln Ser
        115                 120                 125

Val Arg Glu Ile Thr Arg Thr Glu Arg Thr Trp Ser Asp Val Leu Tyr
    130                 135                 140

Ser Ala Ile Trp Gly Val Phe Glu Ser Gly Tyr Asp Gly Leu Phe Gly
145                 150                 155                 160

Ala Asp Ala Asp His Val Lys Lys Ile Glu Asp Leu Glu Lys Ala Ala
                165                 170                 175

Arg Val Gly Tyr Thr Met Phe Thr Ile Asp Pro Ser Asp His Ile Lys
            180                 185                 190

Asp Pro Ala Lys Phe Asp Arg Arg Glu Leu Ala Arg Phe Tyr Glu Glu
        195                 200                 205

His Pro Leu Arg Arg Ala Ile Glu Thr Arg Tyr Val Gly Lys Ser Phe
    210                 215                 220

Thr Ile Leu Gly Glu Arg Leu Thr Phe Asp Glu Glu Glu Phe Ala Glu
225                 230                 235                 240

Leu Phe Val Thr Tyr Ile Asp Ala Ile Asp His Val Glu Glu Cys Tyr
                245                 250                 255

Lys Ala Leu Arg Ala Thr Ile Gly Gly Ser Phe Asp Leu Glu Val Ser
            260                 265                 270

Ile Asp Glu Thr Ser Leu Pro Thr Thr Pro Leu Ala His Ile Phe Phe
        275                 280                 285

Val Gln Glu Leu Val Arg Arg Gly Val Glu Phe Gln Thr Leu Ala Leu
    290                 295                 300

Arg Phe Pro Gly Glu Trp Gln Lys Gly Ile Asp Tyr Ile Gly Asp Ile
305                 310                 315                 320

Asp Leu Phe Ala Glu Glu Leu Asp Lys His Val Ala Ile Val Lys Met
                325                 330                 335

Phe Thr Gly Tyr Lys Leu Ser Leu His Ser Gly Ser Asp Lys Phe Ser
            340                 345                 350

Val Tyr Pro Ile Leu Ala Glu Lys Thr Glu Gly Thr Val His Val Lys
        355                 360                 365

Thr Ala Gly Thr Ser Tyr Leu Glu Ala Ile Arg Val Val Ala Lys Phe
```

```
    370                 375                 380

Ala Pro Asp Leu Tyr Arg Glu Ile His Lys Phe Ala Leu Ser Arg Phe
385                 390                 395                 400

Glu Gln Asp Arg Ala Ser Tyr His Val Thr Thr Asp Leu Ser Lys Ile
                405                 410                 415

Pro Asp Val Asp Ser Leu Ser Asp Asp Glu Leu Val His Leu Leu Asp
            420                 425                 430

Gln Pro Asp Ser Arg Gln Leu Ile His Ile Thr Tyr Gly Ser Val Leu
        435                 440                 445

Thr Ala Lys Lys Asp Gly Lys Ser Leu Phe Lys Glu Arg Ile Met Lys
    450                 455                 460

Val Leu Phe Glu His Glu Thr Asp His Tyr Ala Phe Leu Arg Thr His
465                 470                 475                 480

Leu Gly Lys His Leu Lys Leu Leu Gly Val
                485                 490


<210> SEQ ID NO 6
<211> LENGTH: 489
<212> TYPE: PRT
<213> ORGANISM: Pseudothermotoga lettingae

<400> SEQUENCE: 6

Met Ala Glu Asn Ile Val Glu Lys Phe Glu Lys Leu Phe Lys Gly Lys
1               5                   10                  15

Tyr Lys Ile Tyr Tyr Ser Ser Ile Arg Lys Leu Glu Lys Ser Phe Phe
            20                  25                  30

Phe Met Ile Arg Asp Gln Lys Gln Lys Tyr Leu Ile Ser Ile Ala Lys
        35                  40                  45

Lys Arg Ile Cys Glu Lys Phe Glu Gly Lys Lys Ile Gly Arg Ile Asn
    50                  55                  60

Asp Leu Asp Ile Leu Met Cys Pro Thr Asn Asp Tyr Asn Cys Lys Val
65                  70                  75                  80

Ile Arg Thr Leu Phe Asn Ile Asn Pro Ser Val Cys Lys Lys Asn Thr
                85                  90                  95

Ser Phe Gly Phe Gly Asp Arg Leu Gly Leu Ala Thr Pro Ala His Thr
            100                 105                 110

Thr Leu Ile Asn Lys Tyr Asp Val Phe Pro Val Leu Ala Gln Gln Ser
        115                 120                 125

Val Arg Glu Leu Ser Arg Thr His Arg Asn Phe Lys Asp Val Leu Asp
    130                 135                 140

Ser Ala Ile Trp Gly Ile Phe Glu Ser Gly Tyr Glu Gly Glu Phe Gly
145                 150                 155                 160

Ala Asp Ala Asp His Val Lys Asp Ile Asn Asp Leu Met Gln Ala Ala
                165                 170                 175

Tyr Glu Gly Tyr Ser Met Tyr Thr Val Asp Pro Ser Asp His Val Lys
            180                 185                 190

Asn Ile Asp Lys Ile Asn Gln Gly Glu Leu Val Glu Phe Tyr Lys Ser
        195                 200                 205

His Pro Leu Arg Lys Glu Ile Glu Met Ile Tyr Ser Gly Lys Val Phe
    210                 215                 220

Ser Phe Glu Lys Ser Lys Phe Thr Met Glu Asp Lys Glu Leu Phe Arg
225                 230                 235                 240

Ile Phe Val Thr Tyr Val Asp Ala Ile Glu His Val Val Lys Cys Tyr
                245                 250                 255
```

```
Glu Ala Ile Lys Asn Thr Lys Lys Asn Phe Asp Phe Glu Val Ser Ile
            260                 265                 270

Asp Glu Thr Ser Ile Pro Thr Ser Pro Leu Ala His Ile Phe Ile Val
        275                 280                 285

His Glu Leu Arg Arg Arg Gly Val Asp Phe Gln Thr Leu Ala Leu Arg
    290                 295                 300

Phe Val Gly Gln Trp Gln Lys Ala Ile Asp Tyr Ile Gly Asp Leu Ser
305                 310                 315                 320

Val Leu Glu Ser Glu Leu Ser Met His Cys Glu Ile Val Lys Ser Leu
                325                 330                 335

Ser Gly Tyr Arg Leu Ser Leu His Ser Gly Ser Asp Lys Phe Ser Val
            340                 345                 350

Tyr Arg Ile Phe Thr His Tyr Cys Asp Gly Lys Leu His Val Lys Thr
        355                 360                 365

Ala Gly Thr Ser Tyr Leu Glu Ala Ile Arg Thr Val Ala Glu Ala Ser
    370                 375                 380

Pro Ser Leu Tyr Arg Asn Ile His Lys Tyr Ala Leu Thr Cys Phe Glu
385                 390                 395                 400

Lys Asp Asn Thr Ser Tyr His Val Thr Ala Asp Ile Asn Lys Ile Pro
                405                 410                 415

Asp Val Asp Asn Val Glu Asp Ser Lys Val Val Asn Leu Leu Asp Ile
            420                 425                 430

Pro Glu Val Arg Gln Leu Ile His Ile Thr Tyr Gly Ser Val Leu Thr
        435                 440                 445

Glu Lys Ile Asn Gly Lys Tyr Leu Phe Arg Asp Glu Ile Tyr Arg Ile
    450                 455                 460

Leu His Glu Asn Glu Phe Leu His Tyr Lys Arg Ile Arg Asp His Leu
465                 470                 475                 480

Gly Lys His Leu Glu Leu Leu Lys Asn
                485
```

<210> SEQ ID NO 7
<211> LENGTH: 507
<212> TYPE: PRT
<213> ORGANISM: Halanaerobium congolense

<400> SEQUENCE: 7

```
Met Ser Trp Lys Asp Phe Ala Glu Glu Leu Val Gly Thr Ser Lys Glu
1               5                   10                  15

Ala Val Met Lys Val Ala Glu Tyr Ala Glu Asp Tyr Arg Ile Tyr Pro
            20                  25                  30

Arg Ser Ile Ile Lys Lys Asp Lys Ser Phe Tyr Phe Leu Ala Lys Ile
        35                  40                  45

Asp Gln Lys Lys Lys Leu Val Ile Leu Asn Lys Ser Lys Asn Phe Glu
    50                  55                  60

Leu Phe Gln Gly Arg Ile Glu Glu Leu Ala Gly Phe Lys Ala Lys Ile
65                  70                  75                  80

Gly Pro Leu Ser His Tyr Asn Ala Glu Ile Leu Arg Glu Val Phe Pro
                85                  90                  95

Phe Thr Ala Pro Ser Ala Leu Gly Asn Lys Lys Pro Ser Ile Gly Leu
            100                 105                 110

Gly Asp Arg Leu Gly Ile Ala Thr Pro Gly His Ile Glu Ala Val Lys
        115                 120                 125

Glu Ser Ala Ala Met Pro Val Phe Ala Gln Gln Ser Val Arg Glu Leu
    130                 135                 140
```

```
Asn Leu Thr Gly Arg Thr Phe Lys Ser Val Leu Asp Asp Val Ser Trp
145                 150                 155                 160

Ala Val Phe Gln Glu Gly Tyr Gln Ala Gly Phe Ala Ala Asp Ala Asp
                165                 170                 175

His Leu Lys Glu Lys Pro Asp Ile Lys Glu Ala Leu Asp Leu Gly Tyr
            180                 185                 190

Thr Met Leu Thr Leu Asp Cys Thr Asp Tyr Ile Asn Asp Asp Leu Asp
        195                 200                 205

Gln Met Ser Glu Ser Glu Ile Glu Asn Ala Tyr Ala Glu Val Pro Asp
    210                 215                 220

Tyr Leu Arg Glu Gly Leu Glu Asn Gln Tyr Leu Asn Lys Thr Phe Val
225                 230                 235                 240

Leu Asn Ser Gly Tyr Gln Leu Glu Tyr Asn Gln Asp Asn Phe Lys Glu
                245                 250                 255

Ile Val Leu Ile Tyr Tyr Lys Met Leu Asp Phe Ala Lys Glu Ile Gln
            260                 265                 270

His Leu Ile Lys Thr Ser Ala Arg Asn Val Asp Phe Glu Ile Ser Ile
        275                 280                 285

Asp Glu Thr Ser Thr Pro Thr Thr Pro Glu Ala His Phe Phe Val Ala
    290                 295                 300

Asn Glu Leu Lys Arg Asn Asn Ile Glu Val Asn Ser Leu Ala Pro Arg
305                 310                 315                 320

Phe Val Gly Glu Phe Gln Lys Gly Ile Asp Tyr Ile Gly Asp Leu Glu
                325                 330                 335

Gln Phe Glu Lys Glu Phe Lys Val His Ala Asp Ile Ala Asp Arg Phe
            340                 345                 350

Gly Tyr Lys Leu Ser Ile His Ser Gly Ser Asp Lys Phe Ser Val Phe
        355                 360                 365

Pro Ile Ile Gly Arg His Thr Gln Gly Arg Val His Val Lys Thr Ala
    370                 375                 380

Gly Thr Asn Trp Leu Glu Ala Ile Arg Val Val Ala Glu Asn Asn Pro
385                 390                 395                 400

Ser Leu Tyr Arg Asp Ile His Ala Tyr Ala Leu Lys Lys Phe Glu Ala
                405                 410                 415

Ala Lys Glu Tyr Tyr His Val Thr Thr Asp Leu Asp Lys Val Pro Glu
            420                 425                 430

Leu Ala Arg Met Ser Asp Gln Glu Leu Gly Glu Leu Leu Glu Ile Asn
        435                 440                 445

Glu Val Arg Gln Leu Leu His Ile Thr Tyr Gly Phe Ile Leu Gln Asp
    450                 455                 460

Lys Lys Asp Gly Arg Tyr Ile Phe Arg Asp Lys Leu Tyr Lys Phe Trp
465                 470                 475                 480

Asp Glu Tyr Asp Lys Glu Tyr Arg Arg Ala Leu Glu Arg His Ile Gly
                485                 490                 495

Arg His Leu Asn Lys Leu Gly Phe Tyr Lys Asn
            500                 505


<210> SEQ ID NO 8
<211> LENGTH: 514
<212> TYPE: PRT
<213> ORGANISM: Thermosediminibacter litoriperuensis

<400> SEQUENCE: 8

Met Ser Asn Gly Trp Glu Glu Phe Cys Lys Lys Val Val Ser Gly Asp
```

-continued

```
1               5                   10                  15

Phe Thr Leu Thr Glu Leu Lys Arg Glu Ala Glu Phe His Phe Asn Thr
            20                  25                  30

Tyr Lys Val Tyr Pro Glu Ser Ile Asn Val Leu Ala Gly Cys Thr Leu
        35                  40                  45

Phe Met Ala Arg Val Asn Asp Gln Lys Lys Leu Val Ile Ile Lys Asp
    50                  55                  60

Glu Pro Ser Arg Ile Phe Asp Asp Phe Thr Gly Glu Lys Ile Phe Ala
65                  70                  75                  80

Leu Asn Gly Lys Glu Ile Lys Val Ala Ser Leu Asn His Asp Asn Ala
                85                  90                  95

Ile Val Leu Arg Arg Trp Phe Pro Phe Thr Ala Pro Val Thr Phe Gly
            100                 105                 110

Lys Glu Gly Met Ser Ile Gly Leu Gly Asp Arg Leu Gly Ile Ala Ser
        115                 120                 125

Pro Gly His Leu Arg Leu Ile Arg Asn Thr Lys Val Arg Pro Val Leu
    130                 135                 140

Ala Gln Gln Ser Val Arg Glu Leu Asn Leu Thr Gly Arg Thr Tyr Glu
145                 150                 155                 160

Asp Val Leu Asp Ala Ala Ser Trp Ala Val Phe Gln Glu Gly Tyr Arg
                165                 170                 175

Ser Gly Phe Ser Ala Asp Gly Asp His Leu Lys Thr Glu Ser Glu Val
            180                 185                 190

Lys Met Val Leu Asp Leu Gly Phe Thr Met Ile Thr Leu Asp Cys Ser
        195                 200                 205

Glu Lys Ile Asn Asn Thr Ala Thr Phe Met Pro Lys Asp Gln Ile Glu
    210                 215                 220

Thr Glu Tyr Gln Lys Leu Pro Gly Glu Tyr Arg Lys Ala Leu Glu Val
225                 230                 235                 240

Ser Tyr Leu Gly Lys Glu Phe Ser Leu Arg Asp Leu Val Ile Thr Phe
                245                 250                 255

Asp Lys Glu Ser Leu Gln Lys Ile Ala Val Val Tyr Gly Glu Ala Leu
            260                 265                 270

Thr Phe Ile Lys His Ile Tyr Leu Asn Val Ile Arg Pro Ala Gly Lys
        275                 280                 285

Lys Val Asp Phe Glu Val Ser Ile Asp Glu Thr Ile Thr Pro Thr Thr
    290                 295                 300

Pro Gln Ala His Phe Phe Val Ala Ser Glu Leu Glu Lys Met Gly Val
305                 310                 315                 320

Glu Val Thr Ser Leu Ala Pro Arg Phe Cys Gly Glu Phe Gln Lys Gly
                325                 330                 335

Ile Asp Tyr Ile Gly Asp Leu Glu Gln Phe Glu Arg Glu Phe Lys Ile
            340                 345                 350

His Ala Ala Ile Ala Asp Tyr Phe Gly Tyr Arg Leu Ser Ile His Ser
        355                 360                 365

Gly Ser Asp Lys Phe Lys Val Phe Pro Ile Ile Gly Arg Tyr Thr Gly
    370                 375                 380

Gly Arg Val His Val Lys Thr Ala Gly Thr Asn Trp Leu Glu Ala Leu
385                 390                 395                 400

Lys Val Ile Ala Arg Lys Glu Pro Glu Leu Phe Arg Glu Ile Tyr Lys
                405                 410                 415

Phe Ala Val Ser His Phe Asn Glu Ala Lys Lys Tyr Tyr His Val Thr
            420                 425                 430
```

```
Ala Asp Trp Thr Thr Val Pro Asp Val Ser Lys Met Thr Asp Glu Asp
        435                 440                 445

Leu Pro Gln Val Leu Gly Gln Asn Asp Val Arg Gln Val Leu His Ile
    450                 455                 460

Thr Tyr Gly Leu Ile Leu Thr Ser Lys Asp Glu Lys Gly Lys Tyr Leu
465                 470                 475                 480

Phe Arg Asp Ala Ile Tyr Asn Ile Leu Asn Ser His Glu Glu Asp Tyr
                485                 490                 495

Tyr Lys Val Leu Gly Glu His Leu Glu Lys His Leu Ser Leu Leu Gly
            500                 505                 510

Ala Arg


<210> SEQ ID NO 9
<211> LENGTH: 519
<212> TYPE: PRT
<213> ORGANISM: Rhodothermus marinus

<400> SEQUENCE: 9

Met Val Thr Val Leu Gln Thr Leu Leu Gln Arg Pro Arg Pro Leu Ala
1               5                   10                  15

Glu Ile Asp Arg Ala Ala Leu Ala Arg Phe Leu Thr Asp Leu Ile Arg
            20                  25                  30

Gln Gln Val Tyr Pro Ala Ser Leu Glu Pro Thr Ser Glu Gly Val Phe
        35                  40                  45

Phe Leu Ala Arg Asp Gly Arg Glu Lys Arg Leu Gly Ile Leu Ser Glu
    50                  55                  60

Ala Gly Leu His Asp Phe Glu Gly Ala Arg His Gln Leu Ser Leu Asp
65                  70                  75                  80

Gly Arg Thr Leu Ile Phe Gln Ser Cys Pro Leu Thr Ala Ala Asn Ala
                85                  90                  95

Arg Ala Leu Arg Gln His Leu Ala Trp Thr Ala Pro Arg Pro Leu Gly
            100                 105                 110

Leu Arg Ala Ser Val Gly Cys Gly Asp Arg Leu Gly Leu Ala Thr Pro
        115                 120                 125

Gly His Val Arg Ala Val Arg Lys His Lys Leu Ala Pro Val Phe Ala
    130                 135                 140

Gln Gln Ser Ile Arg Glu Met Thr Arg Thr Gly Arg Thr Pro Gln Gln
145                 150                 155                 160

Val Leu Asp Glu Ala Met Trp Gly Val Phe Gln Glu Gly Trp Arg Gln
                165                 170                 175

Gly Tyr Gly Ala Asp Ala Asp His Leu Lys Thr Glu Glu Asp Ala Asp
            180                 185                 190

Arg Cys Ile Glu Ala Gly Phe Thr Phe Phe Thr Ile Asp Pro Ser Ala
        195                 200                 205

Tyr Val Asp Asn Glu Val Asp Thr Ala Asp Ala Ala Thr Leu Glu Ala
    210                 215                 220

Lys Val Ala Ala Leu Pro Trp Asp Ala Leu Glu Thr Thr Leu Ala Asp
225                 230                 235                 240

Leu Arg Arg Ala Tyr Leu Gly Gln His Phe Gln Val Gly Pro Tyr Glu
                245                 250                 255

Leu Ser Phe Glu Glu Arg Thr Leu Leu Gln Ala Leu Ala Lys Tyr Gly
            260                 265                 270

Gly Ala Ile Ala His Thr Ala Arg Val Tyr Arg His Ile Ala Gly Arg
        275                 280                 285
```

```
Met Gly Asn Arg Pro Phe Glu Leu Glu Met Ser Val Asp Glu Thr Glu
    290                 295                 300

Val Pro Thr Ser Pro Ala Glu His Phe Phe Val Ala Arg Glu Leu Gln
305                 310                 315                 320

Arg Leu Gly Val Arg Trp Ile Ser Leu Ala Pro Arg Phe Val Gly Arg
                325                 330                 335

Leu Glu Lys Gly Val Asp Tyr Ile Gly Asp Leu Glu Glu Phe Glu Ala
            340                 345                 350

His Leu Lys Leu His Val Ala Ile Ala Arg Thr Leu Gly Pro Tyr Lys
        355                 360                 365

Leu Ser Leu His Ser Gly Ser Asp Lys Phe Ala Leu Tyr Pro Leu Phe
    370                 375                 380

Ala Arg His Ala Gly Glu Leu Phe His Leu Lys Thr Ala Gly Thr Ser
385                 390                 395                 400

Tyr Leu Glu Ala Leu Arg Ala Val Ala Glu Leu Asp Pro Pro Leu Phe
                405                 410                 415

Arg Glu Ile Leu Asp Phe Ala Arg Asp Arg Tyr Glu Thr Asp Arg Ala
            420                 425                 430

Thr Tyr His Val Ser Ala Leu Leu Glu Arg Val Pro Lys Ala Ser Asp
        435                 440                 445

Val Pro Asp Asp Ala Leu Pro Ala Leu Leu Glu Gln Phe Asp Thr Arg
    450                 455                 460

Gln Val Leu His Val Thr Phe Gly Ser Val Leu Thr Ala Thr Asp Ala
465                 470                 475                 480

Asp Gly Arg Pro Arg Phe Arg Asp Arg Leu Leu Ala Val Leu Gln Glu
                485                 490                 495

Asn Glu Glu Thr Tyr Tyr Arg Leu Leu Glu Ala His Phe Asp Arg His
            500                 505                 510

Leu Ala Pro Phe Asp Ala Lys
        515


<210> SEQ ID NO 10
<211> LENGTH: 496
<212> TYPE: PRT
<213> ORGANISM: Gracilibacillus timonensis

<400> SEQUENCE: 10

Met Glu Asn Phe Gln Ser Ile Val Glu Leu Leu Thr Ala Gly Lys Arg
1               5                   10                  15

Pro Ala Thr Thr Glu Glu Val Gln Val Tyr Glu Arg Ser Leu Glu Lys
            20                  25                  30

Val Gly Asn Thr Ser Val Val Met Val Lys Lys Asp Ile Glu Lys Tyr
        35                  40                  45

Leu Val Ala Ala Gly Ser Gly Asp Leu Leu Lys Ala Leu Gln Gly Asp
    50                  55                  60

Ser Val Gly Glu Gly Lys Val Cys Pro Leu Thr His Glu Asn Ala Gln
65                  70                  75                  80

Val Leu Asn Gln Phe Phe Thr Tyr Thr Lys Pro Gln Ala Phe Gly Thr
                85                  90                  95

Glu Val Ala Thr Met Gly Leu Gly Asp Arg Leu Gly Val Ala Ser Pro
            100                 105                 110

Gly His Ile Glu Thr Val Gln Gly His Gln Val Lys Pro Ile Leu Ala
        115                 120                 125

Gln Gln Ser Ile Arg Glu Leu Thr Leu Leu His Arg Thr Met Ala Asp
```

```
    130                 135                 140

Ile Leu Asp Ala Ala Thr Phe Ala Val Phe Gln Glu Gly Tyr Lys Asn
145                 150                 155                 160

Gly Tyr Gly Ala Asp Ala Asp His Ile Lys Lys Glu Glu Asp Ile Thr
                165                 170                 175

Tyr Ala Leu Glu Leu Gly Phe Ser Phe Leu Thr Leu Asp Cys Ser Glu
            180                 185                 190

Gln Ile Arg Asn Asp Val Glu Asp Met Val Leu Glu Asp Ile His Lys
        195                 200                 205

Glu Phe Ala Asn Leu Pro Val Asp Arg Lys Glu Tyr Phe Thr Ser His
    210                 215                 220

Tyr Leu Asn Lys Ser Phe Ala Val Gln Gly Ile Asp Ile Ser Phe Asp
225                 230                 235                 240

Glu Asp Arg Leu Tyr Lys Asn Met Leu Val Tyr Gly Ala Ala Ile Asp
                245                 250                 255

Phe Met Glu His Val Phe His Gln Tyr Ile Ala Thr Ala Asp Gln Thr
            260                 265                 270

Ile Asp Phe Glu Ile Ser Ile Asp Glu Thr Glu Thr Val Thr Ser Pro
        275                 280                 285

Glu Ala His Phe Phe Val Ala Glu Glu Leu Arg Arg Arg Gly Val Thr
    290                 295                 300

Val Gln Ser Leu Ala Pro Arg Phe Cys Gly Glu Phe Gln Lys Gly Ile
305                 310                 315                 320

Asp Tyr Ile Gly Asp Leu Glu Gln Phe Glu Lys Glu Leu Gln Glu His
                325                 330                 335

Ala Ala Ile Ala Lys His Phe Gly Tyr Lys Leu Ser Ile His Ser Gly
            340                 345                 350

Ser Asp Lys Phe Ser Ala Phe Pro Ile Ile Gly Lys Tyr Thr Glu Gly
        355                 360                 365

Leu Leu His Ile Lys Thr Ala Gly Thr Asn Trp Leu Glu Ala Val Arg
    370                 375                 380

Val Ile Ala Gln Leu Asn Pro Glu Leu Tyr Arg Arg Met His Arg Tyr
385                 390                 395                 400

Ala Glu Asp His Phe Glu Glu Thr Leu Gln Tyr Tyr His Val Thr Pro
                405                 410                 415

Asp Leu Ser Ser Ile Ala Asp Leu Asp Ser Thr Ser Asp Gln Asp Leu
            420                 425                 430

Ser Ala Tyr Met Asp His Asp Ala Ala Arg Gln Leu Phe His Val Thr
        435                 440                 445

Tyr Gly Ile Leu Leu Thr Ala Lys Asp His Ser Gly Glu Asp Leu Phe
    450                 455                 460

Arg Glu Glu Phe Phe Thr Thr Leu Met Lys Asn Glu Asp Ala Tyr Arg
465                 470                 475                 480

Gln Gly Leu Val Arg His Ile Gly Arg His Leu Asp Leu Leu Asn Ile
                485                 490                 495


<210> SEQ ID NO 11
<211> LENGTH: 501
<212> TYPE: PRT
<213> ORGANISM: Thermotogae bacterium

<400> SEQUENCE: 11

Met Asp Arg Glu Met Leu Glu Gly Tyr Leu Lys Asp Arg Leu Gly Lys
1               5                   10                  15
```

```
Val Leu Glu Ile Tyr Pro Ala Ser Val Lys Arg Lys Glu Asp Ala Ile
            20                  25                  30

Phe Phe Met Val Lys Asn Arg Glu Asp Gly Glu Lys Tyr Leu Val Val
        35                  40                  45

Ile Gly Ser Ala Asp Val Thr Glu Glu Phe Ser Gly Asp Tyr Val Gly
    50                  55                  60

Glu Ile Ala Leu Glu Lys Ser Lys Ala Lys Ser Lys Val Lys Ile Ser
65                  70                  75                  80

Glu Arg Asn His Asn Asn Leu Leu Val Leu Arg Gln Tyr Leu Pro Trp
                85                  90                  95

Leu Asn Pro Ser Val Cys Gly Lys Arg Ser Ser Phe Gly Thr Gly Asp
            100                 105                 110

Arg Leu Gly Ile Ala Thr Pro Ala His Val Lys Ala Phe Glu Gly Lys
        115                 120                 125

Glu Cys Phe Pro Phe Leu Ala Gln Gln Ser Val Arg Glu Met Ser Arg
    130                 135                 140

Thr Gly Arg Asn Trp Leu Ser Val Leu Asp Asp Ala Ile Trp Gly Ile
145                 150                 155                 160

Phe Glu Ser Gly Tyr Glu Gly Ala Phe Gly Ala Asp Ala Asp His Val
                165                 170                 175

Lys Asp Leu Glu Asp Ile Lys Thr Ala Ile Asp Ala Gly Tyr Thr Met
            180                 185                 190

Phe Thr Ile Asp Pro Ser Asp His Val Leu Asp Pro Ser Thr Ile Asp
        195                 200                 205

Lys Ala Ala Ala Glu His Val Phe Phe Glu Leu Asn Glu Arg His Asp
    210                 215                 220

Phe Leu Ser Lys Tyr Glu Glu Lys Val Tyr Glu Ile Gly Gly Arg Lys
225                 230                 235                 240

Tyr Thr Phe Asp Arg Asp Ser Leu Ile Glu Thr Val Ile Thr Tyr Gly
                245                 250                 255

Lys Ala Val Asp His Val Glu Lys Cys Tyr Leu Phe Leu Lys Glu Asn
            260                 265                 270

Asn Arg Asn Pro Phe Glu Leu Glu Val Ser Val Asp Glu Thr Ser Thr
        275                 280                 285

Pro Thr Thr Pro Leu Ala His Ile Phe Ile Val Glu Glu Leu Lys Arg
    290                 295                 300

Arg Gly Val Val Phe Thr Asn Leu Ala Leu Arg Phe Val Gly Glu Trp
305                 310                 315                 320

Gln Lys Ala Ile Asp Tyr Ile Gly Asp Leu Lys Glu Leu Asp Ser Thr
                325                 330                 335

Leu Ala Glu His Ala Ala Ile Ala Glu Val Leu Gly Pro Tyr Lys Leu
            340                 345                 350

Ser Leu His Ser Gly Ser Asp Lys Phe Ser Ala Tyr Pro Tyr Phe Ala
        355                 360                 365

Lys His Val Gly Asn Leu Phe His Val Lys Thr Ala Gly Thr Ser Tyr
    370                 375                 380

Leu Glu Ala Ile Arg Val Val Ala Arg Phe Ser Pro Glu Leu Tyr Arg
385                 390                 395                 400

Arg Ile His Glu Phe Ala Leu Gln Arg Phe Glu Lys Asp Arg Ala Ser
                405                 410                 415

Tyr His Val Thr Thr Asp Leu Ser Lys Val Pro Asp Ile Ser Lys Ile
            420                 425                 430

Pro Asp Ser Gln Leu Glu Asp Leu Leu Asn Glu Pro Asn Thr Arg Gln
```

```
        435                 440                 445

Val Ile His Ile Thr Tyr Gly Ser Val Leu Thr Ala Arg Asn Ser Asp
    450                 455                 460

Gly Ser Tyr Leu Phe Arg Asp Glu Leu Phe Lys Thr Leu Ser Glu His
465                 470                 475                 480

Glu Arg Glu His Tyr Glu Gln Val Ala Ser His Ile Arg Lys His Leu
                485                 490                 495

Asp Leu Leu Gly Val
            500


<210> SEQ ID NO 12
<211> LENGTH: 493
<212> TYPE: PRT
<213> ORGANISM: Thermotogae bacterium

<400> SEQUENCE: 12

Met Glu Lys Leu Lys Gly Val Leu Gly Ser Ser Tyr Lys Ile Tyr Pro
1               5                   10                  15

Asp Ser Met Lys Gln Val Asp Gly Ala Met Phe Leu Leu Ala Lys Lys
            20                  25                  30

Asp Lys Glu Lys Leu Leu Val Val Ile Gly Pro Ser Asn Val Thr Gly
        35                  40                  45

Ala Phe Ser Gly Glu Tyr Val Gly Glu Val Glu Leu Lys Glu Thr Lys
    50                  55                  60

Glu Lys Ser Lys Val Lys Ile Ser Glu Arg Asn His Lys Asn Leu Met
65                  70                  75                  80

Val Leu Arg Lys Leu Leu Pro Trp Leu Asn Pro Ser Pro Cys Gly Lys
                85                  90                  95

Arg Ser Ser Phe Gly Thr Gly Asp Arg Leu Gly Ile Ala Thr Pro Ala
            100                 105                 110

His Val Lys Ala Phe Glu Gly Lys Lys Cys Phe Pro Phe Leu Ala Gln
        115                 120                 125

Gln Ser Val Arg Glu Met Ser Arg Thr Gly Arg Asn Trp Val Ser Val
    130                 135                 140

Leu Asp Asp Thr Leu Trp Gly Val Phe Glu Ser Gly Tyr Glu Gly Pro
145                 150                 155                 160

Phe Gly Ala Asp Ala Asp His Val Lys Thr Ile Asp Asp Leu Lys Ala
                165                 170                 175

Ala Ile Val Ala Gly Tyr Thr Met Phe Thr Ile Asp Pro Ser Asp His
            180                 185                 190

Val Val Asp Pro Lys Thr Val Glu Lys Pro Met Ala Glu Gln Ile Tyr
        195                 200                 205

Ser Glu Leu Asp Lys Glu His Gly Phe Ser Ser Arg Tyr Leu Gly Lys
    210                 215                 220

Val Tyr Glu Ile Gly Asp Lys Lys Tyr Thr Phe Glu Glu Asp Ser Leu
225                 230                 235                 240

Arg Glu Val Val Ile Thr Tyr Gly Lys Ala Ile Asp His Val Glu Asp
                245                 250                 255

Cys Tyr Arg Leu Leu Lys Ser Glu Asn Pro Asn Pro Phe Asp Leu Glu
            260                 265                 270

Val Ser Val Asp Glu Thr Ser Thr Pro Thr Thr Pro Leu Ala His Ile
        275                 280                 285

Phe Ile Ala Glu Glu Leu Lys Arg Arg Asp Ile Glu Phe Ala Asn Leu
    290                 295                 300
```

```
Ala Leu Arg Phe Val Gly Glu Trp Gln Lys Ala Ile Asp Tyr Ile Gly
305                 310                 315                 320

Asn Leu Asn Leu Leu Asp Asp Thr Leu Ala Glu His Ser Ala Ile Ala
                325                 330                 335

Lys Ala Phe Gly Pro Tyr Lys Leu Ser Leu His Ser Gly Ser Asp Lys
            340                 345                 350

Phe Ser Ala Tyr Pro Val Phe Ala Lys His Val Asn Asp Leu Phe His
        355                 360                 365

Val Lys Thr Ala Gly Thr Ser Tyr Leu Glu Ala Ile Arg Val Val Ala
    370                 375                 380

Arg Arg Asn Pro Lys Leu Tyr Arg Arg Val His Asp Phe Ala Leu Gln
385                 390                 395                 400

Arg Phe Glu Thr Asp Lys Ala Ser Tyr His Val Thr Thr Asp Leu Ser
                405                 410                 415

Lys Ile Pro Asp Leu Leu Glu Val Pro Asp Thr Lys Leu Glu Lys Leu
            420                 425                 430

Leu Asp Glu Pro Asn Thr Arg Gln Val Ile His Ile Thr Tyr Gly Ser
        435                 440                 445

Val Leu Thr Ala Lys Gly Ser Asp Gly Lys Tyr Leu Phe Arg Asp Glu
    450                 455                 460

Leu Tyr Glu Thr Leu Cys Asp Tyr Glu Arg Glu His Tyr Glu Gln Val
465                 470                 475                 480

Thr Ser His Ile Arg Lys His Met Glu Leu Leu Gly Leu
                485                 490


<210> SEQ ID NO 13
<211> LENGTH: 494
<212> TYPE: PRT
<213> ORGANISM: Candidatus Acetothermia

<400> SEQUENCE: 13

Met Arg Tyr Asp Lys Gly Val Glu Leu Gln Pro Gly Glu Glu Gly Thr
1               5                   10                  15

Val Lys Pro Val Glu Gly Leu Pro Glu Gly Phe Arg Leu Tyr Glu Arg
            20                  25                  30

Ser Val Trp Glu Lys Gly Gly Ile Thr Phe Ala Leu Val Lys Gly Gly
        35                  40                  45

Gly Gly Lys Arg Leu Phe Ala Ser Gln Leu Leu Ser Gly Phe Ser Gly
    50                  55                  60

Ala Gln Glu Val Glu Ser Gly Tyr Leu Leu Pro Leu Thr Pro Gln Asn
65                  70                  75                  80

Ala Leu Ala Leu Ala Glu Trp Val Pro Glu Leu Arg Pro Arg Arg Leu
                85                  90                  95

Pro Lys Gly Pro Ser Phe Gly Phe Gly Asp Arg Ile Gly Leu Ala Thr
            100                 105                 110

Pro Gly His Val Arg Ala Leu Ser Gly Ala Lys Val Phe Pro Val Leu
        115                 120                 125

Ala Gln Gln Ser Val Arg Glu Asn Ser Arg Thr Gly Arg Ser Phe Glu
    130                 135                 140

Glu Val Leu Ser Ser Ala Ile Phe Gly Ala Leu Glu Glu Gly Tyr Ser
145                 150                 155                 160

Gly Gly Phe Ala Ala Asp Ala Asp His Leu Lys Arg Val Glu Asp Ala
                165                 170                 175

Val Glu Ala Ala Lys Phe Gly Tyr Thr Leu Phe Thr Cys Asp Pro Ser
            180                 185                 190
```

```
Asp Arg Val Val Pro Val Glu Arg Leu Ser Glu Glu Glu Leu Glu Arg
        195                 200                 205

Arg Phe Arg Gly Leu Pro Gln Ala Arg Gly Leu Glu Lys Glu Tyr Leu
    210                 215                 220

Gly Arg Asn Phe Gln Ile Lys Gly Leu Gly Arg Ile Arg Phe Ser Glu
225                 230                 235                 240

Arg Glu Leu Ala Ala Ala Ala Val Lys Tyr Ser Pro Ala Ile Glu Leu
                245                 250                 255

Ala Ala Arg Met Tyr Gln Ala Leu Ser Glu Ala Leu Pro Asp Gly Phe
            260                 265                 270

Asp Phe Glu Leu Ser Leu Asp Glu Ala Glu Ser Pro Thr Thr Pro Ile
        275                 280                 285

Glu His Tyr Phe Val Val Lys Glu Leu Gln Lys Arg Glu Val Glu Leu
    290                 295                 300

Ser Cys Leu Ala Pro Arg Phe Gly Gly Ser Met Glu Lys Ala Val Asp
305                 310                 315                 320

Tyr Arg Gly Ser Leu Glu Val Phe Arg Arg Asp Leu Arg Ala His Ile
                325                 330                 335

Ala Ile Ala Lys Val Leu Gly Asp Tyr Arg Ile Ser Leu His Ser Gly
            340                 345                 350

Ser Asp Lys Phe Arg Leu Tyr Pro Val Leu Ala Gly Glu Ala Glu Gly
        355                 360                 365

Leu Trp His Val Lys Thr Ala Gly Thr Ser Tyr Leu Val Ala Leu Glu
    370                 375                 380

Val Thr Ala Arg Arg Ala Pro Glu Leu Phe Arg Arg Ile Ala Glu Leu
385                 390                 395                 400

Ser Leu Glu Arg Phe Glu Leu Glu Arg Ala Thr Tyr His Leu Ser Thr
                405                 410                 415

Asp Val Ser Arg Ile Pro Asn Leu Glu Ala Leu Ser Asp Gly Glu Leu
            420                 425                 430

Pro Arg Leu Leu Ala Gln Glu Asp Ser Arg Gln Val Leu His Val Thr
        435                 440                 445

Phe Gly Ser Val Leu Arg Gly Glu Leu Gly Glu Glu Leu Arg Gly Val
    450                 455                 460

Leu Leu Glu His Glu Glu Glu His Tyr Arg Leu Leu Ala Glu His Leu
465                 470                 475                 480

Gly Arg His Leu Glu Ala Leu Gly Val Lys Asp Gly Gln Gly
                485                 490


<210> SEQ ID NO 14
<211> LENGTH: 494
<212> TYPE: PRT
<213> ORGANISM: Pseudothermotoga thermarum

<400> SEQUENCE: 14

Met Lys Leu Leu Glu Glu Phe Leu Lys Ala Phe Pro Gly Arg Phe Lys
1               5                   10                  15

Val Tyr Gly Ser Ser Leu Arg Ile Ile Thr Asp Ser Tyr Phe Phe Leu
            20                  25                  30

Gly Asn Asp Gly Lys Glu Lys Leu Leu Phe Val Val Gly Lys Lys Gly
        35                  40                  45

Ile Cys Gln Leu Phe Asp Gly Gln Lys Ile Gly Gln Ile Gly Ser Asn
    50                  55                  60

Asp Val Leu Met Cys Lys Lys Thr His Glu Asn Leu Leu Ala Leu Arg
```

-continued

```
65                  70                  75                  80

Lys Ile Ile Asn Leu Asn Pro Thr Thr Ile Asn Lys Lys Ala Ser Phe
                85                  90                  95

Gly Phe Gly Asp Arg Ile Gly Leu Ala Thr Pro Ala His Ala Lys Val
            100                 105                 110

Ala Lys Asp Phe Glu Val Phe Pro Ile Phe Ala Gln Gln Ser Val Arg
        115                 120                 125

Glu Leu Ser Arg Thr Gly Arg Thr Tyr Lys Asp Val Leu Asp Asp Ala
    130                 135                 140

Val Trp Gly Val Phe Glu Ser Gly Tyr Asn Phe Glu Phe Gly Ala Asp
145                 150                 155                 160

Ala Asp His Val Lys Glu Ile Glu Asp Leu Glu Lys Ala Ser Asn Glu
                165                 170                 175

Gly Phe Thr Met Tyr Thr Val Asp Pro Ser Asp His Ile Lys Asp Val
            180                 185                 190

Ser Lys Leu Ser Gln Lys Glu Phe Gln Ser Leu Tyr Gln Asp Asn Lys
        195                 200                 205

Ile Arg Arg Glu Leu Glu Met Arg Tyr Val Gly Lys Leu Tyr Lys Phe
    210                 215                 220

Lys Asp Phe Glu Phe Arg Met Thr Asp Glu Glu Phe Ala Glu Ile Phe
225                 230                 235                 240

Val Thr Tyr Ile Asp Ala Ile Glu His Val Cys Lys Cys Tyr Asp Val
                245                 250                 255

Leu Lys Ala Lys Gly Lys Pro Phe Asp Phe Glu Val Ser Ile Asp Glu
            260                 265                 270

Thr Ala Val Pro Thr Thr Pro Leu Ala His Ile Phe Ile Val Lys Glu
        275                 280                 285

Leu Arg Arg Arg Gly Ile Asp Phe Lys Thr Leu Ala Leu Arg Phe Ser
    290                 295                 300

Gly Glu Trp Gln Lys Gly Ile Asp Tyr Ile Gly Asp Met Glu Met Phe
305                 310                 315                 320

Arg Lys Glu Ile Ile Thr His Ser Lys Ile Ser Lys Glu Leu Gly Gly
                325                 330                 335

Tyr Lys Leu Ser Leu His Ser Gly Ser Asp Lys Phe Ser Val Tyr Pro
            340                 345                 350

Ile Phe Ser Glu Ala Thr Glu Gly Glu Phe His Val Lys Thr Ala Gly
        355                 360                 365

Thr Asn Tyr Leu Glu Ala Ile Arg Val Val Ala Val Lys Asp Pro Glu
    370                 375                 380

Leu Tyr Arg Glu Ile His Lys Phe Ala Leu Thr Lys Phe Glu Gln Asp
385                 390                 395                 400

Arg Lys Ser Tyr His Val Thr Thr Asp Leu Ser Lys Ile Pro Asp Val
                405                 410                 415

Asp Lys Met Lys Asn Glu Glu Leu Val Lys Leu Leu Asp Met Pro Asp
            420                 425                 430

Ser Arg Gln Leu Ile His Ile Thr Tyr Gly Ser Val Leu Thr Ala Lys
        435                 440                 445

Asp Glu Asn Gly Arg Trp Leu Phe Lys Glu Arg Ile Leu Lys Val Leu
    450                 455                 460

Gln Glu Asn Glu Asp Leu His Tyr Asp Phe Val Glu Lys His Met Arg
465                 470                 475                 480

Lys His Leu Ser Leu Leu Gly Leu Glu Arg Arg Ile Glu Lys
                485                 490
```

<210> SEQ ID NO 15
<211> LENGTH: 483
<212> TYPE: PRT
<213> ORGANISM: Thermoanaerobacterium thermosaccharolyticum

<400> SEQUENCE: 15

```
Met Ile Gly Asn Val Leu Ser Thr Leu Glu Glu Asn Gly Phe Lys Val
1               5                   10                  15

Tyr Pro Asp Ser Leu Arg Lys Leu Gly Glu Asn Ile Tyr Ile Phe Val
            20                  25                  30

Val Lys Arg Gln Asn Glu Lys Met Val Gly Ile Leu Ser Ser Ser Asp
        35                  40                  45

Val Lys Leu Asn Gly Ala Tyr Phe Ser Glu Asp Lys Asn Val Ser Asp
    50                  55                  60

Lys Leu Arg Leu Asn Ile Tyr Pro Phe Thr Phe Glu Asn Tyr Val Thr
65                  70                  75                  80

Leu Asn Gly Lys Phe His Ile Gly Pro Thr Val Cys Arg Gly Asn Ser
                85                  90                  95

Ser Phe Gly Thr Gly Asp Arg Leu Gly Leu Val Thr Ala Ala Gln Leu
            100                 105                 110

Thr Ala Leu Lys Lys Tyr Asp Val Phe Pro Ile Leu Ala Gln Gln Ser
        115                 120                 125

Pro Arg Glu Leu Ile Lys Thr Asn Arg Asp Phe Lys Asp Val Leu Leu
    130                 135                 140

Lys Val Val Leu Gly Val Leu Glu Thr Gly Tyr Ile Gly His Phe Gly
145                 150                 155                 160

Ala Asp Ala Asp His Ile Lys Asp Glu Tyr Asn Leu Leu Glu Gly Ile
                165                 170                 175

Asn Ala Gly Tyr Thr Met Tyr Thr Leu Asp Leu Ser Glu Gln Leu Ile
            180                 185                 190

Asp Ile Ser Ser Leu Asn Ala Ser Glu Met Arg Asn Lys Ala Gln Glu
        195                 200                 205

Leu Ser Gln Val Ser Lys Asp Ile Ile Lys Asp Phe Ser Gly Lys Lys
    210                 215                 220

Leu Asp Ile Ile Ser Asp Ser Gly Tyr Val Val Ser Glu Glu Glu Leu
225                 230                 235                 240

Tyr Lys Ser Ala Val Ala Tyr Glu Asn Ala Met Lys Phe Val Asp Lys
                245                 250                 255

Val Asn Asn Ile Leu Lys Glu Lys Leu Ser Asp Phe Asp Met Glu Ile
            260                 265                 270

Ser Ile Asp Glu Gly Gly Lys Val Thr Thr Leu Glu Asp His Leu Tyr
        275                 280                 285

Val Ala Glu Tyr Leu His Arg Asn Gly Ile Asp Phe Phe Ser Ile Ala
    290                 295                 300

Pro Lys Phe Pro Gly Glu Phe Glu Lys Ala Val Asp Tyr Ile Gly Asp
305                 310                 315                 320

Leu Asp Glu Phe Leu Leu Glu Leu Lys Lys His Tyr Gln Leu Ser Arg
                325                 330                 335

Met Ile Gly Gly Tyr Lys Ile Ser Leu His Ser Gly Ser Asp Lys Phe
            340                 345                 350

Ser Ile Tyr Arg Ile Phe Ser Asp Ile Thr Glu Lys Asn Phe His Ile
        355                 360                 365

Lys Thr Ser Gly Thr Ser Trp Leu Gln Ala Val Asn Leu Ile Tyr Lys
```

```
    370                 375                 380

Phe Asp Lys Glu Phe Tyr Arg Lys Leu Tyr Lys Ile Ala Leu Ser Asn
385                 390                 395                 400

Leu Glu Glu Ser Lys Lys Ser Tyr Lys Val Leu Ile Lys Lys Asp Asp
                405                 410                 415

Phe Lys Asp Glu Pro Glu Leu Asp Asn Pro Glu Phe Thr Leu Arg Pro
            420                 425                 430

Glu Ile Lys Gln Leu Phe His Ile Ser Phe Gly Val Leu Leu Asp Leu
        435                 440                 445

Lys Gly Lys Glu Ile Lys Asp Met Leu Asn Asp Tyr Glu Glu Glu His
    450                 455                 460

Tyr Lys Met Val Ser Asp Asn Ile Glu Asn His Leu Lys Glu Ile Tyr
465                 470                 475                 480

Tyr Glu Lys


<210> SEQ ID NO 16
<211> LENGTH: 480
<212> TYPE: PRT
<213> ORGANISM: Thermofilum adornatus 1505

<400> SEQUENCE: 16

Met Tyr Leu Gly Lys Ile Pro Arg Pro Gly Ile Gly Ile Arg Ile Pro
1               5                   10                  15

Glu Ile Val Leu Pro Glu Val Val Glu Ala Ser Arg Arg Leu Ala Met
            20                  25                  30

Phe Ser Thr Val Met Leu Ser Phe Asn Arg Glu Thr Ala Pro Arg Asp
        35                  40                  45

Tyr Ile Glu Ser Arg Asp Pro Arg Phe Phe Tyr Phe Gly His Thr Gly
    50                  55                  60

Thr Ser Ile Ser Ser Tyr Val Ser Met Ala Arg Asp Tyr Ser Gly Arg
65                  70                  75                  80

Leu Gly Ala Pro Leu Glu Val Glu Ala Asp His Val Ser Ile Met Gly
                85                  90                  95

Ser Val Glu Arg Ala Leu Lys Lys Ile Ala Gly Val Lys Val Glu Glu
            100                 105                 110

Pro Ile Ala Asp Asp Glu Ala Glu Glu Ser Ile Arg Tyr Ile Arg Glu
        115                 120                 125

Glu Leu Arg Glu Ala Lys Glu Ala Gly Gly Val Asp Phe Ala Thr Ile
    130                 135                 140

Asp Thr Cys Asp Leu Ile Asp Phe Ser Val Asp Lys Glu Pro Leu Gly
145                 150                 155                 160

Asn Val Glu Ala Arg Tyr Glu Glu Leu Phe Gly Ala Asp Glu Arg Arg
                165                 170                 175

Lys Leu Glu Glu Arg Tyr Val Gly Thr His Cys Phe Leu Gly Asp Asp
            180                 185                 190

Arg His Val Cys Leu Asn Phe Thr Arg Gln Asp Val Leu Arg Leu Ala
        195                 200                 205

Leu Lys Phe Trp Arg Ser Leu Glu Tyr Ala Ser Arg Val Tyr Asn Leu
    210                 215                 220

Ile Val Thr Glu Asn Gly His Ala Pro Gly Ile Glu Val Ala Phe Asp
225                 230                 235                 240

Glu Thr Pro Phe Glu Ser Asn Pro Leu Glu Val Tyr Phe Tyr Leu Ser
                245                 250                 255

Glu Leu Leu Ser Arg Gly Val Arg Val Asp Phe Ile Ala Pro Asn Ile
```

```
            260                 265                 270

Gly Phe Lys Lys Arg Glu Asp Tyr Ser Gly Arg Leu Asp Glu Leu Tyr
        275                 280                 285

Glu Ala Val Ser Thr Leu His Ser Ile Val Ser Ser Met Asn Val Tyr
    290                 295                 300

Leu Ser Ile His Ser Gly Ser Gly Ser Asn Pro Tyr Thr Asp Lys Gly
305                 310                 315                 320

Phe Gly Val Trp Ala Thr Leu Ala Arg Ala Thr Arg Gly Arg Val Lys
                325                 330                 335

Tyr Lys Met Ser Gly Val Phe Ile Gln Leu Leu Leu Glu Val Met Ala
            340                 345                 350

Asp Phe Pro Ala Gly Ser Lys Thr Arg Arg Leu Tyr Glu Glu Ile Tyr
        355                 360                 365

Asp Thr Val Val Asp His Leu Ala Arg Thr Val Glu Ser Arg Gly Ala
    370                 375                 380

Leu Tyr Ser Ser Glu Leu Glu Ala Met Leu Glu Lys Tyr Arg Ser Ser
385                 390                 395                 400

Arg Asp Ser Tyr Asn Pro Arg His Asp Leu Phe Arg His Tyr Phe Tyr
                405                 410                 415

Val Phe Gln Ala Val Arg Asp Asp Lys Gly Ala Arg Trp Leu Arg Glu
            420                 425                 430

Glu Ile Val Glu His Tyr Phe Ala Cys Glu Glu Leu Arg Arg Arg Tyr
        435                 440                 445

Ser Ala Glu Met Gln Arg Leu Leu Glu Arg Leu Ala Tyr Thr Phe Asn
    450                 455                 460

Tyr Ala Gly Ser Ala Phe Arg Tyr Arg Ala Ile Ser Leu Gly Gly Lys
465                 470                 475                 480


<210> SEQ ID NO 17
<211> LENGTH: 482
<212> TYPE: PRT
<213> ORGANISM: Thermoanaerobacter italicus

<400> SEQUENCE: 17

Met Val Glu Lys Gly Ile Leu Glu Lys Leu Thr Asp Phe Leu Leu Asn
1               5                   10                  15

His Ser Phe Val Leu Tyr Pro Asn Ser Leu Arg Lys Leu Lys Glu Asp
            20                  25                  30

Thr Tyr Ile Phe Val Ala Lys Lys Asp Ala Asp Lys Lys Ile Gly Ile
        35                  40                  45

Leu Thr Lys Glu Asn Phe Lys Leu Ser Ser Pro Tyr Phe Val Glu Asp
    50                  55                  60

Lys Asn Val Lys Glu Ile Asp Phe Tyr Leu Asn Leu Tyr Pro Leu Ser
65                  70                  75                  80

Phe Glu Asn Tyr Leu Ile Leu Lys Asn Phe Gly Ile Ser Pro Thr Pro
                85                  90                  95

Cys Arg Gln Lys Ser Ser Phe Gly Thr Gly Asp Arg Leu Gly Leu Val
            100                 105                 110

Thr Pro Ala His Ile Val Ala Leu Lys Glu Tyr Pro Val Phe Pro Val
        115                 120                 125

Leu Val Gln Gln Ser Pro Arg Glu Leu Glu Lys Thr Arg Arg Asp Phe
    130                 135                 140

Lys Asp Ala Leu Leu Lys Val Ile Leu Gly Val Leu Glu Ala Gly Tyr
145                 150                 155                 160
```

```
Thr Gly Glu Phe Gly Ala Asp Ala Asp His Ile Lys Asp Glu Lys Tyr
                165                 170                 175

Leu Leu Arg Ala Ile Glu Ala Gly Tyr Thr Met Tyr Thr Leu Asp Val
            180                 185                 190

Ser Glu Leu Leu Thr Lys Ile Ser Asp Ile Ser Ser Asn Gln Val Met
        195                 200                 205

Gln Ile Ser Pro Gln Ser Lys Glu Ile Ile Glu Ala Phe Lys Gly Lys
    210                 215                 220

Lys Ile Ser Ile Ser Glu Glu Glu Tyr Thr Ile Arg Glu Asp Glu Leu
225                 230                 235                 240

Tyr Lys Ser Ala Leu Ile Tyr Glu Lys Ala Met Asn Phe Val Glu Lys
                245                 250                 255

Val Tyr Ser Ile Leu Lys Glu Lys Val Lys Asp Phe Asp Leu Glu Ile
            260                 265                 270

Ser Ile Asp Glu Gly Glu Lys Asp Thr Thr Val Glu Asp His Ile Phe
        275                 280                 285

Val Ala Glu Tyr Leu His Lys Lys Gly Ile Asp Phe Trp Ser Leu Ala
    290                 295                 300

Pro Lys Phe Pro Gly Glu Phe Gln Lys Ala Ile Asp Tyr Lys Gly Asp
305                 310                 315                 320

Ile Asn Lys Phe Ala Val Glu Leu Lys Lys His Tyr Ala Ile Ser Gln
                325                 330                 335

Gln Phe Gly Gly Tyr Lys Leu Ser Leu His Ser Gly Ser Asp Lys Phe
            340                 345                 350

Ser Ile Tyr Glu Ile Phe Ser Glu Val Thr Gln His Ser Phe His Ile
        355                 360                 365

Lys Thr Ser Gly Thr Ser Trp Leu Gln Ala Val Asn Leu Ile Phe Glu
    370                 375                 380

Lys Asp Lys Lys Leu Phe Tyr Glu Leu Tyr Lys Ile Ala Leu Asn Asn
385                 390                 395                 400

Leu Glu Glu Ser Lys Lys Ala Tyr Lys Val Leu Ile Asp Lys Asp Asp
                405                 410                 415

Phe Ala Glu Glu Pro Asn Leu Glu Asn Ala Gln Ile Leu Ser Gln Pro
            420                 425                 430

Glu Ile Lys Gln Leu Phe His Ile Ser Tyr Gly Val Leu Leu Asp Glu
        435                 440                 445

Lys Lys Glu Glu Ile Tyr Asp Val Leu Asp Lys Tyr Glu Glu Glu His
    450                 455                 460

Tyr Gln Phe Val Ser Ala Asn Ile Lys Asn His Leu Glu Lys Ile Phe
465                 470                 475                 480

Asn Lys


<210> SEQ ID NO 18
<211> LENGTH: 481
<212> TYPE: PRT
<213> ORGANISM: Thermotoga naphthophila

<400> SEQUENCE: 18

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Gly Glu Glu Gly Lys Ile Leu Val Val Ala Gly Glu Lys Ala Pro
        35                  40                  45
```

```
Glu Gly Leu Ser Phe Phe Lys Lys Gln Arg Val Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Ala Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Lys
```

```
465                 470                 475                 480

Gly


<210> SEQ ID NO 19
<211> LENGTH: 510
<212> TYPE: PRT
<213> ORGANISM: Thermoclostridium stercorarium subsp. stercorarium DSM
      8532

<400> SEQUENCE: 19

Met Gly Asn Trp Lys Asp Phe Val Lys Asp Phe Cys Thr Lys Glu Lys
1               5                   10                  15

Asn Ile Glu Val Leu Arg Ala Glu Ala Glu Lys Ala Phe Gly Asn Tyr
            20                  25                  30

Gly Val Tyr Pro Arg Ser Ile Asn Glu Val Gly Asn Ala Ile Val Met
        35                  40                  45

Met Ala Arg Gly Glu Asn Glu Lys Cys Leu Val Val Val Gly Glu Asp
    50                  55                  60

Ser Arg Leu Gln Glu Leu Lys Gly Asn Gln Thr Glu Glu Asn Gly Leu
65                  70                  75                  80

Lys Val Lys Val Cys Pro Leu Ser Asn Glu Asn Cys Tyr Val Ile Arg
                85                  90                  95

Lys Ile Phe Pro Tyr Thr Asn Pro Gln Pro His Lys Gly Lys Asn Ile
            100                 105                 110

Thr Ile Gly Leu Gly Asp Arg Leu Gly Leu Ala Ser Pro Gly His Ile
        115                 120                 125

Arg Leu Ile Arg Asp Leu Asp Val Phe Pro Val Leu Ala Gln Gln Ser
    130                 135                 140

Ile Arg Glu Leu Asn Leu Thr Gly Arg Thr Tyr Glu Asp Val Ile Ser
145                 150                 155                 160

Ala Ala Ala Trp Ala Val Phe Gln Glu Gly Tyr Thr Lys Gly Tyr Gly
                165                 170                 175

Ala Asp Gly Asp His Leu Lys Thr Ala Glu Glu Val Lys Met Ser Leu
            180                 185                 190

Asn Val Gly Met Thr Met Ile Thr Leu Asp Cys Ser Glu His Ile Asp
        195                 200                 205

Asn Ser Ala Ala His Ala Gly Leu Ser Glu Leu Arg Glu Lys Tyr Ser
    210                 215                 220

Arg Phe Thr Glu Glu Glu Arg Glu Arg Trp Glu Arg Lys Tyr Leu Asn
225                 230                 235                 240

Arg Asp Val Lys Ile Gly Asn Tyr Ser Phe His Ile Ser Glu Glu Asp
                245                 250                 255

Leu Ile Arg Met Ala Cys Val Tyr Gly Gly Ala Ile Arg His Thr Leu
            260                 265                 270

Asp Ile Tyr His Asn Ile Ile Ala Lys Cys Gly Arg Pro Ile Asp Phe
        275                 280                 285

Glu Met Ser Ile Asp Glu Thr Leu Thr Pro Thr Ser Pro Ala Ser His
    290                 295                 300

Tyr Phe Val Ala Gln Glu Leu Ile Asp Gly Gly Val Glu Ile Thr Ser
305                 310                 315                 320

Leu Ala Pro Arg Phe Cys Gly Glu Phe Gln Lys Gly Ile Asp Tyr Ile
                325                 330                 335

Gly Asp Leu Lys Gln Phe Thr Asp Glu Phe Ala Val His Ala Ala Ile
            340                 345                 350
```

```
Ala Asp His Phe Gly Tyr Lys Ile Ser Val His Ser Gly Ser Asp Lys
        355                 360                 365

Phe Lys Val Phe Pro Val Val Gly Glu Lys Thr Asn Gly Arg Tyr His
    370                 375                 380

Leu Lys Thr Ala Gly Thr Asn Trp Leu Glu Ala Val Arg Val Ile Ala
385                 390                 395                 400

Arg His Lys Pro Asp Leu Tyr Arg Arg Met His Ala Phe Ala Leu Glu
                405                 410                 415

His Leu Glu Asp Ala Lys Lys Tyr Tyr His Ile Gly Ala Lys Val Glu
            420                 425                 430

Asn Ile Pro Ala Leu Glu Thr Leu Ala Asp Ser Glu Leu Pro Glu Leu
        435                 440                 445

Met Asn Arg Asp Asp Ser Arg Gln Val Met His Ile Thr Tyr Gly His
    450                 455                 460

Ile Leu Gln Ala Lys Asp Glu Asn Gly Asn Pro Leu Phe Lys Asp Glu
465                 470                 475                 480

Leu Tyr Lys Val Leu Tyr Glu Tyr Glu Glu Glu Tyr Ala Asn Ala Leu
                485                 490                 495

Lys Lys His Ile Gly Arg His Leu Glu Gly Leu Gly Leu Leu
            500                 505                 510


<210> SEQ ID NO 20
<211> LENGTH: 485
<212> TYPE: PRT
<213> ORGANISM: Dictyoglomus thermophilum

<400> SEQUENCE: 20

Met Leu Asn Leu Leu Glu Glu Leu Leu Lys Pro Phe Ser Ile Phe Val
1               5                   10                  15

Tyr Pro Gln Ser Leu Arg Lys Ile Asn Glu Glu Leu Tyr Ile Phe Val
            20                  25                  30

Ala Lys Ile Asn Asn Thr Lys Asn Ile Gly Ile Ile Lys Gln Asn Gln
        35                  40                  45

Ser Ile Tyr Phe Ser Asn Pro Tyr Phe Ser Glu Asp Lys Lys Ile Glu
    50                  55                  60

Lys Thr Gly Phe Ser Val Asn Ile Tyr Pro Leu Asn Phe Glu Asn Tyr
65                  70                  75                  80

Gln Lys Leu Lys Glu Ile Ile Pro Ile Asn Pro Lys Thr Cys Asn Lys
                85                  90                  95

Lys Ile Ser Phe Gly Thr Gly Asp Arg Leu Gly Leu Val Thr Ser Ala
            100                 105                 110

Gln Leu Ser Val Leu Lys Asp Tyr Asn Leu Phe Pro Ile Leu Ala Gln
        115                 120                 125

Gln Ser Pro Arg Glu Leu Ile Lys Thr Lys Arg Asp Phe Lys Asp Val
    130                 135                 140

Leu Leu Lys Ser Val Ile Gly Val Leu Glu Ile Gly Tyr Thr Asp Ser
145                 150                 155                 160

Tyr Gly Ala Asp Ala Asp His Ile Lys Asp Glu Lys Tyr Leu Met Glu
                165                 170                 175

Ala Ile Asp Ala Gly Tyr Thr Met Tyr Thr Leu Asp Ile Ser Asp Phe
            180                 185                 190

Ile Glu Arg Ile Glu Asn Leu Thr Ser Lys Glu Ile Arg Glu Lys Tyr
        195                 200                 205

Glu Lys Ile Ser Ser Phe Ser Lys Lys Ile Ile Glu Lys Tyr Ala Gly
    210                 215                 220
```

```
Lys Lys Ile Lys Ile Ser Asn Glu Glu Tyr Phe Glu Leu Ser Tyr Asp
225                 230                 235                 240

Glu Leu Cys Lys Ser Ala Ile Val Tyr Glu Lys Ala Leu Ser Phe Val
                245                 250                 255

Glu Met Val Tyr Glu Ile Leu Arg Ser Lys Leu Leu Glu Phe Asp Ile
            260                 265                 270

Glu Val Ser Ile Asp Glu Gly Glu Arg Asp Thr Thr Pro Glu Asp His
        275                 280                 285

Phe Phe Val Val Gln Phe Leu His Glu Lys Gly Ile Asp Phe Lys Ser
    290                 295                 300

Leu Ala Pro Lys Phe Pro Gly Glu Phe Gln Lys Gly Ile Asp Tyr Ile
305                 310                 315                 320

Gly Asp Ile Lys Lys Phe Glu Asn Glu Leu Lys Lys Gln Tyr Ala Leu
                325                 330                 335

Thr Lys Ala Leu Glu Gly Tyr Arg Leu Ser Leu His Ser Gly Ser Asp
            340                 345                 350

Lys Phe Ser Ile Tyr Lys Ser Phe Tyr Lys Ile Thr Glu Gly Asn Phe
        355                 360                 365

His Ile Lys Thr Ser Gly Thr Ser Trp Leu Glu Ala Val Lys Thr Ile
    370                 375                 380

Ala Arg Tyr Ser Pro Asp Leu Phe Leu Glu Leu Tyr His Ile Ala Leu
385                 390                 395                 400

Glu Asn Leu Glu Glu Ser Lys Lys Ala Tyr Lys Val Ser Ile Thr Lys
                405                 410                 415

Glu Glu Phe Pro Lys Glu Ile Lys Glu Asp Tyr Ile Glu Phe Leu Lys
            420                 425                 430

Lys Pro Asn Val Arg Gln Leu Phe His Ile Ser Tyr Gly Val Leu Leu
        435                 440                 445

Asp Glu Lys Arg Glu Glu Ile Tyr Glu Ile Leu Asn Lys Asn Glu Lys
    450                 455                 460

Glu His Tyr Gln Tyr Val Ser Glu Asn Ile Arg Lys His Leu Lys Asn
465                 470                 475                 480

Leu Phe Glu Glu Glu
                485


<210> SEQ ID NO 21
<211> LENGTH: 426
<212> TYPE: PRT
<213> ORGANISM: Spirochaeta thermophila DSM 6192

<400> SEQUENCE: 21

Met Ala Thr Pro Gly Ser Leu Ser Phe Pro Arg Tyr Ser Ile Gly Thr
1               5                   10                  15

Gly Asp Arg Phe Gly His Glu Ala Glu Ala Gln Leu Arg Ala Val Ile
            20                  25                  30

Glu Ala Gly Arg Leu Gly Arg Ala Leu Gly Ile Val Trp Asn Lys Ser
        35                  40                  45

Tyr Arg Glu His Thr Ile Ile Gly Ser Arg Pro Glu Asp Val Arg Arg
    50                  55                  60

Met Ala Asp Arg Ala Val Ser Ser Leu Gly Trp Glu Gly Pro Tyr Phe
65                  70                  75                  80

Val Asp Ala Asp His Ile Thr Thr Lys Thr Val Asp Leu Phe Leu Asp
                85                  90                  95

Ser Ala Asp Phe Phe Thr Ile Asp Val Ala Glu Ala Ile Gly Lys Gly
```

```
            100                 105                 110

Glu Val Ser Pro Gln Glu Glu Glu Asp Leu Leu Ala Ser Leu Gly Asp
        115                 120                 125

Leu Leu Asn Arg Glu Leu Ala Ile Pro Gly Leu Ser Ser Pro Leu Ala
    130                 135                 140

Ile Ser Glu Glu Thr Ala Arg Gly Thr Ile Arg Ala Tyr Trp Pro Ala
145                 150                 155                 160

Val Arg Glu Ala Ala Arg Ile Tyr Arg Arg Ile Glu Gln Gly Ala Ser
                165                 170                 175

Arg Pro Phe Val Val Glu Val Ser Met Asp Glu Thr Asp Glu Pro Gln
            180                 185                 190

Arg Pro Pro Glu Leu Leu Leu Ile Leu Ala Met Ile Arg Lys Ala Gly
        195                 200                 205

Ile Pro Ala Arg Thr Ile Ala Pro Lys Phe Ser Gly Ala Phe Tyr Lys
    210                 215                 220

Gly Val Asp Tyr Val Gly Asp Pro His Thr Phe Ala Arg Glu Phe Glu
225                 230                 235                 240

Asp Asp Leu Cys Val Val Arg Tyr Ala Arg Glu Gln Phe Ala Leu Pro
                245                 250                 255

Glu Gly Leu Lys Leu Ser Val His Ser Gly Ser Asp Lys Phe Ser Leu
            260                 265                 270

Tyr Pro Leu Val Arg Glu Ile Leu Ser Arg His Pro Gln Glu Gly Val
        275                 280                 285

His Leu Lys Thr Ala Gly Thr Thr Trp Leu Glu Glu Val Ala Gly Leu
    290                 295                 300

Ala Glu Ala Gly Gly Glu Ala Leu Ala Leu Ala Lys Glu Ile Ala Leu
305                 310                 315                 320

Thr Cys Tyr Ser Met Ile Glu Glu Leu Cys Ala Pro Tyr Ala Ala Val
                325                 330                 335

Ile Asp Ile Asp Pro Glu Arg Leu Pro Ser Pro Gly Glu Ile Glu Glu
            340                 345                 350

Trp Ser Ser Gly Arg Phe Val Glu Ala Leu Glu His Asp Pro Ser Asn
        355                 360                 365

Pro Ser Tyr Asn Arg Asp Phe Arg Gln Leu Ile His Val Gly Tyr Lys
    370                 375                 380

Val Ala Ala Gln Met Gly Glu Arg Phe His Gln Ala Leu Glu Ala His
385                 390                 395                 400

Arg Glu Val Ile Ala Ala Arg Val Thr Arg Asn Leu Leu Glu Arg His
                405                 410                 415

Ile Ile Pro Leu Phe Pro Gly Asp Ile Pro
            420                 425


<210> SEQ ID NO 22
<211> LENGTH: 432
<212> TYPE: PRT
<213> ORGANISM: Singulisphaera acidiphila

<400> SEQUENCE: 22

Met Thr Gln Arg Thr Thr Asp Gln Ala Asn Pro Pro Ala Cys Val Thr
1               5                   10                  15

Leu Gly Leu Glu Pro Ser Phe Gly Phe Gly Asp Arg Ile Gly Leu Ala
            20                  25                  30

Thr Pro Gly His Val Glu Ala Met Gln Arg Ser Gly Ala Gly Ile Gln
        35                  40                  45
```

```
Pro Ile Phe Pro Gln Gln Ser Ile Arg Glu Met Ala Arg Thr Gly Arg
    50                  55                  60

Thr Pro Leu Gln Val Met Asn Asp Ala Leu Gly Gly Met Arg Ala Ala
65                  70                  75                  80

Gly Trp Asn Gly Arg Thr Gly Ala Asp Ala Asp His Leu Lys Thr Thr
                85                  90                  95

Ala Asp Val Asp Val Thr Ala Ala Val Gly Phe Thr Phe Phe Thr Ile
            100                 105                 110

Asp Pro Ser Asp Ser Val Asp Ala His Ala Asp Asp Tyr Asp Glu Ala
        115                 120                 125

Thr Leu Arg Thr Arg Phe Ala Ala Val Ala Asp Glu Val Asp Trp Val
    130                 135                 140

Gln Ser Tyr Gln Gly Lys Ser Val Gly Leu Ala Thr Gly Thr Val Val
145                 150                 155                 160

Gln Leu Asn Glu Glu Ala Cys Leu Arg Ala Ala Val Lys Tyr Gly Arg
                165                 170                 175

Ala Leu Asn His Ala Leu Arg Ile Ala Glu His Ile Ala Thr Val His
            180                 185                 190

Asp Gln Ala Gly Arg Asp Tyr Glu Ile Glu Leu Ser Val Asp Glu Thr
        195                 200                 205

Glu Gln Pro Thr Thr Leu Ala Glu His Tyr Ile Val Ala Asp Gln Cys
    210                 215                 220

Leu Lys Arg Gly Met Lys Leu Val Ser Leu Ala Pro Arg Phe Ile Gly
225                 230                 235                 240

Asp Leu Glu Lys Gly Val Asp Tyr Lys Gly Asp Val Ala Ala Leu Glu
                245                 250                 255

His Ser Leu His Asp His Ala Ala Ile Ala Thr Leu Leu Gly Pro Tyr
            260                 265                 270

Lys Leu Ser Leu His Ser Gly Ser Asp Lys Leu Ser Met Tyr Ala Ala
        275                 280                 285

Leu Ala Arg Ala Thr Arg Gly Arg Phe His Val Lys Thr Ala Gly Thr
    290                 295                 300

Ser Tyr Leu Glu Ala Leu Arg Val Val Ala Arg His Asp Val Pro Leu
305                 310                 315                 320

Phe Arg Arg Leu Val Glu Phe Ala Arg Gly Arg Tyr Glu Thr Asp Arg
                325                 330                 335

Ala Thr Tyr His Val Ser Ala Thr Leu Arg Ser Ala Pro Pro Ala Ala
            340                 345                 350

Glu Val Thr Glu Pro Ala Asp Leu Glu Arg Leu Tyr Leu Glu Ser Trp
        355                 360                 365

Ala Asp Val Pro Ala Gly Ala Gly Phe Thr His Pro Gly Arg Gln Ile
    370                 375                 380

Leu His Cys Thr Phe Gly Ser Thr Leu Thr Asp Pro Val Leu Gly Gln
385                 390                 395                 400

Ala Val Arg Ala Thr Leu Glu Arg His Pro Asp Thr Tyr Thr Glu Val
                405                 410                 415

Leu Ala Asp His Phe Ser Arg His Leu Asp Ala Leu Arg Leu Gly Met
            420                 425                 430
```

<210> SEQ ID NO 23
<211> LENGTH: 254
<212> TYPE: PRT
<213> ORGANISM: Thermotoga maritima MSB8

<400> SEQUENCE: 23

```
Met Arg Ser Thr Asp Arg Leu Leu Phe Ile Asp Phe Leu Leu Lys Phe
1               5                   10                  15

Glu Asn Lys Asn Gly Thr Val Ile Pro Cys Cys Val Asp Asn Phe Asp
            20                  25                  30

Cys Thr Phe Thr His Lys Gly Gly Lys Ser Met Tyr Glu Lys Glu Arg
        35                  40                  45

Lys Glu Leu Tyr Asn Ala His Leu Leu Leu Glu Lys Tyr Gly Leu Val
    50                  55                  60

Ala Tyr Thr Ser Gly Asn Val Ser Val Arg Ile Gly Asp His Val Leu
65                  70                  75                  80

Ile Lys Pro Ser Gly Val Pro Tyr Thr Glu Leu Lys Pro Glu Asp Phe
                85                  90                  95

Val Val Val Asp Leu Glu Gly Asn Val Ile Glu Gly Glu Lys Lys Pro
            100                 105                 110

Ser Val Asp Thr Ala Thr His Leu Tyr Leu Tyr Lys His Leu Asp Trp
        115                 120                 125

Ala Lys Ser Val Ile His Thr His Ser Thr Phe Ala Met Val Trp Ala
    130                 135                 140

Ile Leu Glu Lys Ser Ile Pro Val Leu Cys Thr Ala His Ala Asp Val
145                 150                 155                 160

Phe Gly Glu Glu Ile Pro Leu Thr Glu Tyr Ala Pro Val Gly Ser Glu
                165                 170                 175

Ala Ile Gly Lys Ala Val Val Lys Val Ile Gly Lys Ser Gly Ala Val
            180                 185                 190

Leu Leu Arg Lys His Gly Val Met Ile Val Gly Thr Ser Val Asp Asp
        195                 200                 205

Ala Val Lys Lys Ala Ile Phe Leu Glu Glu Val Ala Lys Ala Ala Tyr
    210                 215                 220

Phe Ala Thr Leu Ala Gly Lys Pro Thr Pro Leu Pro Pro Asp Glu Val
225                 230                 235                 240

Asp His Leu Tyr Asn Gln Tyr His Thr Lys Tyr Gly Gln Lys
                245                 250
```

<210> SEQ ID NO 24
<211> LENGTH: 212
<212> TYPE: PRT
<213> ORGANISM: Thermotoga caldifontis

<400> SEQUENCE: 24

```
Met Tyr Glu Glu Ile Lys Lys Glu Leu His Glu Ala His Met Ile Leu
1               5                   10                  15

Glu Lys Tyr Gly Leu Val Ala Tyr Thr Ser Gly Asn Val Ser Val Arg
            20                  25                  30

Val Asn Glu His Val Ile Ile Lys Pro Ser Gly Val Pro Tyr Ser Thr
        35                  40                  45

Leu Lys Pro Glu Asp Tyr Val Val Val Asp Leu Glu Gly Glu Val Val
    50                  55                  60

Glu Gly Ser Lys Lys Pro Ser Ile Asp Thr Ala Thr His Leu Tyr Leu
65                  70                  75                  80

Tyr Arg Asn Ile Asp Trp Ala Arg Ser Ile Ile His Thr His Ser Thr
                85                  90                  95

Phe Ser Thr Val Trp Ala Val Val Glu Lys Pro Ile Pro Val Leu Cys
            100                 105                 110

Thr Ala His Ala Asp Val Phe Gly Glu Glu Ile Pro Leu Thr Glu Tyr
```

```
        115                 120                 125

Ala Pro Val Gly Ser Glu Ala Ile Gly Lys Ala Val Leu Lys Val Ile
    130                 135                 140

Gly Arg Ser Gly Ala Val Leu Leu Arg Lys His Gly Val Met Val Val
145                 150                 155                 160

Gly Asp Ser Leu Glu Asp Ala Ile Lys Lys Ala Ile Phe Leu Glu Glu
                165                 170                 175

Val Ala Arg Ile Ala Tyr Phe Ala His Leu Met Thr Thr Pro Ala Pro
            180                 185                 190

Leu Ala Lys Asp Glu Val Glu Arg Leu Tyr Leu Gln Tyr His Thr Lys
        195                 200                 205

Tyr Gly Gln Arg
    210


<210> SEQ ID NO 25
<211> LENGTH: 224
<212> TYPE: PRT
<213> ORGANISM: Thermotoga neapolitana DSM 4359

<400> SEQUENCE: 25

Met Thr Val Arg Leu Pro Ile Lys Glu Val Lys Thr Met Tyr Glu Lys
1               5                   10                  15

Glu Arg Lys Asp Leu Tyr Asp Ala His Met Ile Leu Glu Lys Tyr Gly
            20                  25                  30

Leu Val Ala Tyr Thr Ser Gly Asn Val Ser Val Arg Ile Gly Glu His
        35                  40                  45

Val Leu Ile Lys Pro Ser Gly Val Pro Tyr Thr Val Leu Lys Pro Glu
    50                  55                  60

Asp Phe Val Val Val Asp Leu Glu Gly Asn Val Val Glu Gly Glu Lys
65                  70                  75                  80

Lys Pro Ser Val Asp Thr Ala Thr His Leu Tyr Leu Tyr Arg His Leu
                85                  90                  95

Asp Trp Ala Arg Ser Val Ile His Thr His Ser Thr Phe Ala Met Val
            100                 105                 110

Trp Ala Ile Leu Glu Lys Pro Ile Pro Val Leu Cys Thr Ala His Ala
        115                 120                 125

Asp Val Phe Gly Glu Glu Ile Pro Leu Thr Glu Tyr Ala Pro Val Gly
    130                 135                 140

Ser Glu Ala Ile Gly Lys Ala Val Leu Lys Val Ile Gly Arg Ser Gly
145                 150                 155                 160

Ala Val Leu Leu Arg Lys His Gly Val Met Val Val Gly Thr Ser Ile
                165                 170                 175

Glu Asp Ala Val Lys Lys Ala Ile Phe Leu Glu Glu Val Ala Lys Ala
            180                 185                 190

Ala Tyr Phe Ala Thr Leu Ala Gly Lys Pro Glu Pro Leu Pro Ser Glu
        195                 200                 205

Glu Val Asp Arg Leu Tyr Asn Gln Tyr His Thr Lys Tyr Gly Gln Lys
    210                 215                 220


<210> SEQ ID NO 26
<211> LENGTH: 211
<212> TYPE: PRT
<213> ORGANISM: Pseudothermotoga lettingae

<400> SEQUENCE: 26

Met Tyr Glu Lys Glu Lys Gln Leu Leu Tyr Glu Ala His Leu Thr Leu
```

```
1               5                   10                  15

Glu Lys Tyr Gly Leu Val Ala Tyr Thr Ser Gly Asn Val Ser Leu Arg
            20                  25                  30

Ile Asp Asp Lys Val Leu Ile Lys Pro Ser Gly Val Pro Tyr Ser Ser
        35                  40                  45

Leu Lys Pro Ser Asp Met Val Leu Val Asp Leu Gly Gly Lys Ile Leu
    50                  55                  60

Asp Gly Asn Met Lys Pro Ser Val Asp Thr Ala Thr His Leu Tyr Leu
65                  70                  75                  80

Tyr Arg Asn Ile Asp Trp Ala Arg Thr Ile Ile His Thr His Ser Ala
                85                  90                  95

Phe Ala Thr Ile Phe Ala Val Cys Glu Lys Ser Ile Pro Val Leu Cys
            100                 105                 110

Thr Ala His Ala Asp Val Phe Gly Glu Glu Ile Pro Ile Thr Glu Tyr
        115                 120                 125

Ala Pro Val Gly Ser Glu Ala Ile Gly Lys Ala Val Leu Lys Val Met
    130                 135                 140

Gly Lys Ser Gly Thr Val Leu Leu Arg Lys His Gly Val Ile Val Val
145                 150                 155                 160

Gly Thr Ser Ile Glu Asp Ala Leu Lys Lys Ala Ile Phe Leu Glu Glu
                165                 170                 175

Val Ala Lys Met Ser Tyr Phe Ala Leu Ala Lys Gln Gln Val Thr Pro
            180                 185                 190

Leu Asp Ile Asp Glu Ile Asn Lys Leu His Gln Gln Tyr His Thr Lys
        195                 200                 205

Tyr Gly Gln
    210


<210> SEQ ID NO 27
<211> LENGTH: 229
<212> TYPE: PRT
<213> ORGANISM: Bacillus subtilis 168

<400> SEQUENCE: 27

Met Leu Glu Thr Leu Lys Lys Glu Val Leu Ala Ala Asn Leu Lys Leu
1               5                   10                  15

Gln Glu His Gln Leu Val Thr Phe Thr Trp Gly Asn Val Ser Gly Ile
            20                  25                  30

Asp Arg Glu Lys Glu Arg Ile Val Ile Lys Pro Ser Gly Val Glu Tyr
        35                  40                  45

Ser Asp Leu Thr Ala Asp Asp Leu Val Val Leu Asn Leu Asp Gly Glu
    50                  55                  60

Val Val Glu Gly Ser Leu Lys Pro Ser Ser Asp Thr Pro Thr His Val
65                  70                  75                  80

Tyr Leu Tyr Lys Ala Phe Pro Asn Ile Gly Gly Ile Val His Thr His
                85                  90                  95

Ser Gln Trp Ala Thr Ser Trp Ala Gln Ser Gly Arg Asp Ile Pro Pro
            100                 105                 110

Leu Gly Thr Thr His Ala Asp Tyr Phe Asp Ser Ala Ile Pro Cys Thr
        115                 120                 125

Arg Glu Met Tyr Asp Glu Glu Ile Ile His Asp Tyr Glu Leu Asn Thr
    130                 135                 140

Gly Lys Val Ile Ala Glu Thr Phe Gln His His Asn Tyr Glu Gln Val
145                 150                 155                 160
```

```
Pro Gly Val Leu Val Asn Asn His Gly Pro Phe Cys Trp Gly Thr Asp
                165                 170                 175

Ala Leu Asn Ala Ile His Asn Ala Val Val Leu Glu Thr Val Ala Glu
            180                 185                 190

Met Ala Tyr His Ser Ile Met Leu Asn Lys Asp Val Thr Pro Ile Asn
        195                 200                 205

Thr Val Leu His Glu Lys His Phe Tyr Arg Lys His Gly Ala Asn Ala
    210                 215                 220

Tyr Tyr Gly Gln Ser
225


<210> SEQ ID NO 28
<211> LENGTH: 228
<212> TYPE: PRT
<213> ORGANISM: Geobacillus zalihae

<400> SEQUENCE: 28

Met Leu Glu Glu Leu Lys Arg Ala Val Phe Glu Ala Asn Leu Gln Leu
1               5                   10                  15

Pro Gln Tyr Arg Leu Val Thr Phe Thr Trp Gly Asn Val Ser Gly Ile
            20                  25                  30

Asp Arg Glu Arg Gly Leu Val Val Ile Lys Pro Ser Gly Leu Ala Tyr
        35                  40                  45

Asp Arg Leu Thr Ala Glu Asp Met Val Val Val Asn Leu Asp Gly Glu
    50                  55                  60

Val Val Glu Gly Gln Trp Lys Pro Ser Ser Asp Thr Pro Thr His Leu
65                  70                  75                  80

Trp Leu Tyr Lys Gln Phe Pro Gly Ile Gly Gly Ile Val His Thr His
                85                  90                  95

Ser Thr Trp Ala Thr Val Trp Ala Gln Ala Gly Lys Gly Ile Pro Pro
            100                 105                 110

Leu Gly Thr Thr His Ala Asp Tyr Phe Tyr Gly Glu Ile Pro Cys Thr
        115                 120                 125

Arg Pro Met Thr Asn Glu Glu Ile Gln Gly Ala Tyr Glu Leu Glu Thr
    130                 135                 140

Gly Lys Val Ile Thr Glu Thr Phe Arg Phe Leu Asp Pro Leu Gln Met
145                 150                 155                 160

Pro Gly Val Leu Val His Gly His Gly Pro Phe Ala Trp Gly Lys Asp
                165                 170                 175

Pro Ala Asn Ala Val His Asn Ala Val Val Leu Glu Glu Val Ala Lys
            180                 185                 190

Met Ala Ala Arg Thr Phe Met Leu Asn Pro Asn Val Gln Pro Ile Ser
        195                 200                 205

Gln Ser Leu Leu Asp Arg His Tyr Leu Arg Lys His Gly Val Asn Ala
    210                 215                 220

Tyr Tyr Gly Gln
225


<210> SEQ ID NO 29
<211> LENGTH: 228
<212> TYPE: PRT
<213> ORGANISM: Geobacillus stearothermophilus

<400> SEQUENCE: 29

Met Leu Glu Glu Leu Lys Gln Ala Val Leu Glu Ala Asn Leu Gln Leu
1               5                   10                  15
```

```
Pro Gln Tyr Arg Leu Val Thr Phe Thr Trp Gly Asn Val Ser Gly Ile
            20                  25                  30

Asp Arg Glu Arg Gly Leu Val Val Ile Lys Pro Ser Gly Val Ala Tyr
        35                  40                  45

Asp Lys Leu Thr Ile Asp Asp Met Val Val Val Asp Leu Thr Gly Asn
    50                  55                  60

Val Val Glu Gly Asp Leu Lys Pro Ser Ser Asp Thr Pro Thr His Leu
65                  70                  75                  80

Trp Leu Tyr Lys Gln Phe Pro Gly Ile Gly Gly Ile Val His Thr His
                85                  90                  95

Ser Thr Trp Ala Thr Val Trp Ala Gln Ala Gly Lys Gly Ile Pro Ala
            100                 105                 110

Leu Gly Thr Thr His Ala Asp Tyr Phe Tyr Gly Glu Ile Pro Cys Thr
        115                 120                 125

Arg Pro Met Thr Asn Glu Glu Ile Gln Gly Ala Tyr Glu Leu Glu Thr
    130                 135                 140

Gly Lys Val Ile Thr Glu Thr Phe Arg Phe Leu Asp Pro Leu Gln Met
145                 150                 155                 160

Pro Gly Val Leu Val His Gly His Gly Pro Phe Ala Trp Gly Lys Asp
                165                 170                 175

Pro Ala Asn Ala Val His Asn Ala Val Val Leu Glu Glu Val Ala Lys
            180                 185                 190

Met Ala Ala Arg Thr Phe Met Leu Asn Pro Asp Ala Gln Pro Ile Ser
        195                 200                 205

Gln Thr Leu Leu Asp Arg His Tyr Leu Arg Lys His Gly Ala Asn Ala
    210                 215                 220

Tyr Tyr Gly Gln
225


<210> SEQ ID NO 30
<211> LENGTH: 228
<212> TYPE: PRT
<213> ORGANISM: Parageobacillus thermoglucosidasius

<400> SEQUENCE: 30

Met Leu Glu Glu Leu Lys Gln Val Val Leu Glu Ala Asn Leu Gln Leu
1               5                   10                  15

Pro Lys Tyr Arg Leu Val Thr Phe Thr Trp Gly Asn Val Ser Gly Ile
            20                  25                  30

Asp Arg Glu Lys Gly Leu Val Val Ile Lys Pro Ser Gly Val Glu Tyr
        35                  40                  45

Gly Lys Leu Thr Arg Asp Asp Met Val Val Val Asp Leu Glu Gly Asn
    50                  55                  60

Val Val Glu Gly Tyr Leu Lys Pro Ser Ser Asp Thr Pro Thr His Leu
65                  70                  75                  80

Leu Leu Tyr Lys Glu Phe Pro Gln Ile Gly Gly Val Val His Thr His
                85                  90                  95

Ser Pro Trp Ala Thr Val Trp Ala Gln Ala Gly Lys Gly Ile Pro Ala
            100                 105                 110

Leu Gly Thr Thr His Ala Asp Tyr Phe Tyr Gly Glu Ile Pro Cys Thr
        115                 120                 125

Arg Lys Met Thr Asp Ala Glu Ile Gln Gly Ala Tyr Glu Glu Glu Thr
    130                 135                 140

Gly Lys Val Ile Val Glu Thr Phe Arg Leu Leu Asp Pro Met Gln Lys
145                 150                 155                 160
```

```
Pro Gly Val Leu Val Tyr Gly His Gly Pro Phe Ala Trp Gly Lys Asn
                165                 170                 175

Pro Tyr Asp Ala Val His Asn Ala Val Val Leu Glu Glu Val Ala Lys
            180                 185                 190

Leu Ala Ala Arg Thr Tyr Tyr Leu Asn Pro Ser Val Glu Pro Ile Asp
        195                 200                 205

Gln Ser Leu Leu Asp Arg His Tyr Phe Arg Lys His Gly Ala Asn Ala
    210                 215                 220

Tyr Tyr Gly Gln
225


<210> SEQ ID NO 31
<211> LENGTH: 213
<212> TYPE: PRT
<213> ORGANISM: Thermoanaerobacterium thermosaccharolyticum

<400> SEQUENCE: 31

Met Leu Glu Asn Leu Lys Gln Arg Val Tyr Lys Met Asn Met Met Leu
1               5                   10                  15

Pro Lys Asn Asn Leu Val Thr Met Thr Ser Gly Asn Val Ser Gly Arg
            20                  25                  30

Asp Pro Glu Thr Asn Leu Val Val Ile Lys Pro Ser Gly Val Leu Tyr
        35                  40                  45

Asp Asp Met Thr Pro Asp Asp Met Val Val Val Asp Leu Asp Gly Asn
    50                  55                  60

Val Val Glu Gly Lys Leu Lys Pro Ser Val Asp Thr Ala Thr His Leu
65                  70                  75                  80

Tyr Val Tyr Lys His Arg Ser Asp Val Asn Gly Ile Val His Thr His
                85                  90                  95

Ser Pro Tyr Ala Thr Ser Phe Ala Ala Leu Gly Arg Ser Ile Pro Val
            100                 105                 110

Tyr Leu Thr Ala Ile Ala Asp Glu Phe Gly Cys Ala Ile Pro Val Gly
        115                 120                 125

Pro Tyr Ala Lys Ile Gly Gly Glu Glu Ile Gly Lys Val Ile Val Glu
    130                 135                 140

Tyr Ile Gly Glu Ser Pro Ala Ile Leu Met Lys Asn His Gly Val Phe
145                 150                 155                 160

Thr Ile Gly Asn Ser Pro Glu Ala Ala Leu Lys Ala Ala Val Met Val
                165                 170                 175

Glu Asp Thr Ala Lys Thr Val His Leu Ser Leu Leu Leu Gly Thr Pro
            180                 185                 190

Asp Val Ile Pro Asp Glu Glu Val Lys Arg Ala His Glu Arg Tyr Met
        195                 200                 205

Thr Lys Tyr Gly Gln
    210


<210> SEQ ID NO 32
<211> LENGTH: 231
<212> TYPE: PRT
<213> ORGANISM: Escherichia coli K-12 MG1655

<400> SEQUENCE: 32

Met Leu Glu Asp Leu Lys Arg Gln Val Leu Glu Ala Asn Leu Ala Leu
1               5                   10                  15

Pro Lys His Asn Leu Val Thr Leu Thr Trp Gly Asn Val Ser Ala Val
            20                  25                  30
```

```
Asp Arg Glu Arg Gly Val Phe Val Ile Lys Pro Ser Gly Val Asp Tyr
        35                  40                  45

Ser Val Met Thr Ala Asp Asp Met Val Val Val Ser Ile Glu Thr Gly
    50                  55                  60

Glu Val Val Glu Gly Thr Lys Lys Pro Ser Ser Asp Thr Pro Thr His
65                  70                  75                  80

Arg Leu Leu Tyr Gln Ala Phe Pro Ser Ile Gly Gly Ile Val His Thr
                85                  90                  95

His Ser Arg His Ala Thr Ile Trp Ala Gln Ala Gly Gln Ser Ile Pro
            100                 105                 110

Ala Thr Gly Thr Thr His Ala Asp Tyr Phe Tyr Gly Thr Ile Pro Cys
        115                 120                 125

Thr Arg Lys Met Thr Asp Ala Glu Ile Asn Gly Glu Tyr Glu Trp Glu
    130                 135                 140

Thr Gly Asn Val Ile Val Glu Thr Phe Glu Lys Gln Gly Ile Asp Ala
145                 150                 155                 160

Ala Gln Met Pro Gly Val Leu Val His Ser His Gly Pro Phe Ala Trp
                165                 170                 175

Gly Lys Asn Ala Glu Asp Ala Val His Asn Ala Ile Val Leu Glu Glu
            180                 185                 190

Val Ala Tyr Met Gly Ile Phe Cys Arg Gln Leu Ala Pro Gln Leu Pro
        195                 200                 205

Asp Met Gln Gln Thr Leu Leu Asp Lys His Tyr Leu Arg Lys His Gly
    210                 215                 220

Ala Lys Ala Tyr Tyr Gly Gln
225                 230
```

<210> SEQ ID NO 33
<211> LENGTH: 481
<212> TYPE: PRT
<213> ORGANISM: Artificial Sequence
<220> FEATURE:
<223> OTHER INFORMATION: synthetic

<400> SEQUENCE: 33

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Leu Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160
```

```
Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 34
<211> LENGTH: 481
<212> TYPE: PRT
<213> ORGANISM: Artificial Sequence
<220> FEATURE:
<223> OTHER INFORMATION: synthetic

<400> SEQUENCE: 34

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30
```

```
Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Cys Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
```

```
    450                 455                 460

Tyr Glu Thr Val Ala Lys His Ile Lys Arg His Val Asp Leu Leu Glu
465                 470                 475                 480

Gly


<210> SEQ ID NO 35
<211> LENGTH: 481
<212> TYPE: PRT
<213> ORGANISM: Artificial Sequence
<220> FEATURE:
<223> OTHER INFORMATION: synthetic

<400> SEQUENCE: 35

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Tyr Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335
```

```
Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 36
<211> LENGTH: 481
<212> TYPE: PRT
<213> ORGANISM: Artificial Sequence
<220> FEATURE:
<223> OTHER INFORMATION: synthetic

<400> SEQUENCE: 36

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Asp Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205
```

```
Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 37
<211> LENGTH: 481
<212> TYPE: PRT
<213> ORGANISM: Artificial Sequence
<220> FEATURE:
<223> OTHER INFORMATION: synthetic

<400> SEQUENCE: 37

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
```

```
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Gln Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 38
<211> LENGTH: 481

<212> TYPE: PRT
<213> ORGANISM: Artificial Sequence
<220> FEATURE:
<223> OTHER INFORMATION: synthetic

<400> SEQUENCE: 38

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Glu Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380
```

```
Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 39
<211> LENGTH: 481
<212> TYPE: PRT
<213> ORGANISM: Artificial Sequence
<220> FEATURE:
<223> OTHER INFORMATION: synthetic

<400> SEQUENCE: 39

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Thr Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
```

```
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 40
<211> LENGTH: 481
<212> TYPE: PRT
<213> ORGANISM: Artificial Sequence
<220> FEATURE:
<223> OTHER INFORMATION: synthetic

<400> SEQUENCE: 40

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Asn Val Arg Glu
        115                 120                 125

Asn Glu Arg Thr Gly Arg Thr Trp Arg Asp Val Leu Asp Asp Ala Thr
    130                 135                 140
```

Trp Gly Val Phe Gln Glu Gly Tyr Ser Glu Gly Phe Gly Ala Asp Ala
145 150 155 160

Asp His Val Lys Arg Pro Glu Asp Leu Val Ser Ala Ala Arg Glu Gly
165 170 175

Phe Thr Met Phe Thr Ile Asp Pro Ser Asp His Val Arg Asn Leu Ser
180 185 190

Lys Leu Thr Glu Lys Glu Arg Asn Glu Lys Phe Glu Glu Ile Leu Arg
195 200 205

Lys Glu Arg Ile Asp Arg Ile Tyr Leu Gly Lys Lys Tyr Ser Val Leu
210 215 220

Gly Glu Lys Ile Glu Phe Asp Glu Lys Asn Leu Arg Asp Ala Ala Leu
225 230 235 240

Val Tyr Tyr Asp Ala Ile Ala His Val Asp Met Met Tyr Gln Ile Leu
245 250 255

Lys Asp Glu Thr Pro Asp Phe Asp Phe Glu Val Ser Val Asp Glu Thr
260 265 270

Glu Thr Pro Thr Ser Pro Leu Phe His Ile Phe Val Val Glu Glu Leu
275 280 285

Arg Arg Arg Gly Val Glu Phe Thr Asn Leu Ala Leu Arg Phe Ile Gly
290 295 300

Glu Trp Glu Lys Gly Ile Asp Tyr Lys Gly Asp Leu Ala Gln Phe Glu
305 310 315 320

Arg Glu Ile Lys Met His Ala Glu Ile Ala Arg Met Phe Glu Gly Tyr
325 330 335

Lys Ile Ser Leu His Ser Gly Ser Asp Lys Phe Ser Val Tyr Pro Ala
340 345 350

Phe Ala Ser Ala Thr Gly Gly Leu Phe His Val Lys Thr Ala Gly Thr
355 360 365

Ser Tyr Leu Glu Ala Val Lys Val Ile Ser Met Val Asn Pro Glu Leu
370 375 380

Phe Arg Glu Ile Tyr Arg Cys Thr Leu Asp His Phe Glu Glu Asp Arg
385 390 395 400

Lys Ser Tyr His Ile Ser Ala Asp Leu Ser Lys Val Pro Glu Val Glu
405 410 415

Lys Val Lys Asp Glu Asp Leu Pro Gly Leu Phe Glu Asp Ile Asn Val
420 425 430

Arg Gln Leu Ile His Val Thr Tyr Gly Ser Val Leu Lys Asp Ala Ser
435 440 445

Leu Lys Glu Arg Leu Phe Lys Thr Leu Glu Gln Asn Glu Glu Leu Phe
450 455 460

Tyr Glu Thr Val Ala Lys His Ile Lys Arg His Val Asp Leu Leu Glu
465 470 475 480

Gly

<210> SEQ ID NO 41
<211> LENGTH: 481
<212> TYPE: PRT
<213> ORGANISM: Artificial Sequence
<220> FEATURE:
<223> OTHER INFORMATION: synthetic

<400> SEQUENCE: 41

Met Val Leu Lys Val Phe Lys Asp His Phe Gly Arg Gly Tyr Glu Val
1 5 10 15

```
Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Thr Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
```

```
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 42
<211> LENGTH: 481
<212> TYPE: PRT
<213> ORGANISM: Artificial Sequence
<220> FEATURE:
<223> OTHER INFORMATION: synthetic

<400> SEQUENCE: 42

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Asp Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320
```

```
Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 43
<211> LENGTH: 481
<212> TYPE: PRT
<213> ORGANISM: Artificial Sequence
<220> FEATURE:
<223> OTHER INFORMATION: synthetic

<400> SEQUENCE: 43

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Glu Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190
```

```
Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 44
<211> LENGTH: 481
<212> TYPE: PRT
<213> ORGANISM: Artificial Sequence
<220> FEATURE:
<223> OTHER INFORMATION: synthetic

<400> SEQUENCE: 44

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
```

-continued

```
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Ser Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 45
<211> LENGTH: 481
<212> TYPE: PRT
<213> ORGANISM: Artificial Sequence
<220> FEATURE:
<223> OTHER INFORMATION: synthetic

<400> SEQUENCE: 45

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Ala His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365
```

```
Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 46
<211> LENGTH: 481
<212> TYPE: PRT
<213> ORGANISM: Artificial Sequence
<220> FEATURE:
<223> OTHER INFORMATION: synthetic

<400> SEQUENCE: 46

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
```

```
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 47
<211> LENGTH: 481
<212> TYPE: PRT
<213> ORGANISM: Artificial Sequence
<220> FEATURE:
<223> OTHER INFORMATION: synthetic

<400> SEQUENCE: 47

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125
```

```
Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Arg Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 48
<211> LENGTH: 481
<212> TYPE: PRT
<213> ORGANISM: Artificial Sequence
<220> FEATURE:
<223> OTHER INFORMATION: synthetic

<400> SEQUENCE: 48
```

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Ser Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
```

```
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 49
<211> LENGTH: 481
<212> TYPE: PRT
<213> ORGANISM: Artificial Sequence
<220> FEATURE:
<223> OTHER INFORMATION: synthetic

<400> SEQUENCE: 49

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Ile Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300
```

Glu Trp Glu Lys Gly Ile Asp Tyr Lys Gly Asp Leu Ala Gln Phe Glu
305 310 315 320

Arg Glu Ile Lys Met His Ala Glu Ile Ala Arg Met Phe Glu Gly Tyr
325 330 335

Lys Ile Ser Leu His Ser Gly Ser Asp Lys Phe Ser Val Tyr Pro Ala
340 345 350

Phe Ala Ser Ala Thr Gly Gly Leu Phe His Val Lys Thr Ala Gly Thr
355 360 365

Ser Tyr Leu Glu Ala Val Lys Val Ile Ser Met Val Asn Pro Glu Leu
370 375 380

Phe Arg Glu Ile Tyr Arg Cys Thr Leu Asp His Phe Glu Glu Asp Arg
385 390 395 400

Lys Ser Tyr His Ile Ser Ala Asp Leu Ser Lys Val Pro Glu Val Glu
405 410 415

Lys Val Lys Asp Glu Asp Leu Pro Gly Leu Phe Glu Asp Ile Asn Val
420 425 430

Arg Gln Leu Ile His Val Thr Tyr Gly Ser Val Leu Lys Asp Ala Ser
435 440 445

Leu Lys Glu Arg Leu Phe Lys Thr Leu Glu Gln Asn Glu Glu Leu Phe
450 455 460

Tyr Glu Thr Val Ala Lys His Ile Lys Arg His Val Asp Leu Leu Glu
465 470 475 480

Gly

<210> SEQ ID NO 50
<211> LENGTH: 481
<212> TYPE: PRT
<213> ORGANISM: Artificial Sequence
<220> FEATURE:
<223> OTHER INFORMATION: synthetic

<400> SEQUENCE: 50

Met Val Leu Lys Val Phe Lys Asp His Phe Gly Arg Gly Tyr Glu Val
1 5 10 15

Tyr Glu Lys Ser Tyr Arg Glu Lys Asp Ser Leu Ser Phe Phe Leu Thr
20 25 30

Lys Glu Glu Glu Gly Lys Ile Leu Val Val Ala Gly Glu Lys Ala Pro
35 40 45

Glu Gly Leu Ser Phe Phe Lys Lys Gln Arg Ala Glu Gly Val Ser Phe
50 55 60

Phe Phe Cys Glu Arg Asn His Glu Asn Leu Glu Val Leu Arg Lys Tyr
65 70 75 80

Phe Pro Asp Leu Lys Pro Val Arg Ala Gly Leu Arg Ala Ser Phe Gly
85 90 95

Thr Gly Asp Arg Leu Gly Ile Thr Thr Pro Ala His Val Arg Ala Leu
100 105 110

Lys Asp Ser Gly Leu Phe Pro Ile Phe Ala Gln Gln Ser Val Arg Glu
115 120 125

Asn Glu Arg Thr Gly Arg Thr Trp Arg Asp Val Leu Asp Asp Ala Thr
130 135 140

Trp Gly Val Phe Gln Glu Gly Tyr Ser Glu Gly Phe Gly Ala Asp Ala
145 150 155 160

Asp His Met Lys Arg Pro Glu Asp Leu Val Ser Ala Ala Arg Glu Gly
165 170 175

```
Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 51
<211> LENGTH: 481
<212> TYPE: PRT
<213> ORGANISM: Artificial Sequence
<220> FEATURE:
<223> OTHER INFORMATION: synthetic

<400> SEQUENCE: 51

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
```

```
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Ala Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480
```

Gly

<210> SEQ ID NO 52
<211> LENGTH: 481
<212> TYPE: PRT
<213> ORGANISM: Artificial Sequence
<220> FEATURE:
<223> OTHER INFORMATION: synthetic

<400> SEQUENCE: 52

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350
```

```
Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 53
<211> LENGTH: 481
<212> TYPE: PRT
<213> ORGANISM: Artificial Sequence
<220> FEATURE:
<223> OTHER INFORMATION: synthetic

<400> SEQUENCE: 53

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
```

```
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Leu Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 54
<211> LENGTH: 481
<212> TYPE: PRT
<213> ORGANISM: Artificial Sequence
<220> FEATURE:
<223> OTHER INFORMATION: synthetic

<400> SEQUENCE: 54

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110
```

Lys Asp Ser Gly Leu Phe Pro Ile Phe Ala Gln Gln Ser Val Arg Glu
115 120 125

Asn Glu Arg Thr Gly Arg Thr Trp Arg Asp Val Leu Asp Asp Ala Thr
130 135 140

Trp Gly Val Phe Gln Glu Gly Tyr Ser Glu Gly Phe Gly Ala Asp Ala
145 150 155 160

Asp His Val Lys Arg Pro Glu Asp Leu Val Ser Ala Ala Arg Glu Gly
165 170 175

Phe Thr Met Phe Thr Ile Asp Pro Ser Asp His Val Arg Asn Leu Ser
180 185 190

Lys Leu Thr Glu Lys Glu Arg Asn Glu Lys Phe Glu Glu Ile Leu Arg
195 200 205

Lys Glu Arg Ile Asp Arg Ile Tyr Leu Gly Lys Lys Tyr Ser Val Leu
210 215 220

Gly Glu Lys Ile Glu Phe Asp Glu Lys Asn Leu Arg Asp Ala Ala Leu
225 230 235 240

Val Tyr Tyr Asp Ala Ile Ala His Val Asp Met Met Tyr Gln Ile Leu
245 250 255

Lys Asp Glu Thr Pro Asp Phe Asp Phe Glu Met Ser Val Asp Glu Thr
260 265 270

Glu Thr Pro Thr Ser Pro Leu Phe His Ile Phe Val Val Glu Glu Leu
275 280 285

Arg Arg Arg Gly Val Glu Phe Thr Asn Leu Ala Leu Arg Phe Ile Gly
290 295 300

Glu Trp Glu Lys Gly Ile Asp Tyr Lys Gly Asp Leu Ala Gln Phe Glu
305 310 315 320

Arg Glu Ile Lys Met His Ala Glu Ile Ala Arg Met Phe Glu Gly Tyr
325 330 335

Lys Ile Ser Leu His Ser Gly Ser Asp Lys Phe Ser Val Tyr Pro Ala
340 345 350

Phe Ala Ser Ala Thr Gly Gly Leu Phe His Val Lys Thr Ala Gly Thr
355 360 365

Ser Tyr Leu Glu Ala Val Lys Val Ile Ser Met Val Asn Pro Glu Leu
370 375 380

Phe Arg Glu Ile Tyr Arg Cys Thr Leu Asp His Phe Glu Glu Asp Arg
385 390 395 400

Lys Ser Tyr His Ile Ser Ala Asp Leu Ser Lys Val Pro Glu Val Glu
405 410 415

Lys Val Lys Asp Glu Asp Leu Pro Gly Leu Phe Glu Asp Ile Asn Val
420 425 430

Arg Gln Leu Ile His Val Thr Tyr Gly Ser Val Leu Lys Asp Ala Ser
435 440 445

Leu Lys Glu Arg Leu Phe Lys Thr Leu Glu Gln Asn Glu Glu Leu Phe
450 455 460

Tyr Glu Thr Val Ala Lys His Ile Lys Arg His Val Asp Leu Leu Glu
465 470 475 480

Gly

<210> SEQ ID NO 55
<211> LENGTH: 481
<212> TYPE: PRT
<213> ORGANISM: Artificial Sequence
<220> FEATURE:
<223> OTHER INFORMATION: synthetic

<400> SEQUENCE: 55

Met Val Leu Lys Val Phe Lys Asp His Phe Gly Arg Gly Tyr Glu Val
1 5 10 15

Tyr Glu Lys Ser Tyr Arg Glu Lys Asp Ser Leu Ser Phe Phe Leu Thr
20 25 30

Lys Glu Glu Glu Gly Lys Ile Leu Val Val Ala Gly Glu Lys Ala Pro
35 40 45

Glu Gly Leu Ser Phe Phe Lys Lys Gln Arg Ala Glu Gly Val Ser Phe
50 55 60

Phe Phe Cys Glu Arg Asn His Glu Asn Leu Glu Val Leu Arg Lys Tyr
65 70 75 80

Phe Pro Asp Leu Lys Pro Val Arg Ala Gly Leu Arg Ala Ser Phe Gly
85 90 95

Thr Gly Asp Arg Leu Gly Ile Thr Thr Pro Ala His Val Arg Ala Leu
100 105 110

Lys Asp Ser Gly Leu Phe Pro Ile Phe Ala Gln Gln Ser Val Arg Glu
115 120 125

Asn Glu Arg Thr Gly Arg Thr Trp Arg Asp Val Leu Asp Asp Ala Thr
130 135 140

Trp Gly Val Phe Gln Glu Gly Tyr Ser Glu Gly Phe Gly Ala Asp Ala
145 150 155 160

Asp His Val Lys Arg Pro Glu Asp Leu Val Ser Ala Ala Arg Glu Gly
165 170 175

Phe Thr Met Phe Thr Ile Asp Pro Ser Asp His Val Arg Asn Leu Ser
180 185 190

Lys Leu Thr Glu Lys Glu Arg Asn Glu Lys Phe Glu Glu Ile Leu Arg
195 200 205

Lys Glu Arg Ile Asp Arg Ile Tyr Leu Gly Lys Lys Tyr Ser Val Leu
210 215 220

Gly Glu Lys Ile Glu Phe Asp Glu Lys Asn Leu Arg Asp Ala Ala Leu
225 230 235 240

Val Tyr Tyr Asp Ala Ile Ala His Val Asp Met Met Tyr Gln Ile Leu
245 250 255

Lys Asp Glu Thr Pro Asp Phe Asp Phe Glu Val Ser Val Asp Glu Thr
260 265 270

Glu Thr Pro Thr Ser Pro Leu Phe His Ile Phe Val Val Glu Glu Leu
275 280 285

Arg Arg Arg Gly Val Glu Phe Thr Phe Leu Ala Leu Arg Phe Ile Gly
290 295 300

Glu Trp Glu Lys Gly Ile Asp Tyr Lys Gly Asp Leu Ala Gln Phe Glu
305 310 315 320

Arg Glu Ile Lys Met His Ala Glu Ile Ala Arg Met Phe Glu Gly Tyr
325 330 335

Lys Ile Ser Leu His Ser Gly Ser Asp Lys Phe Ser Val Tyr Pro Ala
340 345 350

Phe Ala Ser Ala Thr Gly Gly Leu Phe His Val Lys Thr Ala Gly Thr
355 360 365

Ser Tyr Leu Glu Ala Val Lys Val Ile Ser Met Val Asn Pro Glu Leu
370 375 380

Phe Arg Glu Ile Tyr Arg Cys Thr Leu Asp His Phe Glu Glu Asp Arg
385 390 395 400

Lys Ser Tyr His Ile Ser Ala Asp Leu Ser Lys Val Pro Glu Val Glu

```
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 56
<211> LENGTH: 481
<212> TYPE: PRT
<213> ORGANISM: Artificial Sequence
<220> FEATURE:
<223> OTHER INFORMATION: synthetic

<400> SEQUENCE: 56

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285
```

```
Arg Arg Arg Gly Val Glu Phe Thr Tyr Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 57
<211> LENGTH: 481
<212> TYPE: PRT
<213> ORGANISM: Artificial Sequence
<220> FEATURE:
<223> OTHER INFORMATION: synthetic

<400> SEQUENCE: 57

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160
```

```
Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Lys Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 58
<211> LENGTH: 481
<212> TYPE: PRT
<213> ORGANISM: Artificial Sequence
<220> FEATURE:
<223> OTHER INFORMATION: synthetic

<400> SEQUENCE: 58

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
```

```
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Ser Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460
```

Tyr Glu Thr Val Ala Lys His Ile Lys Arg His Val Asp Leu Leu Glu
465 470 475 480

Gly

<210> SEQ ID NO 59
<211> LENGTH: 481
<212> TYPE: PRT
<213> ORGANISM: Artificial Sequence
<220> FEATURE:
<223> OTHER INFORMATION: synthetic

<400> SEQUENCE: 59

Met Val Leu Lys Val Phe Lys Asp His Phe Gly Arg Gly Tyr Glu Val
1 5 10 15

Tyr Glu Lys Ser Tyr Arg Glu Lys Asp Ser Leu Ser Phe Phe Leu Thr
20 25 30

Lys Glu Glu Glu Gly Lys Ile Leu Val Val Ala Gly Glu Lys Ala Pro
35 40 45

Glu Gly Leu Ser Phe Phe Lys Lys Gln Arg Ala Glu Gly Val Ser Phe
50 55 60

Phe Phe Cys Glu Arg Asn His Glu Asn Leu Glu Val Leu Arg Lys Tyr
65 70 75 80

Phe Pro Asp Leu Lys Pro Val Arg Ala Gly Leu Arg Ala Ser Phe Gly
85 90 95

Thr Gly Asp Arg Leu Gly Ile Thr Thr Pro Ala His Val Arg Ala Leu
100 105 110

Lys Asp Ser Gly Leu Phe Pro Ile Phe Ala Gln Gln Ser Val Arg Glu
115 120 125

Asn Glu Arg Thr Gly Arg Thr Trp Arg Asp Val Leu Asp Asp Ala Thr
130 135 140

Trp Gly Val Phe Gln Glu Gly Tyr Ser Glu Gly Phe Gly Ala Asp Ala
145 150 155 160

Asp His Val Lys Arg Pro Glu Asp Leu Val Ser Ala Ala Arg Glu Gly
165 170 175

Phe Thr Met Phe Thr Ile Asp Pro Ser Asp His Val Arg Asn Leu Ser
180 185 190

Lys Leu Thr Glu Lys Glu Arg Asn Glu Lys Phe Glu Glu Ile Leu Arg
195 200 205

Lys Glu Arg Ile Asp Arg Ile Tyr Leu Gly Lys Lys Tyr Ser Val Leu
210 215 220

Gly Glu Lys Ile Glu Phe Asp Glu Lys Asn Leu Arg Asp Ala Ala Leu
225 230 235 240

Val Tyr Tyr Asp Ala Ile Ala His Val Asp Met Met Tyr Gln Ile Leu
245 250 255

Lys Asp Glu Thr Pro Asp Phe Asp Phe Glu Val Ser Val Asp Glu Thr
260 265 270

Glu Thr Pro Thr Ser Pro Leu Phe His Ile Phe Val Val Glu Glu Leu
275 280 285

Arg Arg Arg Gly Val Glu Phe Thr Asn Leu Ala Leu Arg Phe Ile Gly
290 295 300

Glu Met Glu Lys Gly Ile Asp Tyr Lys Gly Asp Leu Ala Gln Phe Glu
305 310 315 320

Arg Glu Ile Lys Met His Ala Glu Ile Ala Arg Met Phe Glu Gly Tyr
325 330 335

```
Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 60
<211> LENGTH: 481
<212> TYPE: PRT
<213> ORGANISM: Artificial Sequence
<220> FEATURE:
<223> OTHER INFORMATION: synthetic

<400> SEQUENCE: 60

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
```

```
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Thr Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 61
<211> LENGTH: 481
<212> TYPE: PRT
<213> ORGANISM: Artificial Sequence
<220> FEATURE:
<223> OTHER INFORMATION: synthetic

<400> SEQUENCE: 61

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95
```

```
Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Lys Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly

<210> SEQ ID NO 62
<211> LENGTH: 481
<212> TYPE: PRT
```

<213> ORGANISM: Artificial Sequence
<220> FEATURE:
<223> OTHER INFORMATION: synthetic

<400> SEQUENCE: 62

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Asp Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
```

```
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 63
<211> LENGTH: 481
<212> TYPE: PRT
<213> ORGANISM: Artificial Sequence
<220> FEATURE:
<223> OTHER INFORMATION: synthetic

<400> SEQUENCE: 63

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270
```

Glu Thr Pro Thr Ser Pro Leu Phe His Ile Phe Val Val Glu Glu Leu
275 280 285

Arg Arg Arg Gly Val Glu Phe Thr Asn Leu Ala Leu Arg Phe Ile Gly
290 295 300

Glu Trp Glu Lys Gly Ile Asp Tyr Lys Gly Asp Leu Ala Gln Phe Glu
305 310 315 320

Arg Glu Ile Lys Met His Ala Glu Ile Ala Arg Met Phe Glu Gly Tyr
325 330 335

Lys Ile Ser Leu His Ser Gly Ser Asp Lys Phe Ser Val Tyr Pro Ala
340 345 350

Phe Ala Ser Ala Thr Gly Gly Leu Phe His Val Lys Thr Ala Gly Thr
355 360 365

Ser Tyr Leu Glu Ala Val Lys Val Ile Ser Met Val Asn Pro Glu Leu
370 375 380

Phe Arg Glu Ile Tyr Arg Cys Thr Leu Met His Phe Glu Glu Asp Arg
385 390 395 400

Lys Ser Tyr His Ile Ser Ala Asp Leu Ser Lys Val Pro Glu Val Glu
405 410 415

Lys Val Lys Asp Glu Asp Leu Pro Gly Leu Phe Glu Asp Ile Asn Val
420 425 430

Arg Gln Leu Ile His Val Thr Tyr Gly Ser Val Leu Lys Asp Ala Ser
435 440 445

Leu Lys Glu Arg Leu Phe Lys Thr Leu Glu Gln Asn Glu Glu Leu Phe
450 455 460

Tyr Glu Thr Val Ala Lys His Ile Lys Arg His Val Asp Leu Leu Glu
465 470 475 480

Gly

<210> SEQ ID NO 64
<211> LENGTH: 481
<212> TYPE: PRT
<213> ORGANISM: Artificial Sequence
<220> FEATURE:
<223> OTHER INFORMATION: synthetic

<400> SEQUENCE: 64

Met Val Leu Lys Val Phe Lys Asp His Phe Gly Arg Gly Tyr Glu Val
1 5 10 15

Tyr Glu Lys Ser Tyr Arg Glu Lys Asp Ser Leu Ser Phe Phe Leu Thr
20 25 30

Lys Glu Glu Glu Gly Lys Ile Leu Val Val Ala Gly Glu Lys Ala Pro
35 40 45

Glu Gly Leu Ser Phe Phe Lys Lys Gln Arg Ala Glu Gly Val Ser Phe
50 55 60

Phe Phe Cys Glu Arg Asn His Glu Asn Leu Glu Val Leu Arg Lys Tyr
65 70 75 80

Phe Pro Asp Leu Lys Pro Val Arg Ala Gly Leu Arg Ala Ser Phe Gly
85 90 95

Thr Gly Asp Arg Leu Gly Ile Thr Thr Pro Ala His Val Arg Ala Leu
100 105 110

Lys Asp Ser Gly Leu Phe Pro Ile Phe Ala Gln Gln Ser Val Arg Glu
115 120 125

Asn Glu Arg Thr Gly Arg Thr Trp Arg Asp Val Leu Asp Asp Ala Thr
130 135 140

```
Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Leu Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 65
<211> LENGTH: 481
<212> TYPE: PRT
<213> ORGANISM: Artificial Sequence
<220> FEATURE:
<223> OTHER INFORMATION: synthetic

<400> SEQUENCE: 65

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
```

```
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Val Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445
```

```
Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 66
<211> LENGTH: 481
<212> TYPE: PRT
<213> ORGANISM: Artificial Sequence
<220> FEATURE:
<223> OTHER INFORMATION: synthetic

<400> SEQUENCE: 66

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320
```

```
Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Phe Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 67
<211> LENGTH: 481
<212> TYPE: PRT
<213> ORGANISM: Artificial Sequence
<220> FEATURE:
<223> OTHER INFORMATION: synthetic

<400> SEQUENCE: 67

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
```

```
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Cys Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 68
<211> LENGTH: 481
<212> TYPE: PRT
<213> ORGANISM: Artificial Sequence
<220> FEATURE:
<223> OTHER INFORMATION: synthetic

<400> SEQUENCE: 68

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80
```

```
Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Tyr Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 69
<211> LENGTH: 481
<212> TYPE: PRT
<213> ORGANISM: Artificial Sequence
<220> FEATURE:
<223> OTHER INFORMATION: synthetic

<400> SEQUENCE: 69

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
```

```
    370                 375                 380

Phe Arg Glu Ile Tyr Arg Cys Thr Leu Asp His Phe Glu Glu Asp Arg
385                 390                 395                 400

Lys Ser Thr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 70
<211> LENGTH: 481
<212> TYPE: PRT
<213> ORGANISM: Artificial Sequence
<220> FEATURE:
<223> OTHER INFORMATION: synthetic

<400> SEQUENCE: 70

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255
```

Lys Asp Glu Thr Pro Asp Phe Asp Phe Glu Val Ser Val Asp Glu Thr
260 265 270

Glu Thr Pro Thr Ser Pro Leu Phe His Ile Phe Val Val Glu Glu Leu
275 280 285

Arg Arg Arg Gly Val Glu Phe Thr Asn Leu Ala Leu Arg Phe Ile Gly
290 295 300

Glu Trp Glu Lys Gly Ile Asp Tyr Lys Gly Asp Leu Ala Gln Phe Glu
305 310 315 320

Arg Glu Ile Lys Met His Ala Glu Ile Ala Arg Met Phe Glu Gly Tyr
325 330 335

Lys Ile Ser Leu His Ser Gly Ser Asp Lys Phe Ser Val Tyr Pro Ala
340 345 350

Phe Ala Ser Ala Thr Gly Gly Leu Phe His Val Lys Thr Ala Gly Thr
355 360 365

Ser Tyr Leu Glu Ala Val Lys Val Ile Ser Met Val Asn Pro Glu Leu
370 375 380

Phe Arg Glu Ile Tyr Arg Cys Thr Leu Asp His Phe Glu Glu Asp Arg
385 390 395 400

Lys Ser Ile His Ile Ser Ala Asp Leu Ser Lys Val Pro Glu Val Glu
405 410 415

Lys Val Lys Asp Glu Asp Leu Pro Gly Leu Phe Glu Asp Ile Asn Val
420 425 430

Arg Gln Leu Ile His Val Thr Tyr Gly Ser Val Leu Lys Asp Ala Ser
435 440 445

Leu Lys Glu Arg Leu Phe Lys Thr Leu Glu Gln Asn Glu Glu Leu Phe
450 455 460

Tyr Glu Thr Val Ala Lys His Ile Lys Arg His Val Asp Leu Leu Glu
465 470 475 480

Gly

<210> SEQ ID NO 71
<211> LENGTH: 481
<212> TYPE: PRT
<213> ORGANISM: Artificial Sequence
<220> FEATURE:
<223> OTHER INFORMATION: synthetic

<400> SEQUENCE: 71

Met Val Leu Lys Val Phe Lys Asp His Phe Gly Arg Gly Tyr Glu Val
1 5 10 15

Tyr Glu Lys Ser Tyr Arg Glu Lys Asp Ser Leu Ser Phe Phe Leu Thr
20 25 30

Lys Glu Glu Glu Gly Lys Ile Leu Val Val Ala Gly Glu Lys Ala Pro
35 40 45

Glu Gly Leu Ser Phe Phe Lys Lys Gln Arg Ala Glu Gly Val Ser Phe
50 55 60

Phe Phe Cys Glu Arg Asn His Glu Asn Leu Glu Val Leu Arg Lys Tyr
65 70 75 80

Phe Pro Asp Leu Lys Pro Val Arg Ala Gly Leu Arg Ala Ser Phe Gly
85 90 95

Thr Gly Asp Arg Leu Gly Ile Thr Thr Pro Ala His Val Arg Ala Leu
100 105 110

Lys Asp Ser Gly Leu Phe Pro Ile Phe Ala Gln Gln Ser Val Arg Glu
115 120 125

```
Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 72
<211> LENGTH: 481
<212> TYPE: PRT
<213> ORGANISM: Artificial Sequence
<220> FEATURE:
<223> OTHER INFORMATION: synthetic

<400> SEQUENCE: 72

```
Met Val Leu Lys Val Phe Lys Asp His Phe Gly Arg Gly Tyr Glu Val
```

```
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Phe His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430
```

```
Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 73
<211> LENGTH: 481
<212> TYPE: PRT
<213> ORGANISM: Artificial Sequence
<220> FEATURE:
<223> OTHER INFORMATION: synthetic

<400> SEQUENCE: 73

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300
```

```
Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 74
<211> LENGTH: 481
<212> TYPE: PRT
<213> ORGANISM: Artificial Sequence
<220> FEATURE:
<223> OTHER INFORMATION: synthetic

<400> SEQUENCE: 74

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
```

```
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Lys Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 75
<211> LENGTH: 481
<212> TYPE: PRT
<213> ORGANISM: Artificial Sequence
<220> FEATURE:
<223> OTHER INFORMATION: synthetic

<400> SEQUENCE: 75

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60
```

```
Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Leu Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480
```

Gly

<210> SEQ ID NO 76
<211> LENGTH: 481
<212> TYPE: PRT
<213> ORGANISM: Artificial Sequence
<220> FEATURE:
<223> OTHER INFORMATION: synthetic

<400> SEQUENCE: 76

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Met Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Lys Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
```

```
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 77
<211> LENGTH: 481
<212> TYPE: PRT
<213> ORGANISM: Artificial Sequence
<220> FEATURE:
<223> OTHER INFORMATION: synthetic

<400> SEQUENCE: 77

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240
```

```
Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Ser Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Thr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 78
<211> LENGTH: 481
<212> TYPE: PRT
<213> ORGANISM: Artificial Sequence
<220> FEATURE:
<223> OTHER INFORMATION: synthetic

<400> SEQUENCE: 78

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110
```

```
Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Met Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 79
<211> LENGTH: 481
<212> TYPE: PRT
<213> ORGANISM: Artificial Sequence
<220> FEATURE:
<223> OTHER INFORMATION: synthetic

<400> SEQUENCE: 79

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Asp Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415
```

```
Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 80
<211> LENGTH: 481
<212> TYPE: PRT
<213> ORGANISM: Artificial Sequence
<220> FEATURE:
<223> OTHER INFORMATION: synthetic

<400> SEQUENCE: 80

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Cys Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285
```

```
Arg Arg Arg Gly Val Glu Phe Thr Lys Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 81
<211> LENGTH: 481
<212> TYPE: PRT
<213> ORGANISM: Artificial Sequence
<220> FEATURE:
<223> OTHER INFORMATION: synthetic

<400> SEQUENCE: 81

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Tyr Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
```

```
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Val Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 82
<211> LENGTH: 481
<212> TYPE: PRT
<213> ORGANISM: Artificial Sequence
<220> FEATURE:
<223> OTHER INFORMATION: synthetic

<400> SEQUENCE: 82

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45
```

```
Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460
```

```
Tyr Glu Thr Val Ala Lys His Ile Lys Arg His Val Asp Leu Leu Glu
465                 470                 475                 480

Gly


<210> SEQ ID NO 83
<211> LENGTH: 481
<212> TYPE: PRT
<213> ORGANISM: Artificial Sequence
<220> FEATURE:
<223> OTHER INFORMATION: synthetic

<400> SEQUENCE: 83

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Ile Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
```

```
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 84
<211> LENGTH: 481
<212> TYPE: PRT
<213> ORGANISM: Artificial Sequence
<220> FEATURE:
<223> OTHER INFORMATION: synthetic

<400> SEQUENCE: 84

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220
```

```
Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Leu Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Thr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 85
<211> LENGTH: 481
<212> TYPE: PRT
<213> ORGANISM: Artificial Sequence
<220> FEATURE:
<223> OTHER INFORMATION: synthetic

<400> SEQUENCE: 85

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95
```

```
Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Leu Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Asn Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Phe His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 86
<211> LENGTH: 481
<212> TYPE: PRT
<213> ORGANISM: Artificial Sequence

```
<220> FEATURE:
<223> OTHER INFORMATION: synthetic

<400> SEQUENCE: 86

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Cys Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Lys Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400
```

```
Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 87
<211> LENGTH: 481
<212> TYPE: PRT
<213> ORGANISM: Artificial Sequence
<220> FEATURE:
<223> OTHER INFORMATION: synthetic

<400> SEQUENCE: 87

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Cys Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Leu Ser Val Asp Glu Thr
            260                 265                 270
```

```
Glu Thr Pro Thr Ser Pro Leu Phe His Ile Phe Val Val Glu Glu Leu
        275                 280                 285

Arg Arg Arg Gly Val Glu Phe Thr Lys Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 88
<211> LENGTH: 481
<212> TYPE: PRT
<213> ORGANISM: Artificial Sequence
<220> FEATURE:
<223> OTHER INFORMATION: synthetic

<400> SEQUENCE: 88

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Asp Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
```

```
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Leu Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Tyr Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 89
<211> LENGTH: 481
<212> TYPE: PRT
<213> ORGANISM: Artificial Sequence
<220> FEATURE:
<223> OTHER INFORMATION: synthetic

<400> SEQUENCE: 89

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30
```

```
Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Asp Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445
```

Leu Lys Glu Arg Leu Phe Lys Thr Leu Glu Gln Asn Glu Glu Leu Phe
450 455 460

Tyr Glu Thr Val Ala Lys His Ile Lys Arg His Val Asp Leu Leu Glu
465 470 475 480

Gly

<210> SEQ ID NO 90
<211> LENGTH: 481
<212> TYPE: PRT
<213> ORGANISM: Artificial Sequence
<220> FEATURE:
<223> OTHER INFORMATION: synthetic

<400> SEQUENCE: 90

Met Val Leu Lys Val Phe Lys Asp His Phe Gly Arg Gly Tyr Glu Val
1 5 10 15

Tyr Glu Lys Ser Tyr Arg Glu Lys Asp Ser Leu Ser Phe Phe Leu Thr
20 25 30

Lys Glu Glu Glu Gly Lys Ile Leu Val Val Ala Gly Glu Lys Ala Pro
35 40 45

Glu Gly Leu Ser Phe Phe Lys Lys Gln Arg Ala Glu Gly Val Ser Phe
50 55 60

Phe Phe Cys Glu Arg Asn His Glu Asn Leu Glu Val Leu Arg Lys Tyr
65 70 75 80

Phe Pro Asp Leu Lys Pro Val Arg Ala Gly Leu Arg Ala Ser Phe Gly
85 90 95

Thr Gly Asp Arg Leu Gly Ile Thr Thr Pro Ala His Val Arg Ala Leu
100 105 110

Lys Asp Ser Gly Leu Phe Pro Ile Phe Ala Gln Gln Ser Val Arg Glu
115 120 125

Asn Glu Arg Thr Gly Arg Thr Trp Arg Asp Val Leu Asp Asp Ala Thr
130 135 140

Trp Gly Val Phe Gln Glu Gly Tyr Ser Glu Gly Phe Gly Ala Asp Ala
145 150 155 160

Asp His Lys Lys Arg Pro Glu Asp Leu Val Ser Ala Ala Arg Glu Gly
165 170 175

Phe Thr Met Phe Thr Ile Asp Pro Ser Asp His Val Arg Asn Leu Ser
180 185 190

Lys Leu Thr Glu Lys Glu Arg Asn Glu Lys Phe Glu Glu Ile Leu Arg
195 200 205

Lys Glu Arg Ile Asp Arg Ile Tyr Leu Gly Lys Lys Tyr Ser Val Leu
210 215 220

Gly Glu Lys Ile Glu Phe Asp Glu Lys Asn Leu Arg Asp Ala Ala Leu
225 230 235 240

Val Tyr Tyr Asp Ala Ile Ala His Val Asp Met Met Tyr Gln Ile Leu
245 250 255

Lys Asp Glu Thr Pro Asp Phe Asp Phe Glu Ile Ser Val Asp Glu Thr
260 265 270

Glu Thr Pro Thr Ser Pro Leu Phe His Ile Phe Val Val Glu Glu Leu
275 280 285

Arg Arg Arg Gly Val Glu Phe Thr Phe Leu Ala Leu Arg Phe Ile Gly
290 295 300

Glu Trp Glu Lys Gly Ile Asp Tyr Lys Gly Asp Leu Ala Gln Phe Glu
305 310 315 320

Arg Glu Ile Lys Met His Ala Glu Ile Ala Arg Met Phe Glu Gly Tyr

```
            325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 91
<211> LENGTH: 481
<212> TYPE: PRT
<213> ORGANISM: Artificial Sequence
<220> FEATURE:
<223> OTHER INFORMATION: synthetic

<400> SEQUENCE: 91

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Ile Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205
```

```
Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Leu Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Tyr Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 92
<211> LENGTH: 481
<212> TYPE: PRT
<213> ORGANISM: Artificial Sequence
<220> FEATURE:
<223> OTHER INFORMATION: synthetic

<400> SEQUENCE: 92

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80
```

```
Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Ile Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Met Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Lys Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Thr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly

<210> SEQ ID NO 93
```

```
<211> LENGTH: 481
<212> TYPE: PRT
<213> ORGANISM: Artificial Sequence
<220> FEATURE:
<223> OTHER INFORMATION: synthetic

<400> SEQUENCE: 93

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Asp Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380
```

```
Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 94
<211> LENGTH: 481
<212> TYPE: PRT
<213> ORGANISM: Artificial Sequence
<220> FEATURE:
<223> OTHER INFORMATION: synthetic

<400> SEQUENCE: 94

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Glu Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Ile Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255
```

```
Lys Asp Glu Thr Pro Asp Phe Asp Phe Glu Leu Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 95
<211> LENGTH: 481
<212> TYPE: PRT
<213> ORGANISM: Artificial Sequence
<220> FEATURE:
<223> OTHER INFORMATION: synthetic

<400> SEQUENCE: 95

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Cys Val Arg Glu
        115                 120                 125

Asn Glu Arg Thr Gly Arg Thr Trp Arg Asp Val Leu Asp Asp Ala Thr
```

```
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Tyr Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Tyr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 96
<211> LENGTH: 481
<212> TYPE: PRT
<213> ORGANISM: Artificial Sequence
<220> FEATURE:
<223> OTHER INFORMATION: synthetic

<400> SEQUENCE: 96

Met Val Leu Lys Val Phe Lys Asp His Phe Gly Arg Gly Tyr Glu Val
1               5                   10                  15
```

```
Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Asp Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430
```

```
Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 97
<211> LENGTH: 481
<212> TYPE: PRT
<213> ORGANISM: Artificial Sequence
<220> FEATURE:
<223> OTHER INFORMATION: synthetic

<400> SEQUENCE: 97

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Asp Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Tyr Leu Ala Leu Arg Phe Ile Gly
    290                 295                 300

Glu Trp Glu Lys Gly Ile Asp Tyr Lys Gly Asp Leu Ala Gln Phe Glu
```

```
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 98
<211> LENGTH: 481
<212> TYPE: PRT
<213> ORGANISM: Artificial Sequence
<220> FEATURE:
<223> OTHER INFORMATION: synthetic

<400> SEQUENCE: 98

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Glu Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190
```

```
Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Tyr Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Thr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 99
<211> LENGTH: 481
<212> TYPE: PRT
<213> ORGANISM: Artificial Sequence
<220> FEATURE:
<223> OTHER INFORMATION: synthetic

<400> SEQUENCE: 99

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60
```

-continued

```
Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Asp Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Leu Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Ser Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 100
<211> LENGTH: 481
<212> TYPE: PRT
<213> ORGANISM: Artificial Sequence
<220> FEATURE:
<223> OTHER INFORMATION: synthetic

<400> SEQUENCE: 100

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Met Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365
```

```
Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Val Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 101
<211> LENGTH: 481
<212> TYPE: PRT
<213> ORGANISM: Artificial Sequence
<220> FEATURE:
<223> OTHER INFORMATION: synthetic

<400> SEQUENCE: 101

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240
```

```
Val Tyr Tyr Asp Ala Ile Ala His Val Asp Met Met Tyr Gln Ile Leu
                245                 250                 255

Lys Asp Glu Thr Pro Asp Phe Asp Phe Glu Leu Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Tyr Leu Ala Leu Arg Phe Ile Gly
    290                 295                 300

Glu Met Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Val Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 102
<211> LENGTH: 481
<212> TYPE: PRT
<213> ORGANISM: Artificial Sequence
<220> FEATURE:
<223> OTHER INFORMATION: synthetic

<400> SEQUENCE: 102

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
```

```
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Met Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Val Thr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 103
<211> LENGTH: 481
<212> TYPE: PRT
<213> ORGANISM: Artificial Sequence
<220> FEATURE:
<223> OTHER INFORMATION: synthetic

<400> SEQUENCE: 103

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Leu Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Ser Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Leu Thr His Ile Ser Ala Asp Leu Ser Lys Val Pro Glu Val Glu
                405                 410                 415
```

```
Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 104
<211> LENGTH: 481
<212> TYPE: PRT
<213> ORGANISM: Artificial Sequence
<220> FEATURE:
<223> OTHER INFORMATION: synthetic

<400> SEQUENCE: 104

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Asp Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
```

```
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Val Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 105
<211> LENGTH: 481
<212> TYPE: PRT
<213> ORGANISM: Artificial Sequence
<220> FEATURE:
<223> OTHER INFORMATION: synthetic

<400> SEQUENCE: 105

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Glu Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Arg Lys Arg Pro Glu Asp Leu Val Ser Ala Ala Arg Glu Gly
                165                 170                 175
```

```
Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Leu Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Leu Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 106
<211> LENGTH: 481
<212> TYPE: PRT
<213> ORGANISM: Artificial Sequence
<220> FEATURE:
<223> OTHER INFORMATION: synthetic

<400> SEQUENCE: 106

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45
```

```
Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Tyr Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Arg Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Met Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Lys Leu Ala Leu Arg Phe Ile Gly
    290                 295                 300

Glu Trp Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Phe Phe His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
```

```
465                 470                 475                 480

Gly


<210> SEQ ID NO 107
<211> LENGTH: 481
<212> TYPE: PRT
<213> ORGANISM: Artificial Sequence
<220> FEATURE:
<223> OTHER INFORMATION: synthetic

<400> SEQUENCE: 107

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Asp Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Met Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350
```

```
Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Val Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 108
<211> LENGTH: 481
<212> TYPE: PRT
<213> ORGANISM: Artificial Sequence
<220> FEATURE:
<223> OTHER INFORMATION: synthetic

<400> SEQUENCE: 108

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Glu Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220
```

```
Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Met Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Val Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 109
<211> LENGTH: 481
<212> TYPE: PRT
<213> ORGANISM: Artificial Sequence
<220> FEATURE:
<223> OTHER INFORMATION: synthetic

<400> SEQUENCE: 109

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
```

```
            100                 105                 110

Lys Asp Ser Gly Leu Phe Pro Ile Phe Ala Gln Gln Glu Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Met Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Tyr Leu Ala Leu Arg Phe Ile Gly
    290                 295                 300

Glu Ser Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Phe Thr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 110
<211> LENGTH: 481
<212> TYPE: PRT
<213> ORGANISM: Artificial Sequence
<220> FEATURE:

<223> OTHER INFORMATION: synthetic

<400> SEQUENCE: 110

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Ser Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Met Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400
```

```
Lys Val Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 111
<211> LENGTH: 481
<212> TYPE: PRT
<213> ORGANISM: Artificial Sequence
<220> FEATURE:
<223> OTHER INFORMATION: synthetic

<400> SEQUENCE: 111

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Asp Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
```

```
        275                 280                 285

Arg Arg Arg Gly Val Glu Phe Thr Phe Leu Ala Leu Arg Phe Ile Gly
    290                 295                 300

Glu Met Glu Lys Gly Ile Asp Tyr Lys Gly Asp Leu Ala Lys Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Val Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 112
<211> LENGTH: 481
<212> TYPE: PRT
<213> ORGANISM: Artificial Sequence
<220> FEATURE:
<223> OTHER INFORMATION: synthetic

<400> SEQUENCE: 112

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Glu Val Arg Glu
        115                 120                 125

Asn Glu Asp Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160
```

```
Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Met Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Tyr Leu Ala Leu Arg Phe Ile Gly
    290                 295                 300

Glu Ser Glu Lys Gly Ile Asp Tyr Lys Gly Asp Leu Ala Gln Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Phe Thr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 113
<211> LENGTH: 481
<212> TYPE: PRT
<213> ORGANISM: Artificial Sequence
<220> FEATURE:
<223> OTHER INFORMATION: synthetic

<400> SEQUENCE: 113

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30
```

```
Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Glu Val Arg Glu
        115                 120                 125

Asn Glu Ser Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Met Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Met Glu Lys Gly Ile Asp Tyr Lys Gly Asp Leu Ala Lys Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Val Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
```

```
450                 455                 460

Tyr Glu Thr Val Ala Lys His Ile Lys Arg His Val Asp Leu Leu Glu
465                 470                 475                 480

Gly


<210> SEQ ID NO 114
<211> LENGTH: 481
<212> TYPE: PRT
<213> ORGANISM: Artificial Sequence
<220> FEATURE:
<223> OTHER INFORMATION: synthetic

<400> SEQUENCE: 114

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Glu Val Arg Glu
        115                 120                 125

Asn Glu Ser Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Met Glu Lys Gly Ile Asp Tyr Lys Gly Asp Leu Ala Lys Phe Glu
305                 310                 315                 320

Arg Glu Ile Lys Met His Ala Glu Ile Ala Arg Met Phe Glu Gly Tyr
                325                 330                 335
```

```
Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Val Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 115
<211> LENGTH: 481
<212> TYPE: PRT
<213> ORGANISM: Artificial Sequence
<220> FEATURE:
<223> OTHER INFORMATION: synthetic

<400> SEQUENCE: 115

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Asp Val Arg Glu
        115                 120                 125

Asn Glu Thr Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205
```

```
Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Met Glu Lys Gly Ile Asp Tyr Lys Gly Asp Leu Ala Lys Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Cys Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 116
<211> LENGTH: 481
<212> TYPE: PRT
<213> ORGANISM: Artificial Sequence
<220> FEATURE:
<223> OTHER INFORMATION: synthetic

<400> SEQUENCE: 116

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
```

```
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Asp Val Arg Glu
        115                 120                 125

Asn Glu Ser Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Met Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Met Glu Lys Gly Ile Asp Tyr Lys Gly Asp Leu Ala Lys Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Val Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 117
<211> LENGTH: 481

<212> TYPE: PRT
<213> ORGANISM: Artificial Sequence
<220> FEATURE:
<223> OTHER INFORMATION: synthetic

<400> SEQUENCE: 117

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Tyr Val Arg Glu
        115                 120                 125

Asn Glu Ser Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Leu Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Tyr Leu Ala Leu Arg Phe Ile Gly
    290                 295                 300

Glu Thr Glu Lys Gly Ile Asp Tyr Lys Gly Asp Leu Ala Lys Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380
```

```
Phe Arg Glu Ile Tyr Arg Cys Thr Leu Asp His Phe Glu Glu Asp Arg
385                 390                 395                 400

Lys Leu Thr His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 118
<211> LENGTH: 481
<212> TYPE: PRT
<213> ORGANISM: Artificial Sequence
<220> FEATURE:
<223> OTHER INFORMATION: synthetic

<400> SEQUENCE: 118

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Glu Val Arg Glu
        115                 120                 125

Asn Glu Asp Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Arg Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
```

```
            260                 265                 270

Glu Thr Pro Thr Ser Pro Leu Phe His Ile Phe Val Val Glu Glu Leu
        275                 280                 285

Arg Arg Arg Gly Val Glu Phe Thr Lys Leu Ala Leu Arg Phe Ile Gly
    290                 295                 300

Glu Ser Glu Lys Gly Ile Asp Tyr Lys Gly Asp Leu Ala Lys Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Tyr Ile His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly


<210> SEQ ID NO 119
<211> LENGTH: 481
<212> TYPE: PRT
<213> ORGANISM: Artificial Sequence
<220> FEATURE:
<223> OTHER INFORMATION: synthetic

<400> SEQUENCE: 119

Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Asp Val Arg Glu
        115                 120                 125

Asn Glu Ser Thr Gly Arg Thr Trp Arg Asp Val Leu Asp Asp Ala Thr
    130                 135                 140
```

```
Trp Gly Val Phe Gln Glu Gly Tyr Ser Glu Gly Phe Gly Ala Asp Ala
145                 150                 155                 160

Asp His Lys Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Glu Lys Glu Arg Asn Glu Lys Phe Glu Glu Ile Leu Arg
        195                 200                 205

Lys Glu Arg Ile Asp Arg Ile Tyr Leu Gly Lys Lys Tyr Ser Val Leu
    210                 215                 220

Gly Glu Lys Ile Glu Phe Asp Glu Lys Asn Leu Arg Asp Ala Ala Leu
225                 230                 235                 240

Val Tyr Tyr Asp Ala Ile Ala His Val Asp Met Met Tyr Gln Ile Leu
                245                 250                 255

Lys Asp Glu Thr Pro Asp Phe Asp Phe Glu Ile Ser Val Asp Glu Thr
            260                 265                 270

Glu Thr Pro Thr Ser Pro Leu Phe His Ile Phe Val Val Glu Glu Leu
        275                 280                 285

Arg Arg Arg Gly Val Glu Phe Thr Phe Leu Ala Leu Arg Phe Ile Gly
    290                 295                 300

Glu Met Glu Lys Gly Ile Asp Tyr Lys Gly Asp Leu Ala Lys Phe Glu
305                 310                 315                 320

Arg Glu Ile Lys Met His Ala Glu Ile Ala Arg Met Phe Glu Gly Tyr
                325                 330                 335

Lys Ile Ser Leu His Ser Gly Ser Asp Lys Phe Ser Val Tyr Pro Ala
            340                 345                 350

Phe Ala Ser Ala Thr Gly Gly Leu Phe His Val Lys Thr Ala Gly Thr
        355                 360                 365

Ser Tyr Leu Glu Ala Val Lys Val Ile Ser Met Val Asn Pro Glu Leu
    370                 375                 380

Phe Arg Glu Ile Tyr Arg Cys Thr Leu Asp His Phe Glu Glu Asp Arg
385                 390                 395                 400

Lys Val Trp His Ile Ser Ala Asp Leu Ser Lys Val Pro Glu Val Glu
                405                 410                 415

Lys Val Lys Asp Glu Asp Leu Pro Gly Leu Phe Glu Asp Ile Asn Val
            420                 425                 430

Arg Gln Leu Ile His Val Thr Tyr Gly Ser Val Leu Lys Asp Ala Ser
        435                 440                 445

Leu Lys Glu Arg Leu Phe Lys Thr Leu Glu Gln Asn Glu Glu Leu Phe
    450                 455                 460

Tyr Glu Thr Val Ala Lys His Ile Lys Arg His Val Asp Leu Leu Glu
465                 470                 475                 480

Gly
```

<210> SEQ ID NO 120
<211> LENGTH: 395
<212> TYPE: PRT
<213> ORGANISM: Artificial Sequence
<220> FEATURE:
<223> OTHER INFORMATION: synthetic

<400> SEQUENCE: 120

```
Val Arg Ala Gly Leu Arg Ala Ser Phe Gly Thr Gly Asp Arg Leu Gly
1               5                   10                  15
```

```
Ile Thr Thr Pro Ala His Val Arg Ala Leu Lys Asp Ser Gly Leu Phe
            20                  25                  30

Pro Ile Phe Ala Gln Gln Ser Val Arg Glu Asn Glu Arg Thr Gly Arg
        35                  40                  45

Thr Trp Arg Asp Val Leu Asp Asp Ala Thr Trp Gly Val Phe Gln Glu
    50                  55                  60

Gly Tyr Ser Glu Gly Phe Gly Ala Asp Ala Asp His Val Lys Arg Pro
65                  70                  75                  80

Glu Asp Leu Val Ser Ala Ala Arg Glu Gly Phe Thr Met Phe Thr Ile
                85                  90                  95

Asp Pro Ser Asp His Val Arg Asn Leu Ser Lys Leu Thr Glu Lys Glu
            100                 105                 110

Arg Asn Glu Lys Phe Glu Glu Ile Leu Arg Lys Glu Arg Ile Asp Arg
        115                 120                 125

Ile Tyr Leu Gly Lys Lys Tyr Ser Val Leu Gly Glu Lys Ile Glu Phe
    130                 135                 140

Asp Glu Lys Asn Leu Arg Asp Ala Ala Leu Val Tyr Tyr Asp Ala Ile
145                 150                 155                 160

Ala His Val Asp Met Met Tyr Gln Ile Leu Lys Asp Glu Thr Pro Asp
                165                 170                 175

Phe Asp Phe Glu Val Ser Val Asp Glu Thr Glu Thr Pro Thr Ser Pro
            180                 185                 190

Leu Phe His Ile Phe Val Val Glu Glu Leu Arg Arg Arg Gly Val Glu
        195                 200                 205

Phe Thr Asn Leu Ala Leu Arg Phe Ile Gly Glu Trp Glu Lys Gly Ile
    210                 215                 220

Asp Tyr Lys Gly Asp Leu Ala Gln Phe Glu Arg Glu Ile Lys Met His
225                 230                 235                 240

Ala Glu Ile Ala Arg Met Phe Glu Gly Tyr Lys Ile Ser Leu His Ser
                245                 250                 255

Gly Ser Asp Lys Phe Ser Val Tyr Pro Ala Phe Ala Ser Ala Thr Gly
            260                 265                 270

Gly Leu Phe His Val Lys Thr Ala Gly Thr Ser Tyr Leu Glu Ala Val
        275                 280                 285

Lys Val Ile Ser Met Val Asn Pro Glu Leu Phe Arg Glu Ile Tyr Arg
    290                 295                 300

Cys Thr Leu Asp His Phe Glu Glu Asp Arg Lys Ser Tyr His Ile Ser
305                 310                 315                 320

Ala Asp Leu Ser Lys Val Pro Glu Val Glu Lys Val Lys Asp Glu Asp
                325                 330                 335

Leu Pro Gly Leu Phe Glu Asp Ile Asn Val Arg Gln Leu Ile His Val
            340                 345                 350

Thr Tyr Gly Ser Val Leu Lys Asp Ala Ser Leu Lys Glu Arg Leu Phe
        355                 360                 365

Lys Thr Leu Glu Gln Asn Glu Glu Leu Phe Tyr Glu Thr Val Ala Lys
    370                 375                 380

His Ile Lys Arg His Val Asp Leu Leu Glu Gly
385                 390                 395
```

<210> SEQ ID NO 121
<211> LENGTH: 440
<212> TYPE: PRT
<213> ORGANISM: Artificial Sequence
<220> FEATURE:
<223> OTHER INFORMATION: synthetic

<400> SEQUENCE: 121

```
Met Val Leu Lys Val Phe Lys Asp His Phe Gly Arg Gly Tyr Glu Val
1               5                   10                  15

Tyr Glu Lys Ser Tyr Arg Glu Lys Asp Ser Leu Ser Phe Phe Leu Thr
            20                  25                  30

Lys Glu Glu Glu Gly Lys Ile Leu Val Val Ala Gly Glu Lys Ala Pro
        35                  40                  45

Glu Gly Leu Ser Phe Phe Lys Lys Gln Arg Ala Glu Gly Val Ser Phe
    50                  55                  60

Phe Phe Cys Glu Arg Asn His Glu Asn Leu Glu Val Leu Arg Lys Tyr
65                  70                  75                  80

Phe Pro Asp Leu Lys Pro Val Arg Ala Gly Leu Arg Ala Ser Phe Gly
                85                  90                  95

Thr Gly Asp Arg Leu Gly Ile Thr Thr Pro Ala His Val Arg Ala Leu
            100                 105                 110

Lys Asp Ser Gly Leu Phe Pro Ile Phe Ala Gln Gln Ser Val Arg Glu
        115                 120                 125

Asn Glu Arg Thr Gly Arg Thr Trp Arg Asp Val Leu Asp Asp Ala Thr
    130                 135                 140

Trp Gly Val Phe Gln Glu Gly Tyr Ser Glu Gly Phe Gly Ala Asp Ala
145                 150                 155                 160

Asp His Val Lys Arg Pro Glu Asp Leu Val Ser Ala Ala Arg Glu Gly
                165                 170                 175

Phe Thr Met Phe Thr Ile Asp Pro Ser Asp His Val Arg Asn Leu Ser
            180                 185                 190

Lys Leu Thr Asp Ala Ala Leu Val Tyr Tyr Asp Ala Ile Ala His Val
        195                 200                 205

Asp Met Met Tyr Gln Ile Leu Lys Asp Glu Thr Pro Asp Phe Asp Phe
    210                 215                 220

Glu Val Ser Val Asp Glu Thr Glu Thr Pro Thr Ser Pro Leu Phe His
225                 230                 235                 240

Ile Phe Val Val Glu Glu Leu Arg Arg Arg Gly Val Glu Phe Thr Asn
                245                 250                 255

Leu Ala Leu Arg Phe Ile Gly Glu Trp Glu Lys Gly Ile Asp Tyr Lys
            260                 265                 270

Gly Asp Leu Ala Gln Phe Glu Arg Glu Ile Lys Met His Ala Glu Ile
        275                 280                 285

Ala Arg Met Phe Glu Gly Tyr Lys Ile Ser Leu His Ser Gly Ser Asp
    290                 295                 300

Lys Phe Ser Val Tyr Pro Ala Phe Ala Ser Ala Thr Gly Gly Leu Phe
305                 310                 315                 320

His Val Lys Thr Ala Gly Thr Ser Tyr Leu Glu Ala Val Lys Val Ile
                325                 330                 335

Ser Met Val Asn Pro Glu Leu Phe Arg Glu Ile Tyr Arg Cys Thr Leu
            340                 345                 350

Asp His Phe Glu Glu Asp Arg Lys Ser Tyr His Ile Ser Ala Asp Leu
        355                 360                 365

Ser Lys Val Pro Glu Val Glu Lys Val Lys Asp Glu Asp Leu Pro Gly
    370                 375                 380

Leu Phe Glu Asp Ile Asn Val Arg Gln Leu Ile His Val Thr Tyr Gly
385                 390                 395                 400

Ser Val Leu Lys Asp Ala Ser Leu Lys Glu Arg Leu Phe Lys Thr Leu
```

```
                405                 410                 415

Glu Gln Asn Glu Glu Leu Phe Tyr Glu Thr Val Ala Lys His Ile Lys
            420                 425                 430

Arg His Val Asp Leu Leu Glu Gly
        435                 440


<210> SEQ ID NO 122
<211> LENGTH: 354
<212> TYPE: PRT
<213> ORGANISM: Artificial Sequence
<220> FEATURE:
<223> OTHER INFORMATION: synthetic

<400> SEQUENCE: 122

Val Arg Ala Gly Leu Arg Ala Ser Phe Gly Thr Gly Asp Arg Leu Gly
1               5                   10                  15

Ile Thr Thr Pro Ala His Val Arg Ala Leu Lys Asp Ser Gly Leu Phe
            20                  25                  30

Pro Ile Phe Ala Gln Gln Ser Val Arg Glu Asn Glu Arg Thr Gly Arg
        35                  40                  45

Thr Trp Arg Asp Val Leu Asp Asp Ala Thr Trp Gly Val Phe Gln Glu
    50                  55                  60

Gly Tyr Ser Glu Gly Phe Gly Ala Asp Ala Asp His Val Lys Arg Pro
65                  70                  75                  80

Glu Asp Leu Val Ser Ala Ala Arg Glu Gly Phe Thr Met Phe Thr Ile
                85                  90                  95

Asp Pro Ser Asp His Val Arg Asn Leu Ser Lys Leu Thr Asp Ala Ala
            100                 105                 110

Leu Val Tyr Tyr Asp Ala Ile Ala His Val Asp Met Met Tyr Gln Ile
        115                 120                 125

Leu Lys Asp Glu Thr Pro Asp Phe Asp Phe Glu Val Ser Val Asp Glu
    130                 135                 140

Thr Glu Thr Pro Thr Ser Pro Leu Phe His Ile Phe Val Val Glu Glu
145                 150                 155                 160

Leu Arg Arg Arg Gly Val Glu Phe Thr Asn Leu Ala Leu Arg Phe Ile
                165                 170                 175

Gly Glu Trp Glu Lys Gly Ile Asp Tyr Lys Gly Asp Leu Ala Gln Phe
            180                 185                 190

Glu Arg Glu Ile Lys Met His Ala Glu Ile Ala Arg Met Phe Glu Gly
        195                 200                 205

Tyr Lys Ile Ser Leu His Ser Gly Ser Asp Lys Phe Ser Val Tyr Pro
    210                 215                 220

Ala Phe Ala Ser Ala Thr Gly Gly Leu Phe His Val Lys Thr Ala Gly
225                 230                 235                 240

Thr Ser Tyr Leu Glu Ala Val Lys Val Ile Ser Met Val Asn Pro Glu
                245                 250                 255

Leu Phe Arg Glu Ile Tyr Arg Cys Thr Leu Asp His Phe Glu Glu Asp
            260                 265                 270

Arg Lys Ser Tyr His Ile Ser Ala Asp Leu Ser Lys Val Pro Glu Val
        275                 280                 285

Glu Lys Val Lys Asp Glu Asp Leu Pro Gly Leu Phe Glu Asp Ile Asn
    290                 295                 300

Val Arg Gln Leu Ile His Val Thr Tyr Gly Ser Val Leu Lys Asp Ala
305                 310                 315                 320

Ser Leu Lys Glu Arg Leu Phe Lys Thr Leu Glu Gln Asn Glu Glu Leu
```

```
                325                 330                 335

Phe Tyr Glu Thr Val Ala Lys His Ile Lys Arg His Val Asp Leu Leu
            340                 345                 350

Glu Gly


<210> SEQ ID NO 123
<211> LENGTH: 38
<212> TYPE: DNA
<213> ORGANISM: Artificial Sequence
<220> FEATURE:
<223> OTHER INFORMATION: synthetic

<400> SEQUENCE: 123

gagatatacc catatggtct tgaaagtgtt caaagacc                              38


<210> SEQ ID NO 124
<211> LENGTH: 39
<212> TYPE: DNA
<213> ORGANISM: Artificial Sequence
<220> FEATURE:
<223> OTHER INFORMATION: synthetic

<400> SEQUENCE: 124

ggtggtggtg ctcgagcccc tccagcagat ccacgtgcc                             39


<210> SEQ ID NO 125
<211> LENGTH: 36
<212> TYPE: DNA
<213> ORGANISM: Artificial Sequence
<220> FEATURE:
<223> OTHER INFORMATION: synthetic

<400> SEQUENCE: 125

gctggagggg ctcgagcacc accaccacca ccactg                                36


<210> SEQ ID NO 126
<211> LENGTH: 36
<212> TYPE: DNA
<213> ORGANISM: Artificial Sequence
<220> FEATURE:
<223> OTHER INFORMATION: synthetic

<400> SEQUENCE: 126

ctttcaagac catatgggta tatctccttc ttaaag                                36


<210> SEQ ID NO 127
<211> LENGTH: 15
<212> TYPE: DNA
<213> ORGANISM: Artificial Sequence
<220> FEATURE:
<223> OTHER INFORMATION: synthetic

<400> SEQUENCE: 127

ccatatggtc ttgaa                                                       15


<210> SEQ ID NO 128
<211> LENGTH: 39
<212> TYPE: DNA
<213> ORGANISM: Artificial Sequence
<220> FEATURE:
<223> OTHER INFORMATION: synthetic

<400> SEQUENCE: 128

ggtggtggtg ctcgagcccc tccagcagat ccacgtgcc                             39
```

D-XYLULOSE 4-EPIMERASE, MUTANTS AND USES THEREOF

CROSS-REFERENCE TO RELATED APPLICATIONS

This application is a U.S. National Phase application under 35 U.S.C. § 371 of International Patent Application No. PCT/CN2020/133395, filed on Dec. 2, 2020, which claims priority to Chinese Application No. 201911404948.2, filed on Dec. 31, 2019. The entire contents of the parent applications are hereby incorporated by reference.

TECHNICAL FIELD

The present disclosure pertains to the field of biocatalysis and synthetic biology. The present disclosure relates to a novel polypeptide (enzyme) as well as mutants thereof, named D-xylulose 4-epimerase (Xu4E), which are capable of reversibly catalyzing the interconversion between D-xylulose and L-ribulose; and a new method of producing L-pentoses (i.e., L-arabinose, L-ribose, L-ribulose, L-xylulose, L-xylose and L-lyxose) from D-xylose, the most abundant pentose in nature by constructing artificial enzyme pathways and using this enzyme.

BACKGROUND

Pentose (or pentose monosaccharide), with the chemical formula $C_5H_{10}O_5$, is a monosaccharide with five carbon atoms. It can be divided into two broad categories: aldopentose and ketopentose. There are totally eight aldopentoses and four ketopentoses, each ketopentose corresponding to two aldopentoses. Twelve kinds of pentoses can also be divided into L-type sugars and D-type sugars, and each type of sugar includes four aldopentoses and two ketopentoses. D-xylose, D-ribose, and L-arabinose are natural sugars, but the other pentoses are rare sugars that occur in very small amounts in nature. D-xylose is the most abundant pentose in nature. L-pentoses have attracted a lot of attention due to their great potential for medical and health applications, especially as many important pharmaceutical precursors.

D-xylose, the most abundant pentose in nature, can be separated from lignocellulose and is called wood sugar. D-xylose is the main component of hemicellulose xylan. D-xylose is now separated primarily from acidic or alkaline hydrolysates of corncob and beet pulp, and most of the xylose is used to be converted to a zero-calorie sweetener xylitol.

L-arabinose is a US Food and Drug Administration (FDA) approved, zero-calorie natural sweetener with 50% the sweetness of sucrose (Antila et al. 1997, Boku et al. 2001). What's more, adding 3-4% L-arabinose to sucrose can inhibit the activity of sucrase, prevent sucrose hydrolysis, and prevent sucrose absorption, so L-arabinose is considered a sucrose neutralizer according to calories intake (Morimoto et al. 2001). At the same time, unutilized sugar in the gut is a prebiotic that promotes the growth of beneficial bacteria, thereby inhibiting the growth of harmful microorganisms in the large intestine. L-arabinose is also a starting material used for synthetic drugs and a biochemical product widely used in molecular biology experiments and industrial fermentation.

L-arabinose exists in the hemicellulose of higher plants in the form of arabinan, arabinoxylan, and arabinogalactan. In Japan, L-arabinose is obtained by alkaline extraction of hemicellulose in corn fiber (Boku et al. 2001), gum arabic, sugar beet pulp (Antila et al. 1997), etc., followed by acid hydrolysis. In China, L-arabinose is a by-product of D-xylose produced by acid hydrolysis of corncob. The high price and limited supply of L-arabinose greatly limit its wide application.

L-ribose is not widely found in nature. It is the precursor of many novel nucleotide analogs for the production of antiviral drugs, such as those against human immunodeficiency virus, hepatitis virus and cytomegalovirus (Kim et al. 2014). L-ribose may also act as a competitive inhibitor of glucose dehydrogenase (Beerens et al. 2012). Previously, L-ribose was produced by a two-step microbial transformation with ribitol as an intermediate. Recently, the biosynthesis of L-ribose occurs through a two-step enzymatically catalyzed reaction: L-ribulose was converted to L-ribose by using L-arabinose isomerase (L-AI) and L-ribose isomerase (L-RI, EC 5.3.1.B3) or mannose 6-Phosphate isomerase (MPI, EC 5.3.1.8) (Kim et al. 2014).

L-ribulose is a starting material for the synthesis of L-ribose and L-arabinose. Its 5'-phosphate product, L-ribulose 5-phosphate, is an important metabolite of the pentose phosphate pathway.

L-xylulose may act as an inhibitor of α-glucosidase and can be used to lower blood sugar. L-xylulose may also be used to produce other important rare sugars, such as L-ribose for the production of antiviral drugs and L-xylose as an indicator of hepatitis or cirrhosis.

L-lyxose, a component of the antibiotic avilamycin A for animals, is a potential L-fucosidase inhibitor.

L-xylose is a starting material for the synthesis of anti-hepatitis B virus (HBV) nucleosides and the synthesis of L-ribofuranose and derivatives thereof.

TABLE 1

Applications of different kinds of L-pentoses

| Name | Applications |
|---|---|
| L-arabinose | US FDA-approved, zero-calorie, natural sweetener that can be used alone or in combination with sucrose and other sweeteners;<br>a sucrose neutralizer, a sucrase inhibitor;<br>a prebiotic that supports the growth of beneficial microbes in gut;<br>a biochemical product widely used in molecular biology experiments and industrial fermentation. |
| L-ribose | a component of antiviral and anticancer L-nucleoside drugs;<br>a component of sugar complexes, oligonucleotides and L-oligonucleotide aptamers;<br>a starting material for the production of L-allose and L-altrose;<br>potential ability against hepatitis B virus and Epstein-Barr virus;<br>a nutritional supplement for health and diet. |
| L-ribulose | a starting material for L-ribose production. |
| L-lyxose | a component of antibiotic avilamycin A;<br>an inhibitor of L-fucosidase. |
| L-xylose | a starting material for the synthesis of anti-HBV nucleosides;<br>a starting material for the synthesis of L-ribose furanose and derivatives. |
| L-xylulose | a potential inhibitor of various glucosidases;<br>synthesis of L-xylose and L-lyxose;<br>an indicator of hepatitis or cirrhosis. |

Epimerases are a class of isomerases that catalyze the conformational change of an asymmetric carbon atom in a substrate containing multiple asymmetric centers. The pentose monosaccharide 4-epimerase has been searched for a long time but has never been reported (Beerens et al. 2017).

4-Epimerase in nature, such as L-ribulose 5-phosphate 4-epimerase (EC 5.1.3.4) and UDP-D-xylose 4-epimerase (EC 5.1.3.5), requires its pentose substrate to have a phosphate or uridine diphosphate (UDP) group.

Professor Ken Izumori proposed a complete strategy for rare sugar biosynthesis (shown in FIG. 1 of the present disclosure). Starting from D-xylose, other 11 pentoses can be produced by using L-ribulose 3-epimerase (or pentulose 3-epimerase), aldose isomerase, aldose reductase and polyol dehydrogenase. According to the prior art, where D-xylose is taken as a raw material to produce six kinds of L-pentoses, it must go through steps of producing xylitol or ribitol, so it is necessary to use two kinds of oxidoreductases based on coenzyme NAD (P)—aldose reductase and polyol dehydrogenase. L-pentoses are expensive to produce because their production needs an expensive and labile coenzyme (NAD (P) and complicated separation of products and related intermediates in reversible equilibrium reactions.

SUMMARY

Problem to be Solved

Due to the defects of high cost and complicated production process in the existing L-pentose production technology, it is necessary to provide a new method for producing L-pentose.

In one embodiment, the present disclosure provides a wild-type polypeptide (enzyme) and mutants thereof, which have the chemical reaction ability to catalyze the interconversion of D-xylulose and L-ribulose (FIG. 2). The wild-type D-xylulose 4-epimerase (D-xylulose 4-epimerase, Xu4E) and its mutants in the present disclosure can utilize the most abundant pentose in nature, namely D-xylose, as a raw material, to produce L-pentose. In one embodiment, an exemplary L-pentose is selected from six kinds of L-pentose monosaccharides, namely L-arabinose, L-ribose, L-ribulose, L-xylulose, L-xylose and L-lyxose.

In another embodiment, the present disclosure provides a method for preparing said Xu4E mutant, which prepares the Xu4E mutant through molecular biology and genetic engineering methods.

In another embodiment, the present disclosure provides use of said wild-type Xu4E and mutants thereof, which can be used to produce L-pentose.

In another embodiment, the present disclosure provides a new method for producing L-pentose, the method comprising a method for producing L-pentose using D-xylose or D-xylulose as a raw material.

In another embodiment, the present disclosure provides a new method for producing L-pentose, the method comprising a step of converting D-xylulose to L-ribulose using Xu4E or a mutant thereof.

In a specific embodiment, the present disclosure provides a method for further optimizing said method for producing L-pentose.

Solutions

In the present disclosure, the technical solutions for solving said technical problem are as follows.

(1) A polypeptide has D-xylulose 4-epimerase activity, wherein the polypeptide is selected from any one of the groups consisting of (a) to (d):

(a) a polypeptide encoded by a sequence having at least 60%, at least 70%, at least 80%, or at least 90% sequence identity to the sequence as set forth in any one of SEQ ID NOs: 2-32;

(b) a polypeptide encoded by a polynucleotide that hybridizes, under a very high stringency condition, to a polynucleotide of (i) or (ii):

(i) a polynucleotide encoding an amino acid sequence as set forth in any one of SEQ ID NOs: 2-32;

(ii) a full-length complementary polynucleotide of (i);

(c) a polypeptide that is a mutant of the polypeptide as set forth in any one of SEQ ID NOs: 2-32, the mutant comprising a substitution, repetition, deletion or addition of one or more amino acids at one or more positions, and the polypeptide still having D-xylulose 4-epimerase activity; and (d) fragments of the polypeptides shown by (a), (b), (c), which have D-xylulose 4-epimerase activity.

(2) The polypeptide according to (1), wherein the polypeptide is a mutant, and the polypeptide has at least 95%, at least 96%, at least 97%, at least 98% or at least 99% sequence identity compared to the polypeptide as set forth in any one of SEQ ID NOs: 2-32.

(3) The polypeptide according to any one of (1) to (2), wherein the polypeptide is a mutant of the polypeptide as set forth in any one of SEQ ID NOs: 2-32, and the mutant comprises amino acid mutations at at least 1, at least 2, at least 3, at least 4, at least 5, at least 6, at least 7, at least 8, at least 9 positions, and the polypeptide still has D-xylulose 4-epimerase activity.

(4) The polypeptide according to any one of (1) to (3), the polypeptide is a polypeptide as follows:

(a) as compared with the sequence as set forth in SEQ ID NO: 2, one or more amino acids in the amino acid sequence of the polypeptide comprise mutations corresponding to the following positions, wherein the positions are one or more selected from the group consisting of 102, 125, 131, 161, 163, 266, 267, 297, 306, 318, 337, 394, 402 and 403;

(b) as compared with the sequence as set forth in SEQ ID NO: 3, one or more amino acids in the amino acid sequence of the polypeptide comprise mutations corresponding to the following positions, wherein the positions are one or more selected from the group consisting of 102, 125, 131, 161, 163, 266, 267, 297, 306, 318, 337, 394, 402 and 403;

(c) as compared with the sequence as set forth in SEQ ID NO: 4, one or more amino acids in the amino acid sequence of the polypeptide comprise mutations corresponding to the following positions, wherein the positions are one or more selected from the group consisting of 102, 125, 131, 161, 163, 266, 267, 297, 306, 318, 337, 394, 402 and 403;

(d) as compared with the sequence as set forth in SEQ ID NO: 5, one or more amino acids in the amino acid sequence of the polypeptide comprise mutations corresponding to the following positions, wherein the positions are one or more selected from the group consisting of 105, 128, 134, 164, 166, 270, 271, 301, 310, 322, 341, 398, 406, and 407;

(e) as compared with the sequence as set forth in SEQ ID NO: 6, one or more amino acids in the amino acid sequence of the polypeptide comprise mutations corresponding to the following positions, wherein the positions are one or more selected from the group consisting of 105, 128, 134, 164, 166, 269, 270, 300, 309, 321, 340, 397, 405, and 406;

(f) as compared with the sequence as set forth in SEQ ID NO: 7, one or more amino acids in the amino acid sequence of the polypeptide comprise mutations corresponding to the following positions, wherein the positions are one or more selected from the group consisting of 117, 140, 146, 176, 178, 285, 286, 316, 325, 337, 355, 412, 420, and 421;

(g) as compared with the sequence as set forth in SEQ ID NO: 8, one or more amino acids in the amino acid sequence of the polypeptide comprise mutations corresponding to the following positions, wherein the positions are one or more selected from the group consisting of 125, 148, 154, 184, 186, 293, 294, 324, 333, 345, 363, 420, 428, and 429;

(h) as compared with the sequence as set forth in SEQ ID NO: 9, one or more amino acids in the amino acid sequence of the polypeptide comprise mutations corresponding to the following positions, wherein the positions are one or more selected from the group consisting of 124, 147, 153, 183, 185, 297, 298, 328, 337, 349, 368, 425, 433, and 434;

(i) as compared with the sequence as set forth in SEQ ID NO: 10, one or more amino acids in the amino acid sequence of the polypeptide comprise mutations corresponding to the following positions, wherein the positions are one or more selected from the group consisting of 108, 131, 137, 167, 169, 276, 277, 307, 316, 328, 346, 403, 411, and 412;

(j) as compared with the sequence as set forth in SEQ ID NO: 11, one or more amino acids in the amino acid sequence of the polypeptide comprise mutations corresponding to the following positions, wherein the positions are one or more selected from the group consisting of 115, 138, 144, 174, 176, 280, 281, 311, 320, 332, 351, 408, 416, and 417;

(k) as compared with the sequence as set forth in SEQ ID NO: 12, one or more amino acids in the amino acid sequence of the polypeptide comprise mutations corresponding to the following positions, wherein the positions are one or more selected from the group consisting of 107, 130, 136, 166, 168, 272, 273, 303, 312, 324, 343, 400, 408, and 409;

(l) as compared with the sequence as set forth in SEQ ID NO: 13, one or more amino acids in the amino acid sequence of the polypeptide comprise mutations corresponding to the following positions, wherein the positions are one or more selected from the group consisting of 109, 132, 138, 168, 170, 275, 276, 306, 315, 327, 346, 403, 411, and 412;

(m) as compared with the sequence as set forth in SEQ ID NO: 14, one or more amino acids in the amino acid sequence of the polypeptide comprise mutations corresponding to the following positions, wherein the positions are one or more selected from the group consisting of 103, 126, 132, 162, 164, 267, 268, 298, 307, 319, 338, 395, 403, and 404;

(n) as compared with the sequence as set forth in SEQ ID NO: 15, one or more amino acids in the amino acid sequence of the polypeptide comprise mutations corresponding to the following positions, wherein the positions are one or more selected from the group consisting of 105, 128, 134, 164, 166, 271, 272, 302, 311, 323, 342, 399, 407, and 408;

(o) as compared with the sequence as set forth in SEQ ID NO: 16, one or more amino acids in the amino acid sequence of the polypeptide comprise mutations corresponding to the following positions, wherein the positions are one or more selected from the group consisting of 64, 88, 94, 123, 125, 236, 237, 267, 274, 286, 373, 381, 382;

(p) as compared with the sequence as set forth in SEQ ID NO: 17, one or more amino acids in the amino acid sequence of the polypeptide comprise mutations corresponding to the following positions, wherein the positions are one or more selected from the group consisting of 110, 133, 139, 169, 171, 271, 272, 302, 311, 323, 342, 399, 407, and 408;

(q) as compared with the sequence as set forth in SEQ ID NO: 18, one or more amino acids in the amino acid sequence of the polypeptide comprise mutations corresponding to the following positions, wherein the positions are one or more selected from the group consisting of 102, 125, 131, 161, 163, 266, 267, 297, 306, 318, 337, 394, 402, and 403;

(r) as compared with the sequence as set forth in SEQ ID NO: 19, one or more amino acids in the amino acid sequence of the polypeptide comprise mutations corresponding to the following positions, wherein the positions are one or more selected from the group consisting of 121, 144, 150, 180, 182, 289, 290, 320, 329, 341, 359, 416, 424, and 425;

(s) as compared with the sequence as set forth in SEQ ID NO: 20, one or more amino acids in the amino acid sequence of the polypeptide comprise mutations corresponding to the following positions, wherein the positions are one or more selected from the group consisting of 107, 130, 136, 166, 168, 273, 274, 304, 313, 325, 344, 401, 409, and 410;

(t) as compared with the sequence as set forth in SEQ ID NO: 21, one or more amino acids in the amino acid sequence of the polypeptide comprise mutations corresponding to the following positions, wherein the positions are one or more selected from the group consisting of 21, 48, 54, 84, 86, 182, 183, 213, 222, 234, 260, 324, 332, and 333;

(u) as compared with the sequence as set forth in SEQ ID NO: 22, one or more amino acids in the amino acid sequence of the polypeptide comprise mutations corresponding to the following positions, wherein the positions are one or more selected from the group consisting of 30, 55, 61, 91, 93, 202, 203, 233, 242, 254, 273, 330, 338, and 339.

(5) The polypeptide according to any one of (1) to (4), wherein the polypeptide is a polypeptide having any one of the following mutations in the sequence as set forth in SEQ ID NO: 2:

(a) a mutation at position 102;
(b) a mutation at position 125;
(c) a mutation at position 131;
(d) a mutation at position 161;
(e) a mutation at position 163;
(f) a mutation at position 266;
(g) a mutation at position 267;
(h) a mutation at position 297;
(i) a mutation at position 306;
(j) a mutation at position 318;
(k) a mutation at position 337;
(l) a mutation at position 394;
(m) a mutation at position 402;
(n) a mutation at position 403;
(o) combinational mutations at positions 267 and 297;
(p) combinational mutations at positions 306 and 403;
(q) combinational mutations at positions 125 and 297;
(r) combinational mutations at positions 163, 267 and 403;
(s) combinational mutations at positions 125, 267 and 297;
(t) combinational mutations at positions 163, 267, 297 and 403;
(u) combinational mutations at positions 125, 163, 267 and 297;
(v) combinational mutations at positions 125, 163, 267, 297 and 403;
(w) combinational mutations at positions 125, 163, 267, 297, 402 and 403;
(x) combinational mutations at positions 163, 267, 297, 306, 402 and 403;
(y) combinational mutations at positions 125, 163, 267, 297, 306, 402 and 403;
(z) combinational mutations at positions 125, 131, 163, 267, 297, 306, 402 and 403;
(aa)
(bb) combinational mutations at positions 125, 163, 267, 297, 306, 318, 402 and 403;
(cc) combinational mutations at positions 125, 131, 163, 267, 297, 306, 318, 402 and 403.

(6) The polypeptide according to (5), wherein the polypeptide is a polypeptide having any one of the following mutations in the sequence as set forth in SEQ ID NO: 2:

(a) an amino acid corresponding to position 102 on SEQ ID NO: 2 is mutated from glycine (G) to leucine (L);

(b) an amino acid corresponding to position 125 on SEQ ID NO: 2 is mutated from serine (S) to aspartic acid (D), cysteine (C), tyrosine (Y), glutamine (Q), glutamic acid (E), threonine (T) or asparagine (N);

(c) an amino acid corresponding to position 131 on SEQ ID NO:2 is mutated from arginine (R) to aspartic acid (D), threonine (T), glutamic acid (E) or serine (S);

(d) an amino acid corresponding to position 161 on SEQ ID NO: 2 is mutated from aspartic acid (D) to alanine (A);

(e) an amino acid corresponding to position 163 on SEQ ID NO:2 is mutated from valine (V) to lysine (K), arginine (R), serine (S), isoleucine (I) or methionine (M);

(f) an amino acid corresponding to position 266 on SEQ ID NO: 2 is mutated from glutamic acid (E) to alanine (A);

(g) an amino acid corresponding to position 267 on SEQ ID NO: 2 is mutated from valine (V) to leucine (L), methionine (M) or isoleucine (I);

(h) an amino acid corresponding to position 297 on SEQ ID NO: 2 is mutated from asparagine (N) to phenylalanine (F), tyrosine (Y) or lysine (K);

(i) an amino acid corresponding to position 306 on SEQ ID NO: 2 is mutated from tryptophan (W) to methionine (M), serine (S) or threonine (T);

(j) an amino acid corresponding to position 318 on SEQ ID NO: 2 is mutated from glutamine (Q) to lysine (K);

(k) an amino acid corresponding to position 337 on SEQ ID NO: 2 was mutated from lysine (K) to aspartic acid (D);

(l) an amino acid corresponding to position 394 on SEQ ID NO: 2 is mutated from aspartic acid (D) to methionine (M);

(m) an amino acid corresponding to position 402 on SEQ ID NO: 2 is mutated from serine (S) to valine (V), leucine (L), phenylalanine (F), cysteine (C) or tyrosine (Y);

(n) an amino acid corresponding to position 403 on SEQ ID NO: 2 is mutated from tyrosine (Y) to tryptophan (W), threonine (T), isoleucine (1) or phenylalanine (F).

(7) The polypeptide according to any one of claims 1 to 6, wherein the polypeptide is derived from *Thermotoga maritima, Thermotoga neapolitana, Thermotoga* sp, *Thermotoga caldifontis, Pseudothermotoga lettingae, Halanaerobium congolense, Thermosediminibacter litoriperuensis, Rhodothermus marinus, Gracilibacillus timonensis, Thermotogae bacterium, Thermotogae bacterium, Candidatus Acetothermia bacterium, Pseudothermotoga thermarum, Thermoanaembacterium thermosaccharolyticum, Thermofilum adornatus, Thermoanoembacter italicus, Thermotoga naphthophila, Thermoclostridium stercorarium, Dictyoglomus thermophilum, Spirochaeta thermophila, Singulisphaera acidiphila, Thermotoga caldifontis, Pseudothermotoga lettingae, Bacillus subtilis, Geobacillus zaliha, Geobacillus stearothermophilus, Parageobacillus thermoglucosidasius, Thermoanaem-bacterium thernosaccharolyticum* or *Escherichia coli.*

(8) The polypeptide according to (1), wherein the polypeptide includes deletions of one or more than one amino acid residue at the N-terminal or mid-portion or C-terminal of the polypeptides as set forth in SEQ ID NOs: 2-32.

(9) The polypeptide according to (8), wherein the polypeptide is selected from the group consisting of:

(i) one formed by deletion of 1-100 amino acids, preferably 1-90 amino acids, more preferably 1-86, more preferably 1-50, more preferably 1-30, most preferably 1-10 amino acids, from the N-terminal of a polypeptide corresponding to that as set forth in SEQ ID NO: 2, and having an activity of catalyzing the conversion of D-xylulose into L-ribulose; or (ii) one formed by deletion of 1-41 amino acids, preferably 1-30, more preferably 1-20, most preferably 1-10 amino acids, among from amino acids 196 to 236 of a polypeptide corresponding to that as set forth in SEQ ID NO: 2, and having an activity of catalyzing the conversion of D-xylulose into L-ribulose;

(10) The polypeptide according to any one of (8) and (9), wherein the polypeptide is selected from the group consisting of:

(i) a polypeptide corresponding to that as set forth in SEQ ID NO: 2 with deletion of amino acids 1 to 86 and having an activity of catalyzing the conversion of D-xylulose into L-ribulose;

(ii) a polypeptide corresponding to that as set forth in SEQ ID NO: 2 with deletion of amino acids 196 to 236 and having an activity of catalyzing the conversion of D-xylulose into L-ribulose; or (iii) a polypeptide corresponding to that as set forth in SEQ ID NO: 2 with deletion of amino acids 1 to 86 and amino acids 196 to 236 and having an activity of catalyzing the conversion of D-xylulose into L-ribulose.

(11) The polypeptide according to any one of (1) to (10), wherein the polypeptide comprises or consists of amino acid sequences having at least 96% sequence identity to the sequence as set forth in SEQ ID NOs: 33-122; optionally, the polypeptide comprises or consist of amino acid sequences having at least 98.3%, at least 98.5%, at least 98.7%, at least 98.9%, at least 99.1%, at least 99.3% at least 99.5%, at least 99.7%, or 100% sequence identity to any one of the polypeptides encoded by SEQ ID NOs: 33-122.

(12) The polypeptide according to any one of (1) to (11), wherein the polypeptide has improved D-xylulose 4-epimerase activity as compared to the polypeptide as set forth in SEQ ID NO: 2.

(13) The polypeptide according to any one of (1) to (12), wherein the polypeptide is encoded by a sequence comprising the sequence as set forth in SEQ ID NO: 33-122, or the polypeptide is a polypeptide encoded by the sequence as set forth in SEQ ID NO: 33-122.

(14) A isolated polynucleotide, wherein the polynucleotide comprises a nucleotide sequence encoding the polypeptide according to any one of (1) to (13).

(15) The isolated polynucleotide according to (14), which comprises at least one mutation in the nucleotide encoding the amino acid as set forth in any one of SEQ ID NOs: 2-32; preferably, the polynucleotide sequence encodes the amino acid as set forth in any one of SEQ ID NOs: 33-122.

(16) A nucleic acid construct comprising the polynucleotide according to (14) or (15) which is operably linked to one or more regulatory sequences that direct the production of a polypeptide in an expression host.

(17) A recombinant expression vector, which comprises the nucleic acid construct according to (16).

(18) A recombinant host cell, which comprises the nucleic acid construct according to (16) or the recombinant expression vector according to (17).

(19) A method for producing the polypeptide according to any one of (1) to (13), wherein the method comprises a step of: (a) culturing a cell or strain that produces the polypeptide under conditions conducive to the production of the polypeptide; wherein, the cell or strain comprises the nucleic acid construct according to (16) or the recombinant expression vector according to (17), the nucleic acid construct or the recombinant expression vector comprising a nucleotide sequence encoding the polypeptide;

optionally, the method also comprises the following step:

(b) purifying or recovering the polypeptide.

(20) A method for converting D-xylulose to L-ribulose, wherein the method comprises performing a catalytic reaction using the polypeptide according to any one of (1) to (13).

(21) The method according to (20), wherein the polypeptide is encoded by an amino acid sequence comprising any one of SEQ ID NOs: 2-122, or the polypeptide is a polypeptide encoded by a sequence as set forth in any one of SEQ ID NOs: 2-122.

(22) A method for preparing L-pentose, wherein, the method for preparing L-pentose comprises the steps of:

(a) converting D-xylulose to L-ribulose by using D-xylulose 4-epimerase;

optionally, the method further comprises:

(b) converting D-xylose to D-xylulose by using D-xylose isomerase.

(23) The method according to (22), wherein the method further comprises converting L-ribulose to L-arabinose by using L-arabinose isomerase, the L-pentose being L-arabinose.

(24) The method according to (22), wherein the method further comprises converting L-ribulose to L-ribose by using L-ribose isomerase or mannose 6-phosphate isomerase or a combination thereof, the L-pentose being L-ribose.

(25) The method according to (22), wherein the method further comprises converting L-ribulose to L-xylulose by using L-ribulose 3-epimerase, the L-pentose being L-xylulose.

(26) The method according to (22), wherein the method further comprises converting L-ribulose to L-xylulose by using L-ribulose 3-epimerase, and converting L-xylulose or a combination of L-xylulose and L-ribulose to L-xylose by using L-fucose isomerase or D-arabinose isomerase or L-rhamnose isomerase, the L-pentose being L-xylose.

(27) The method according to (22), wherein the method further comprises converting L-ribulose to L-xylulose by using L-ribulose 3-epimerase and converting L-xylulose to L-xylose by using L-rhamnose isomerase, the L-pentose being L-lyxose.

(28) The method according to any one of (22) to (27), the D-xylulose 4-epimerase is selected from the polypeptides according to any one of (1) to (13); preferably, the D-xylulose 4-epimerase is encoded by an amino acid sequence comprising any one of SEQ ID NOs: 2-122, or the enzyme is an enzyme encoded by a sequence as set forth in any one of SEQ ID NOs: 2-122.

(29) The method according to any one of (22) to (28), wherein the method further comprises a step of purifying and/or separating the L-pentose.

(30) The method according to (29), wherein the separating step comprises a step of separating using a simulated moving bed (SMB).

(31) The method according to any one of (22) to (30), wherein the reaction system of the method also includes an enzyme reaction solution; preferably, the enzyme reaction solution contains metal ions; more preferably, the metal ion may be one or more of $Co^{2+}$, $Zn^{2+}$, $Mg^{2+}$, $Mn^{2+}$, $Ca^{2+}$, $Ni^{2+}$, $Cu^{2+}$, $Fe^{2+}$, $Sr^{2+}$, $Ba^{2+}$, $Cd^{2+}$, $Pb^{2+}$, $Fe^{3+}$, $Al^{3+}$, $Bi^{3+}$, $Ag^{+}$, $Li^{+}$.

(32) The method according to any one of (22) to (31), wherein the reaction is carried out under an aerobic, microaerobic or anaerobic condition.

(33) The method according to any one of (22) to (32), wherein the reaction is carried out at a temperature of 30° C. to 90° C.; preferably, the reaction is carried out at a temperature of 40° C. to 80° C.

(34) The method according to any one of (22) to (33), wherein the reaction is carried out at a pH in the range of 3.0 to 11.0; preferably, the reaction is carried out at a pH in the range of 4.0 to 10.0.

(35) The method according to any one of (22) to (34), wherein the reaction is carried out under an anaerobic condition of a temperature of 45 to 55° C., pH of 8.0, and a metal ion of $Co^{2+}$ or $Mg^{2+}$ or $Mn^{2+}$ or a combination thereof.

(36) The method according to any one of (22) to (35), wherein the reaction includes an in vitro catalytic reaction or a whole cell biocatalytic reaction.

(37) The method according to (36), wherein the reaction is an in vitro catalytic reaction that can be carried out in steps or simultaneously.

(38) The method according to (37), wherein when the in vito catalytic reaction is carried out in steps, it is carried out in one reaction vessel or in more than one reaction vessel connected in series.

(39) The method according to (38), wherein the reaction vessel is one or more selected from a batch-feed bioreactor, a packed-bed bioreactor containing an immobilized enzyme, an enzyme or cell recycling bioreactor, a bioreactor containing membrane separation, and a continuous-feed bioreactor.

(40) The method according to any one of (22) to (39), wherein the enzyme in the in vitro catalytic reaction exists in one or more forms of free enzyme, cell lysate containing the enzyme, whole cells containing the enzyme, and immobilized enzyme.

(41) The method according to (36), wherein the reaction mode of the whole cell biocatalytic reaction is to use a cell factory to carry out the reaction, and the cell contains the nucleic acid construct according to (16) or the recombinant expression vector according to (17).

(42) Use of a polypeptide in the preparation of L-pentose, the polypeptide being selected from the polypeptide according to any one of (1) to (13).

(43) The use according to (42), wherein the L-pentose is one or more selected from L-arabinose, L-ribose, L-ribulose, L-xylulose, L-xylose and L-lyxose.

(44) Use of a polypeptide as an enzyme having D-xylulose 4-epimerase activity, the polypeptide being selected from the polypeptide according to any one of (1) to (13).

Effects

In one embodiment, a wild-type D-xylulose 4-epimerase (Xu4E) and mutants thereof which have a chemical reaction ability to catalyze the interconversion of D-xylulose and L-ribulose are discovered by the present disclosure.

In a specific embodiment, the Xu4E mutant provided by the present disclosure has improved properties, e.g., improved physical and/or chemical properties, as compared to wild-type Xu4E. Exemplarily, in a specific embodiment, the Xu4E mutant has increased specific enzyme activity as compared to wild-type Xu4E; in another specific embodiment, the Xu4E mutant has an increased reaction rate as compared to wild-type Xu4E; in another specific embodiment, the Xu4E mutant has a reduced $K_m$ as compared to wild-type Xu4E.

In another embodiment, the present disclosure discovers a new method for preparing L-pentose, which has a simpler production process and lowers the cost of producing L-pentose compared to conventional production methods in the prior art.

BRIEF DESCRIPTION OF THE DRAWINGS

FIGS. 14A and 14B show analysis and comparison results of amino acid sequences of polypeptides with Xu4E activity from different species. TmXu4E (tagaturonate 3-epimerase of *Thermotoga maritima* MSB8) has an amino acid sequence of SEQ ID NO: 2. TnXu4E (tagaturonate 3-epimerase of *Thermotoga neapolitana*) has an amino acid sequence of SEQ ID NO: 3. TSG1Xu4E (tagaturonate 3-epimerase of *Thermotogas sp* SG1) has an amino acid sequence of SEQ ID NO: 4. TcXu4E (tagaturonate 3-epimerase of *Thermotoga caldifontis*) has an amino acid sequence of SEQ ID NO: 5. PIXu4E (tagaturonate 3-epimerase of *Pseudothermotoga lettingae*) has an amino acid sequence of SEQ ID NO: 6. HcXu4E (tagaturonate 3-epimerase of *Halanaerobium congolense*) has an amino acid sequence of SEQ ID NO: 7. TIXu4E (4-epimerase of *Thermosedimibacter litoriperuensis*) has an amino acid sequence of SEQ ID NO: 8. RmXu4E (4-epimerase of *Rhodothermus marinus*) has an amino acid sequence of SEQ ID NO: 9. GtXu4E (4-epimerase of *Gracilibacillus timonensis*) has an amino acid sequence of SEQ ID NO: 10. DHV12_0325 (4-epimerase of *Thermotogae bacterium*) has an amino acid sequence of SEQ ID NO: 11. DRP27_0411 (4-epimerase of *Thermogae bacterium*) has an amino acid sequence of SEQ ID NO: 12. CaXu4E (4-epimerase of *Candidatus Acetothermia bacterium*) has an amino acid sequence of SEQ ID NO: 13. PtXu4E (4-epimerase of *Pseudothermotoga thermarum*) has an amino acid sequence of SEQ ID NO: 14. TthXu4E (4-epimerase of *Thermoanaerobacterium thermosaccharolyticum* DSM 571) has an amino acid sequence of SEQ ID NO: 15. TaXu4E (4-epimerase of *Thermofilum adornatus* 1505) has an amino acid sequence of SEQ ID NO: 16. TiXu4E (4-epimerase of *Thermoanaerobacter italicus*) has an amino acid sequence of SEQ ID NO: 17. TnaXu4E (4-epimerase of *Thermotoga naphthophila*) has an amino acid sequence of SEQ ID NO: 18. TsXu4E (4-epimerase of *Thermoclostridium stercorarium* DSM 8532) has an amino acid sequence of SEQ ID NO: 19. DtXu4E (4-epimerase of *Dictyoglomus thermophilum*) has an amino acid sequence of SEQ ID NO: 20. StXu4E (4-epimerase of *Spirochaeta thermophila* DSM 6192) has an amino acid sequence of SEQ ID NO: 21. SaXu4E (4-epimerase of *Singulisphaera acidiphila*) has an amino acid sequence of SEQ ID NO: 22.

DETAILED DESCRIPTION

Definitions

Figure 1:
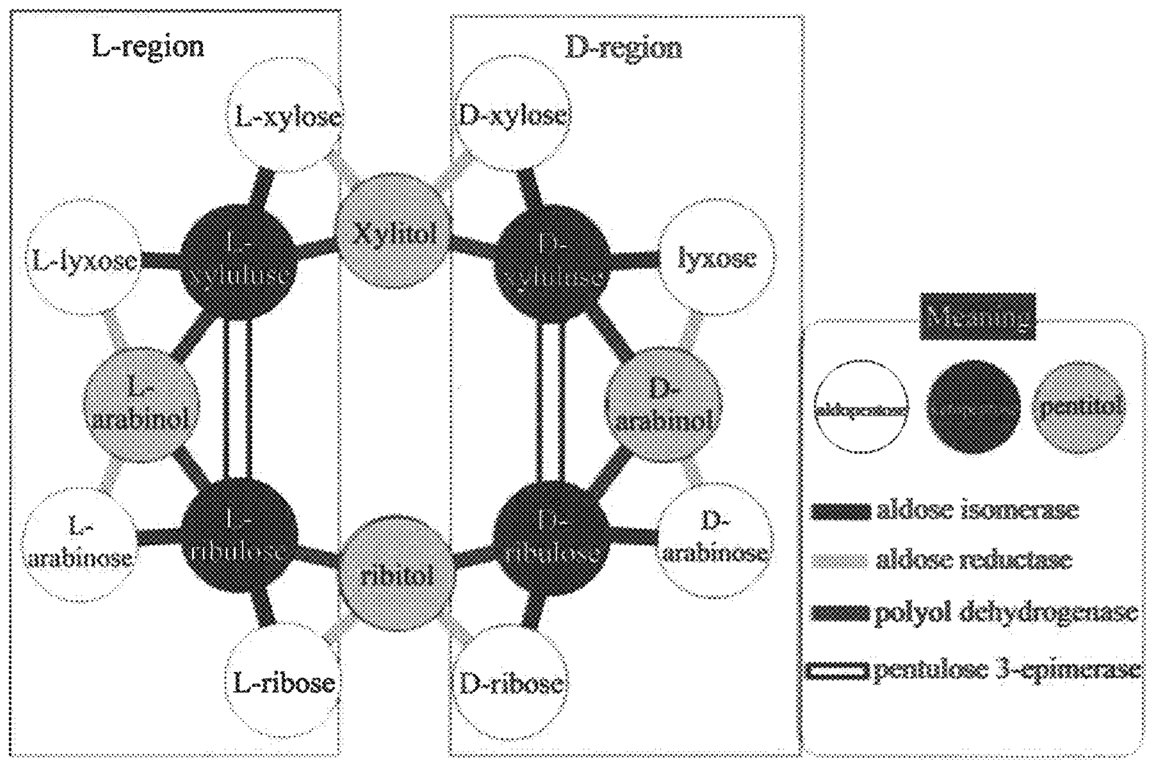
FIG. 1 shows an Izumoring diagram of the interconversion of all pentoses in the prior art.

In the claims and/or specification of the present disclosure, referents such as "a, an", "said" or "the" are intended to support both the singular and/or plural, unless the context indicates otherwise.

As used in the claims and the specification, the term "comprise", "have", "include", "possess" or "contain" means inclusive or open-ended, and does not exclude additional, non-referenced elements or method steps.

As used in the present disclosure, the term "about" means that a numerical value includes the standard deviation of the error of a device or method used to determine the numerical value. Illustratively, said standard deviation is generally within a range of 20-30% of the original value.

Although what disclosed here supports the definition of the term "or" as only an alternative and "and/or", the term "or" in the claims means "and/or" unless it is expressly stated that it is only an alternative or the alternatives are mutually exclusive.

As used in the present disclosure, although other organic or inorganic catalysts may be used, the term "converting" refers to a chemical conversion from one molecule to another catalyzed primarily by one or more polypeptides (enzymes); the yield thereof refers to a ratio (in %) between the molar amount of the product and the molar amount of the substrate.

As used in the present disclosure, the term "monosaccharide" refers to any class of sugars (e.g., D-glucose, pentose monosaccharide, D-xylose, L-arabinose) that cannot be hydrolyzed to give simpler sugars and that are not modified by a chemical group such as phosphate group or UDP group.

As used in the present disclosure, the term "pentose" or "pentose monosaccharide" refers to any class of monosaccharides containing five carbon atoms in the molecule thereof, such as D-xylose and L-arabinose.

As used in the present disclosure, "monosaccharide" can be labeled as "D-", or "L-". The two series are divided based on the structure of glyceraldehyde as a comparison standard, and is determined according to the configuration of the lowest asymmetric carbon atom in the Fisher projection formula. As stipulated, the dextrorotatory glyceraldehyde is defined as an isomer with a hydroxyl group on the right in the Fisher projection, called D-isomer; the levorotary glyceraldehyde is defined as the glyceraldehyde with a hydroxyl group on the left, called the L-isomer. That is to say, if the chiral carbon atom of the monosaccharide is the same as D-glyceraldehyde, and the hydroxyl group is at the right end, it is labeled as D-monosaccharide; if it is the same as L-glyceraldehyde, and the hydroxyl group is at the left end, it is labeled as L-monosaccharide.

As used in the present disclosure, the term "4-epimerase" refers to an enzyme capable of exchanging a hydroxyl group at carbon 4 of a sugar. Exemplary, "4-epimerase" is an enzyme capable of exchanging the hydroxyl group at carbon 4 of D-tagatose and D-fructose, an enzyme capable of exchanging the hydroxyl group at carbon 4 of D-xylulose and L-ribulose, an enzyme capable of exchanging the hydroxyl group at carbon 4 of D-glucose and D-galactose, and an enzyme capable of exchanging the hydroxyl group at carbon 4 of D-xylose and L-arabinose.

As used in the present disclosure, the terms "polypeptide", "enzyme", "polypeptide or enzyme", "polypeptide/enzyme" have the same meaning and are used interchangeably in the present disclosure. These terms refer to polymers composed of many amino acids through peptide bonds, which may or may not contain modifications such as phosphate group and formyl group.

As used in the present disclosure, the term D-xylulose 4-epimerase" and its abbreviated name "Xu4E" refer to a polypeptide (enzyme) capable of catalyzing the interconversion of D-xylulose and L-ribulose.

As used in the present disclosure, one "unit of enzyme activity (U)" is defined as the amount of enzyme required to generate 1 μmol of product per minute by the enzyme-catalyzed reaction of the substrate.

As used in the present disclosure, the term "specific enzymatic activity" is also expressed as "specific activity", which have the same meaning in the present disclosure and are used interchangeably. It refers to the enzymatic activity (U/mg) per milligram of a polypeptide (enzyme).

As used in the present disclosure, the term "sequence identity" or "percent identity" in the comparison of two nucleic acids or polypeptides means that they have identical sequences or have a specified percentage of identical sequences when compared and aligned for maximum correspondence using a nucleotide or amino acid residue sequence comparison algorithm or measurement by visual inspection. In other words, the identity of nucleotide or amino acid sequences can be defined by a ratio of the number of identical nucleotides or amino acids, when comparing two or more nucleotide or amino acid sequences in a manner that maximizes the number of identical nucleotides or amino acids, and adding gaps as needed for alignment, to the total number of nucleotides or amino acids in the alignment.

As used in the present disclosure, sequence identity between two or more polynucleotides or polypeptides can be determined by a method of aligning the nucleotide or amino acid sequences of the polynucleotides or polypeptides and scoring the number of positions containing the same nucleotide or amino acid residue in the aligned polynucleotides or polypeptides, and comparing it to the number of positions containing different nucleotide or amino acid residues in the aligned polynucleotides or polypeptides. Polynucleotides may differ at one position, for example, by containing different nucleotides or missing nucleotides. Polypeptides may differ at one position, for example, by containing different amino acids or missing amino acids. Sequence identity can be calculated by dividing the number of positions containing the same nucleotide or amino acid residue by the total number of amino acid residues in a polynucleotide or polypeptide. For example, percent identity can be calculated by dividing the number of positions containing the same nucleotide or amino acid residue by the total number of nucleotides or amino acid residues in the polynucleotide or polypeptide and multiplying by 100.

Exemplarily, in the present disclosure, when compared and aligned for maximum correspondence using a nucleotide or amino acid residue sequence comparison algorithm or measurement by visual inspection, two or more sequences or subsequences have "sequence identity" or "percent identity" of at least 40%, 50%, 60%, 70%, 80%, 85%, 90%, 91%, 92%, 93%, 94%, 95%, 96%, 97%, 98% or 99% nucleotides or amino acid residues. "Sequence identity" or "percent identity" may be determined/calculated based on any suitable region of a sequence, e.g., a region having a length of at least about 50 residues, a region of at least about 100 residues, a region of at least about 200 residues, a region of at least about 400 residues, or a region of at least about 500 residues. In some embodiments, the sequences are substantially identical over the entire length of either or both of the compared biopolymers (i.e., nucleic acids or polypeptides).

As used in the present disclosure, the correspondence between the numbers of nucleotides or amino acids in different sequences is based on the numbers of the target nucleotide or target amino acid compared to the reference nucleotide or reference amino acid when compared and aligned for maximum correspondence using a nucleotide or amino acid residue sequence comparison algorithm or measurement by visual inspection to thereby determine "sequence identity" or "percent identity". Exemplarily, in the present disclosure, "the sequence as set forth in SEQ ID NO: 5 is numbered according to the sequence as set forth in SEQ ID NO: 2" means that when the "sequence identity" or "percent identity" between the sequence as set forth in SEQ ID NO: 5 (equivalent to the target amino acid) and the sequence as set forth in SEQ ID NO: 2 (equivalent to the reference amino acid) is determined, when the sequence as set forth in SEQ ID NO: 5 is compared or aligned with the sequence as set forth in SEQ ID NO: 2 with the maximum correspondence, the number corresponding to the sequence as set forth in SEQ ID NO: 2 is the number of the sequence as set forth in SEQ ID NO: 5.

As used in the present disclosure, the term "amino acid mutation" or "nucleotide mutation" includes "substitution, duplication, deletion or addition of one or more amino acids or nucleotides". In the present disclosure, the term "mutation" refers to changes in a nucleotide sequence or amino acid sequence. In a specific embodiment, the term "mutation" refers to "substitution".

In one embodiment, "mutation" of the present disclosure may be selected from "conservative mutation". In the present disclosure, the term "conservative mutation" refers to a mutation that normally maintains the function of a protein. A representative example of conservative mutation is conservative substitution.

As used in the present disclosure, the term "conservative substitution" refers to substitution of an amino acid residue with an amino acid residue having a similar side chain. In the art, families of amino acid residues with similar side chains have been defined and include those with basic side chains (e.g., lysine, arginine, and histidine), acidic side chains (e.g., aspartic acid and glutamic acid)), uncharged polar side chains (e.g., glycine, asparagine, glutamine, serine, threonine, tyrosine, and cysteine), non-polar side chains (e.g., alanine, valine, leucine, isoleucine, proline, phenylalanine, methionine, and tryptophan), beta-branched chains (e.g., threonine, valine, and isoleucine), and aromatic side chains (e.g., tyrosine, phenylalanine, tryptophan and histidine).

As used in the present disclosure, "conservative substitution" typically exchanges one kind of amino acid at one or more positions in a protein. Such substitutions may be conservative. Specifically, examples of substitutions regarded as conservative substitutions include substitution of Ala to Ser or Thr, substitution of Arg to Gln, His, or Lys, substitution of Asn to Glu, Gln, Lys, His, or Asp, substitution of Asp to Asn, Glu or Gln, substitution of Cys to Ser or Ala, substitution of Gln to Asn, Glu, Lys, His, Asp or Arg, substitution of Glu to Gly, Asn, Gln, Lys or Asp, substitution of Gly to Pro, substitution of His to Asn, Lys, Gln, Arg or Tyr, substitution of Ile to Leu, Met, Val or Phe, substitution of Leu to Ile, Met, Val or Phe, substitution of Lys to Asn, Glu, Gln, His or Arg substitution, substitution of Met to Ile, Leu, Val or Phe, substitution of Phe to Trp, Tyr, Met, Ile or Leu, substitution of Ser to Thr or Ala, substitution of Thr to Ser or Ala, substitution of Trp to Phe or Tyr, substitution of Tyr to His, Phe or Trp, and substitution of Val to Met, Ile or Leu. In addition, conservative mutations also include naturally occurring mutations resulting from individual differences, and differences in strains and species from which genes are derived.

As used in the present disclosure, the term "polynucleotide" refers to a polymer composed of nucleotides. Polynucleotides may be in the form of individual fragments or a component of a larger nucleotide sequence structure, which is derived from a nucleotide sequence isolated at least once in number or concentration, and is capable of identifying, manipulating and recovering the sequence and its component nucleotide sequence by standard molecular biological methods (e.g., using a cloning vector). When a nucleotide sequence is represented by a DNA sequence (i.e., A, T, G, C), this also includes an RNA sequence (i.e., A, U, G, C) where "T" is replaced with "U". In other words, "polynucleotide" refers to a polymer of nucleotide removed from other nucleotides (an individual fragment or an entire fragment), or may be a component of a larger nucleotide structure, such as an expression vector or polycistronic sequence. Polynucleotides include DNA, RNA and cDNA sequences. "Recombinant polynucleotide" is a type of "polynucleotide".

As used in the present disclosure, the term "recombinant polynucleotide" refers to a polynucleotide having sequences that are not linked together in nature. The recombinant polynucleotide may be included in a suitable vector, and the vector can be used for transformation into a suitable host cell. A host cell containing a recombinant polynucleotide is referred to as "a recombinant host cell". The polynucleotide is then expressed in the recombinant host cell to produce, for example, "a recombinant polypeptide".

As used in the present disclosure, the term "expression" includes any step involved in the production of a polypeptide, including, but not limited to, transcription, post-transcriptional modification, translation, post-translational modification, and secretion.

As used in the present disclosure, the term "expression vector" refers to a linear or circular DNA molecule comprising a polynucleotide that encodes a polypeptide and is operably linked to a control sequence for its expression.

As used in the present disclosure, the term "recombinant expression vector" refers to a DNA construct for expressing, for example, a polynucleotide encoding a desired polypeptide. Recombinant expression vectors may include, for example, i) a collection of genetic elements that regulate gene expression, such as promoters and enhancers; ii) structural or coding sequences that are transcribed into mRNA and translated into protein; and iii) transcription subunits of appropriate transcriptional and translational initiation and termination sequences. A recombinant expression vector is constructed in any suitable manner. The nature of the vector is not critical and any vector can be used, including plasmids, viruses, phages and transposons. Possible vectors for use in the present disclosure include, but are not limited to, chromosomal, non-chromosomal, and synthetic DNA sequences, such as bacterial plasmids, phage DNA, yeast plasmids, and vectors derived from combinations of plasmids and phage DNA, DNA from viruses such as vaccinia, adenovirus, fowl pox, baculovirus, SV40, and pseudorabies.

As used in the present disclosure, the term "operably linked" refers to a configuration in which a regulatory sequence is positioned relative to the coding sequence of a polynucleotide such that the regulatory sequence directs the expression of the coding sequence. Exemplarily, the regulatory sequences may be selected from sequences encoded by promoters and/or enhancers.

As used in the present disclosure, the term "nucleic acid construct" comprises a polynucleotide that encodes a polypeptide or domain or module and is operably linked to a suitable regulatory sequence necessary for expression of the polynucleotide in a selected cell or strain.

As used in the present disclosure, the term "endogenous" refers to a polynucleotide, polypeptide or other compound that is naturally expressed or produced within an organism or a cell. In other words, an endogenous polynucleotide, polypeptide or other compound is not exogenous. For example, an "endogenous" polynucleotide or polypeptide is present in a cell when the cell is initially isolated from nature.

As used in the present disclosure, the term "exogenous" refers to any polynucleotide or polypeptide that is naturally found or expressed in a specific cell or organism for which expression is desired. Exogenous polynucleotides, polypeptides or other compounds are not endogenous.

As used in the present disclosure, the term "wild-type" refers to objects that can be found in nature. For example, a polypeptide or polynucleotide sequence that exists in an organism, can be isolated from a source in nature, and has not been intentionally modified by humans in the laboratory is naturally occurring. As used in the present disclosure, "naturally occurring" and "wild-type" are synonymous.

As used in the present disclosure, the term "mutant" refers to a polynucleotide or polypeptide comprising an alteration (i.e., substitution, insertion and/or deletion) at one or more (e.g., several) positions with respect to a "wild-type" or "comparative" polynucleotide or polypeptide, wherein substitution refers to the replacement of a nucleotide or amino acid occupying a position with a different nucleotide or amino acid. Deletion refers to the removal of a nucleotide or amino acid occupying a position. Insertion refers to the addition of a nucleotide or amino acid adjacent to and immediately following the nucleotide or amino acid occupying a position. Exemplarily, a "mutant" in the present disclosure is a polypeptide that still has D-xylulose 4-epimerase (Xu4E) activity.

As used in the present disclosure, "overexpressed" recombinant gene produces more RNA and/or protein than the corresponding naturally occurring gene in the microorganism. Methods for measuring RNA and protein amounts are known in the art. Overexpression can also be determined by measuring protein activity, such as enzymatic activity. According to embodiments of the present disclosure, "overexpression" is an amount of at least 3%, at least 5%, at least 10%, at least 20%, at least 25%, or at least 50% or more. The overexpressed polynucleotide is usually a polynucleotide native to the host cell, and the product thereof is produced in an amount greater than that normally produced in the host cell. For example and without limitation, overexpression is accomplished by operably linking a polynucleotide to a promoter other than the polynucleotide's native promoter, or by introducing an additional copy of the polynucleotide into the host cell.

As used in the present disclosure, the term "fragment" means a polypeptide or a catalytic or carbohydrate binding moiety that has one or more (e.g., several) amino acids deleted from the amino and/or carboxy terminus of a mature polypeptide or domain. In the technical solution of the present disclosure, the fragment has D-xylulose 4-epimerase (Xu4E) activity.

As used in the present disclosure, the term "isolated" means a substance in a form not existed in nature or environment. Non-limiting examples of isolated substances include (1) any non-naturally occurring substance; (2) any substance, including but not limited to any enzyme, mutant, nucleic acid, protein, peptide or cofactor, which is at least partially removed from one or more or all naturally occurring components with which it is intrinsically associated; (3) any substance that has been artificially modified relative to a substance found in nature; or (4) any substance that is modified by increasing the amount of the substance relative to other components with which it is naturally associated (e.g., recombinant production in a host cell; multiple copies of the gene encoding the substance; and use of a promoter stronger than the promoter naturally associated with the gene encoding the substance). The isolated material may be present in the fermentation broth sample. For example, a host cell can be genetically modified to express the polypeptide of the present disclosure. The fermentation broth from the host cell will contain the isolated polypeptide. The isolated material may be present in a sample of the biotransformation fluid. For example, the target product L-arabinose can be separated from an enzymatically catalyzed polysaccharide mixed liquid.

As used in the present disclosure, the term "high stringency condition" refers to pre-hybridization and hybridization, for a probe of at least 100 nucleotides in length, performed for 12 to 24 hours at 42° C. in 5×SSPE (saline sodium phosphate EDTA), 0.3% SDS, 200 micrograms/ml sheared and denatured salmon sperm DNA and 50% formamide, following standard Southern blotting procedures. Finally, the carrier material was washed three times for 15 minutes each time with 2×SSC, 0.2% SDS at 65° C.

As used in the present disclosure, the term "very high stringency condition" refers to pre-hybridization and hybridization, for a probe of at least 100 nucleotides in length, performed for 12 to 24 hours at 42° C. in 5×SSPE (saline sodium phosphate EDTA), 0.3% SDS, 200 micrograms/ml sheared and denatured salmon sperm DNA and 50% formamide, following standard Southern blotting procedures. Finally, the carrier material was washed three times for 15 minutes each time with 2×SSC, 0.2% SDS at 70° C.

As used in the present disclosure, the term "free enzyme" refers to an enzyme that does not contain a living organism. The free enzyme of the present disclosure can be suspended in solution, soluble, or bound to an insoluble matrix after lysing cells in which they are expressed to be partially or highly purified.

As used in the present disclosure, the term "immobilized enzyme" refers to an enzyme that has a catalytic function within a certain spatial range and can be used repeatedly and continuously. Usually, enzyme-catalyzed reactions are carried out in aqueous solutions, while an immobilized enzyme is a water-soluble enzyme treated with physical or chemical methods to make it insoluble in water but still have enzymatic activity.

As used in the present disclosure, the term "host cell" means any cell type that is susceptible to transformation, transfection, transduction, etc. with a nucleic acid construct or expression vector comprising a polynucleotide of the present disclosure. The term "host cell" encompasses any progeny of a parent cell differing from the parent cell due to mutations that occur during replication.

As used in the present disclosure, the term "whole cell microorganism" refers to whole cells that have cell membranes not completely lysed. A whole cell microorganism containing the enzyme can be used directly, or immobilized for maintaining stability and recyclability, or whole cells can be permeabilized to obtain a fast reaction rate.

As used in the present disclosure, the term "catalyzed reaction" refers to a chemical reaction that takes place in the presence of a catalyst. One catalyst can only selectively accelerate a specific reaction, potentially making a chemical reaction proceed in one of several thermodynamically possible directions. The reaction where the catalyst and reactants are in the same phase is called Homogeneous Catalytic Reaction, and the reaction where the catalyst and reactants are in different phases is called Heterogeneous Catalytic Reaction. The reaction where a biocatalyst-enzyme participates is called Enzymic Catalytic Reaction.

In a specific embodiment, the catalytic reaction can be catalyzed by an enzyme or multienzyme in vito in a whole cell. Said catalytic reaction may also be called "enzyme-catalyzed reaction", which refers to a process of chemical transformation using an enzyme as a catalyst. This reaction process is also called biotransformation or biocatalysis.

In another specific embodiment, the catalytic reaction may be carried out in vivo/intracellular, and said catalytic reaction may also be referred to as "intracellular catalytic reaction".

As used in the present disclosure, the term "intracellular catalytic reaction" may also be referred to as "whole cell biocatalytic reaction", which refers to a process of chemical transformation using an intact biological organism (i.e., a whole cell, tissue or even an individual) as a catalyst. Organocatalysts commonly used in the whole-cell biocatalytic reaction are mainly microorganisms, and its essence is to perform catalysis using one or more enzymes in one or more microbial cells. Now, biotransformation methods using animal cells, plant cells and even biological individuals have also been developed. Commonly used methods of whole-cell biotransformation include immobilizing cells on a reaction plane, suspending microspheres, and porous solid-phase carriers.

As used in the present disclosure, the term "fermentation product" refers to a preparation produced by cellular fermentation, which has undergone no or minimal recovery and/or purification. The fermentation product may contain unfractionated or fractionated contents of fermentation materials obtained at the end of the fermentation. Typically, the fermentation product is unfractionated and contains spent culture medium and cell debris present after removal of microbial cells (e.g., filamentous fungal cells), for example, by centrifugation. In some embodiments, the fermentation product contains spent cell culture medium, extracellular enzymes, and viable and/or nonviable microbial cells.

As used in the present disclosure, the term "biocatalytic product" refers to a preparation produced by biocatalysis with a biocatalyst (a polypeptide or an enzyme or a whole cell), which has undergone no or minimal recovery and/or purification. The biocatalysis is carried out in a biocatalyst-catalyzed aqueous buffer containing a metal ion. In some embodiments, the biocatalyst comprises a free enzyme for reaction, a cell lysate containing the enzyme, a whole cell organism containing the enzyme, and aggregates of immobilizing the enzyme and cross-linking the enzyme.

As used in the present disclosure, the term "bioreactor" is a device system that utilizes biological functions possessed by an enzymes or organism (e.g., a microorganism) to carry out biotransformation reaction. It is a biological function simulator, such as a fermenter, an immobilized enzyme or immobilized cell reactor, etc.

Unless otherwise defined or clearly indicated by context, all technical and scientific terms used in the present disclosure have the same meaning as commonly understood by one of ordinary skill in the art to which the present disclosure belongs.

D-Xylulose 4-Epimerase and Mutants Thereof

Figure 2:
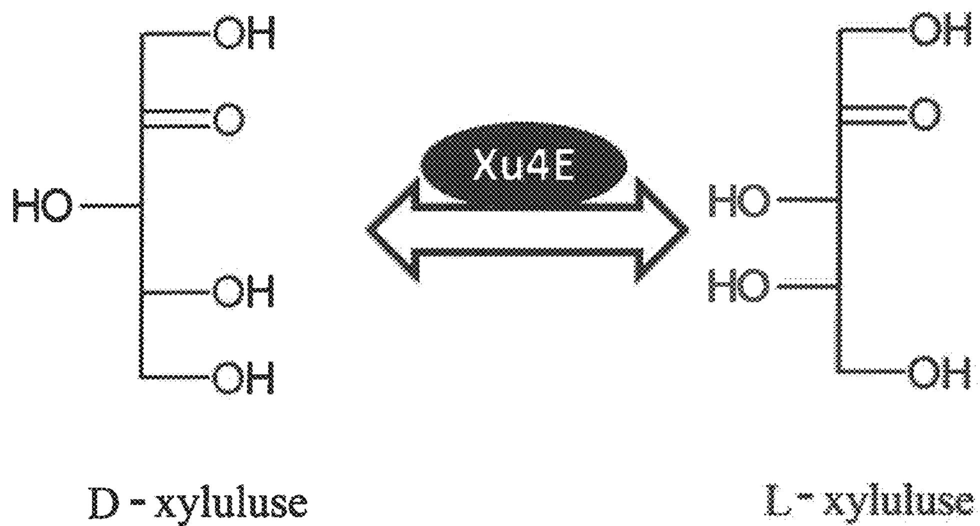
FIG. 2 shows a diagram of the interconversion between D-xylulose and L-ribulose catalyzed by D-xylulose 4-epimerase (Xu4E).

In one embodiment, we discovered a never-before-reported pentose 4-epimerase that enables the interconversion between D-xylulose and L-ribulose. We named it D-xylulose 4-epimerase (Xu4E) (FIG. 2).

In a specific embodiment, we discovered for the first time that enzymatic activity of Xu4E in some enzymes from two enzyme families: tagaturonate 3-epimerase (EC 5.1.2.7) and L-ribulose 5-phosphate 4-epimerase (EC 5.1.3.4).

In another embodiment, we created a library of DNA mutants of xu4e using wild-type Xu4E, and identified Xu4E mutants with altered physicochemical properties therefrom.

Exemplarily, in a specific embodiment, the Xu4E mutant has an increased specific enzyme activity as compared with the wild-type Xu4E; in another specific embodiment, the Xu4E mutant has an increased reaction rate as compared with the wild-type Xu4E; in another specific embodiment, the Xu4E mutant has a reduced $K_m$ as compared with the wild-type Xu4E.

Artificial Enzymatic Pathways for L-Pentose Production

Figure 3:
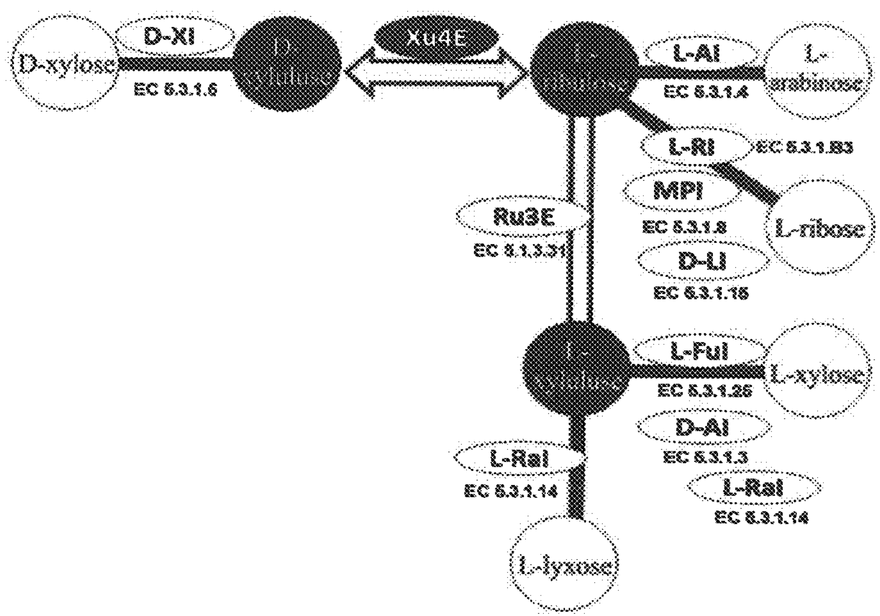
FIG. 3 shows an artificial multienzyme pathways for the conversion of D-xylose to six L-pentoses based on Xu4E, wherein D-XI: D-xylose isomerase (EC 5.3.1.5); L-AI: L-arabinose isomerase (EC 5.3.1.4); L-RI: L-ribose isomerase (EC 5.3.1.B3); MPI: mannose phosphate isomerase (EC 5.3.1.8); D-LI: D-ribose isomerase (EC 5.3.1.15); Ru3E: L-ribulose 3-epimerase (EC 5.1.3.31); L-Ful: L-fucose isomerase (EC 5.3.1.25); D-AI: D-arabinose isomerase (EC 5.3.1.3) and L-Ral: L-rhamnose isomerase (EC 5.3.1.14).

We designed artificial multi-enzyme catalytic pathways for the conversion of D-xylose to six L-pentoses based on Xu4E without a coenzyme NAD(P) (Table 2). With the help of Xu4E and mutants thereof, we designed artificial multi-enzyme catalytic pathways and prepared six L-pentoses (i.e., L-arabinose, L-ribose, L-ribulose, L-xylose, L-lyxose and L-xylulose) from D-xylose by using 4-epimerase, 3-epimerase and aldose isomerase (FIG. 3 and Table 2). These artificial multienzyme pathways do not require the expensive two NAD(P)-dependent oxidoreductases (i.e., aldose reductase and polyol dehydrogenase).

Exemplarily, in the production of L-pentose shown in the present disclosure, the pathway through xylitol or ribitol shown in FIG. 1 is unnecessary.

TABLE 2

Artificial multi-enzyme catalytic pathways for the production of L-pentose from D-xylose based on Xu4E

| Product | Pathway No. | Enzymes used, wherein D-xylulose 4-epimerase (Xu4E) or its isomers are omitted because they are always included |
|---|---|---|
| L-arabinose | 1 | D-xylose isomerase (EC 5.3.1.5) (Bhosale, Rao et al. 1996), L-arabinose isomerase (EC 5.3.1.4) (Izumori, Ueda et al. 1978) |
| L-ribose | 2 | D-xylose isomerase (EC 5.3.1.5) (Bhosale, Rao et al. 1996), L-ribose isomerase (EC 5.3.1.B3) (Izumori, Sugimoto et al. 1980) |
| | 3 | D-xylose Isomerase (EC 5.3.1.5), mannose phosphate isomerase (EC 5.3.1.8) (Kim, Seo et al. 2014) |
| L-ribulose | 4 | D-xylose isomerase (EC 5.3.1.5) (Bhosale, Rao et al. 1996) |
| L-xylulose | 5 | D-xylose isomerase (EC 5.3.1.5), L-ribulose 3-epimerase (EC 5.1.3.31) (Uechi, Takata et al. 2013) |
| L-Xylose | 6 | D-xylose isomerase (EC 5.3.1.5), L-ribulose 3-epimerase (EC 5.1.3.31), L-fucose isomerase (EC 5.3.1.25) (Mortlock 1966) |
| | 7 | D-xylose isomerase (EC 5.3.1.5), L-ribulose 3-epimerase (EC 5.1.3.31), D-arabinose isomerase (EC 5.3.1.3) (Mortlock 1966) |
| | 8 | D-xylose isomerase (EC 5.3.1.5), L-ribulose 3-epimerase (EC 5.1.3.31), L-rhamnose isomerase (EC 5.3.1.14) (Park, Yeom et al. 2010, Kim, Shin et al. 2013) |

TABLE 2-continued

Artificial multi-enzyme catalytic pathways for the production of L-pentose from D-xylose based on Xu4E

| Product | Pathway No. | Enzymes used, wherein D-xylulose 4-epimerase (Xu4E) or its isomers are omitted because they are always included |
|---|---|---|
| L-lyxose | 9 | D-xylose isomerase (EC 5.3.1.5), L-ribulose 3-epimerase (EC 5.1.3.31), L-rhamnose isomerase (EC 5.3.1.14) (Park, Yeom et al. 2010, Kim, Shin et al. 2013) |

Enzymes and/or Mutants Thereof

The novel enzymes disclosed in the present disclosure occur naturally in a variety of organisms. Although specific enzymes with desired activities were used in the examples, the present disclosure is not limited to these enzymes, as other enzymes may have similar activities and can be used. For example, it may be found that some new peptides can also catalyze the interconversion of D-xylulose and L-ribulose. Other reactions described in the present disclosure may be catalyzed by enzymes not described in this embodiment, which is also included in this embodiment.

In some embodiments, mutants of these enzymes may be used in the present disclosure in which the catalytic activity has been altered, for example, to be more active and stable under acidic or basic conditions. Amino acid sequence mutants of polypeptides include substitution, insertion or deletion mutants, and the mutants may be substantially homologous or substantially identical to the unmodified enzyme. In some embodiments, the mutants retain at least some biological activity of the enzyme, e.g., catalytic activity. Other mutants include enzyme mutants that retain at least about 10%, preferably at least about 50%, more preferably at least about 75%, and most preferably at least about 90% biological activity.

A polypeptide or polynucleotide derived from an organism contains one or more modifications to the native amino acid sequence or nucleotide sequence and exhibits similar, if not better, activity than the native enzyme (e.g., at least 10%, at least 30%, at least 50%, at least 70%, at least 80%, at least 90%, at least 100%, or at least 110%, or even higher enzymatic activity of the native enzymatic activity level)). For example, in some cases, enzymatic activity is improved by directed evolution of parental/naturally occurring sequences. Alternatively, the enzyme coding sequence is mutated to obtain a desired property. Exemplarily, the "desired property" is selected from better thermal stability, increased reaction rate, optimum pH change, or metal cofactor preference, and the like.

Forms of Enzyme

Free enzymes or cell lysates containing the enzymes used in the present disclosure are water soluble. It is usually best to use immobilized enzymes. Immobilized enzymes are generally more stable and durable. Immobilized enzymes are also easier to recover and use in multiple catalytic cycles, reducing the cost of the production process. Many enzyme immobilization methods are known in the art. An enzyme can also be cross-linked to form a cross-linked enzyme aggregate (CLEA), which is generally more stable and easier to recover and reuse. Many enzymes are present in living organisms and can act as biocatalysts for the production of rare sugars, but they can also be heterologously expressed in engineered microorganisms and can be then used as biocatalysts.

The recombinases used in the present disclosure can remain in the whole cell without complete cell lysis. The whole cell contains one or more enzymes. In general, it is best to use immobilized whole cells. The whole cell can be permeabilized by many techniques, such as organic solvent treatment, chemical reagent treatment, or heat treatment. Immobilized cells are also easier to recycle and reuse across multiple catalytic cycles, reducing the cost of the production process. In the art, many methods of whole cell permeabilization and whole cell immobilization are known. The present disclosure relates to methods of immobilization and cross-linking of whole cells that catalyze the reactions described in the present disclosure.

Error-Prone PCT

Error-prone PCR is to change the mutation frequency in the DNA amplification process by adjusting the reaction conditions, such as increasing the concentration of magnesium ions, adding manganese ions, changing the concentration of four kinds of dNTPs in the system, or using a low-fidelity DNA polymerase, etc., when using DNA polymerase to amplify the promoter sequence, thereby randomly introducing mutations into a target DNA sequence at a higher mutation frequency, to obtain random mutants against the target sequence.

Process of Producing L-Pentose (1) Production/Separation/Purification Process

The method and composition of the present disclosure can be adapted to a variety of conventional fermentation or enzymatic bioreactors (e.g., batch, fed-batch, cell or enzymatic recycling and continuous fermentation or continuous enzymatic catalysis).

In the embodiments of the present disclosure, the amount of biocatalytic product formed per unit time is generally a function of the catalytic activity conditions (such as pH, temperature, metal ions) of an enzyme and the amount of enzyme present in the catalytic process.

In the embodiments of the present disclosure, the solution containing the metal ions may contain one or more metal ions. Exemplarily, the solution containing metal ions may be selected from solutions containing $CuCl_2$, $FeCl_3$, $ZnCl_2$, $CaCl_2$, $MgCl_2$, $CoCl_2$, $NiCl_2$ or $MnCl_2$.

Some key parameters of efficient microbially catalyzed fermentation processes include enabling microorganisms to grow to larger cell densities, increasing yields of desired products, increasing the amount of volumetric productivity, removing undesired co-metabolites, improving utilization of inexpensive carbon and nitrogen sources, adapting to change fermenter conditions, increasing bacterial production, increasing recombinant enzyme synthesis, increasing tolerance to acidic conditions, increasing tolerance to alkaline conditions, increasing tolerance to organic solvents, increase tolerance to high salt conditions and increasing tolerance to high or low temperatures.

In some examples, a plurality of enzymes, as provided herein, may exist as one or more forms of a free enzyme, a cell lysate containing the enzyme, a whole cell containing the enzyme, and an immobilized enzyme, and carry out biocatalysis in a reaction solution containing a pentose substrate, so that a converted product is generated into the reaction solution. In one example, the enzymatically catalyzed final product can be separated from the reaction solution using any suitable method known in the art.

The L-pentose can be separated from a multienzyme, a reactant, a reaction intermediate, and a biocatalytic product, and the biocatalytic product is recovered and/or purified from the reactant and the reaction intermediate using various methods known in the art. In some embodiments, the biocatalytic product is recovered from the bioreactor. In one example, microorganism is disrupted, and the medium or lysate is centrifuged to remove particulate cell debris and to separate cell membranes, to obtain a soluble protein fraction comprising the enzyme, which can catalyze the production of L-pentose. Separation and purification methods of L-pentose include, but are not limited to, chromatography, simulated moving bed chromatography, crystallization, adsorption and release based on ionic, hydrophobic and size exclusion resins, filtration, microfiltration, ultrafiltration, nanofiltration, centrifugation, extraction, salt or solvent precipitation, drying, or a combination thereof. Desired separation is not limited to enzyme removal/recovery, but also includes recovery of some or all mixtures of the remaining product and reactants (including D-xylose, D-xylulose, L-pentose, and metal ions); the desired separation may not require further purification. With or without recovery of D-xylose, D-xylulose and L-ribulose, and purification, immobilization and recovery of enzymes are further included in the embodiments of the present disclosure.

(2) Production of Polypeptides (Enzymes) in Engineered Microbial Cells

The enzymes described in the present disclosure that catalyze some or all of the reactions can be expressed in non-native, engineered heterologous organisms. Specifically, the genes encoding enzymes for the pathway can be isolated, inserted into an expression vector of an organism for transformational production, can be incorporated into the genome, and directly express the enzymes. In the art, methods for manipulating microorganisms are known, and are described in publications such as Modern Methods in Molecular Biology (Online ISBN: 9780471142720, John Wiley and Sons, Inc.), Microbial Metabolic Engineering: Methods and Protocols (Qiong Cheng Ed., Springer) and Systems Metabolic Engineering: Methods and Protocols (Hal S. Alper Ed., Springer).

Mutants can be constructed by up-regulating or down-regulating expression of a polynucleotide using methods well known in the art, such as insertion, disruption, substitution, or deletion. For example, the polynucleotide to be modified or inactivated may be a coding region or portion thereof necessary for activity, or a regulatory element required for expression of a coding region. An example of such a regulatory or control sequence can be a promoter sequence or a functional portion thereof, i.e., a portion sufficient to affect expression of the polynucleotide. Other control sequences that can be modified include, but are not limited to, leaders, polyadenylation sequences, propeptide sequences, signal peptide sequences, transcription terminators, and transcription activators.

One skilled in the art can grow engineered microbial cells to produce the enzymes. Guidelines and protocols for the production of recombinant enzymes by microbial cells can be found in publications such as the Handbook of Fermentation and Biochemical Engineering: Principles, Process Design and Instrumentation ($2^{nd}$ Edition, Henry C. Vogel and Celeste L. Todaro, Noyes Publications 1997) and Principles of Fermentation Technology ($2^{nd}$ Edition, P. F. Stanbury et. al., Butterworth Heineman, 2003).

(3) Biological Reaction Conditions

In some embodiments of the present disclosure, multiple enzymes are mixed to form an artificial multi-enzyme pathway, which can convert a raw material, such as D-xylose or other intermediate products (D-xylulose), into an L-pentose and recover the L-pentose. The biological reaction process can be carried out under aerobic, micro-aerobic or anaerobic conditions. In other embodiments of the present disclosure, the biocatalytic reaction is carried out under anaerobic conditions (i.e., without detectable oxygen).

In some embodiments of the present disclosure, the biological reaction process is carried out under conditions of 30° C.-90° C. In some specific embodiments of the present disclosure, the biological reaction process is carried out under conditions of 40° C.-80° C. In some mom specific embodiments of the present disclosure, the biological reaction process is carried out under conditions of 50° C.-70° C. In some more specific embodiments of the present disclosure, the biological reaction process is carried out under conditions of 60° C.-70° C.

Preparation of Plasmid and Recombinant Protein

Overexpression of all recombinant proteins was performed using *E. coli* BL21 (DE3). All expression/overexpression methods of recombinant protein involved in the present disclosure can be performed according to the technical solutions described in "Molecular Biology Experiment Guide".

Exemplarily, the pET plasmid carrying a corresponding protein-coding gene is prepared as follows.

In order to prepare L-ribulose 5-phosphate-4-epimerase (RP4E) that may possess Xu4E enzymatic activity, rp4e genes derived from *T. maritima, E. coli, Bacillus subtilis* 168 and *Geobacillus stearothermophilus* are amplified from their corresponding genomes. They are inserted into a pET20b plasmid, and corresponding plasmids pET20b-TmRP4E, pET20b-EcRP4E, pET20b-BsRP4E and pET20b-GsRP4E are constructed by a simple cloning technique based on extended overlap extension PCR (POE-PCR) (You, C., X.-Z. Zhang and Y.-H. P. Zhang (2012). "Simple Cloning: direct transformation of PCR product (DNA multimer) to *Escherichia coli* and *Bacillus subtilis*." Appl. Environ. Microbiol. 78:1593-1595). The reaction conditions of POE-PCR are as follows: 250 ng pET20b plasmid backbone and equimolar target gene fragments, 0.2 mM various dNTPs, and 0.02 U/μl Q5 DNA polymerase. PCR amplification conditions: 98° C. 1 min; 98° C. 20 s, 60° C. 20 s, 72° C. 72 s, 30 cycles; 72° C. 5 min.

To prepare a wild-type D-xylulose 4-epimerase (Xu4E) that may possess Xu4E enzymatic activity, a pair of primers F_UxaE(F) and R_UxaE(R) are used:

```
F(SEQ ID NO: 123):
5'-GAGATATACCCATATGGTCTTGAAAGTGTTCAAAGACC-3 ';

R(SEQ ID NO: 124):
GGTGGTGGTGCTCGAGCCCCTCCAGCAGATCCACGTGCC-3'.
```

The uxaE gene is amplified from the genome of *Thermus marinus* by a PCR method.

Based on pET28a, amplification is performed using a pair of primers F_pET28a(F) and R_pET28a(R):

```
F(SEQ ID NO: 125):
5'-GCTGGAGGGGCTCGAGCACCACCACCACCACCACTG-3';

R(SEQ ID NO: 126):
5'-CTTTCAAGACCATATGGGTATATCTCCTTCTTAAAG-3'
```

Through the POE-PCR method, a multimer plasmid is amplified and transformed into *E. coli* TOP10 to obtain plasmid pET28a-tm_UxaE.

To prepare L-arabinose isomerase (L-AI), the DNA sequence of AI derived from thermotolerant bacterium *Geobacillus steamthermophilus* is codon-optimized and synthesized by Universal Bio (Anhui, China) to obtain plasmid pET20b-BsAI.

Plasmid pET20b-TtcXI encoding thermostable xylose isomerase (D-XI) from *Thermus thermophiles* is obtained from a reference document (Wu et al. 2018).

Unless otherwise specified, all recombinant enzymes possess a histidine fusion tag and are purified by affinity adsorption using a nickel ion resin. A pET plasmid carrying a gene encoding the target protein is cultured in 250 ml of LB medium using *E. coli* BL21 cells at a temperature of 37° C. When the cell absorbance A600 reaches ~0.6-0.8, 0.1 mM IPTG is added to induce the protein expression. The protein expression is carried out for 6 hours at 37° C. or 16 hours at 18° C. After cells are collected by centrifugation, the pellet is resuspended in 50 mM HEPES buffer (pH 7.5) containing 0.1 M sodium chloride and 10 mM imidazole. The cell membrane is disrupted by sonication, and after centrifugation, a sample of the supernatant containing the enzyme is loaded onto a nickel ion resin purification column. The target enzyme is purified by elution using a 50 mM HEPES buffer (pH 7.5) containing 0.1 M sodium chloride and 150-500 mM imidazole. The enzyme concentration can be determined by the Bradford measurement method, with bovine serum albumin used as the standard protein. The expression level of the recombinant protein and the purity of the protein are detected using sodium dodecyl sulfate polyacrylamide gel electrophoresis (SDS-PAGE) and are quantified using the abundance analysis function of Image Lab software (Bio-Rad, Hercules, CA, USA).

Thermostable enzymes for L-arabinose synthesis are D-xylose isomerase from *Thermus thermophiles*, wild-type Xu4E and Xu4E mutant M8 from *T. maritima*, and L-arabinose isomerase from *Geobacillus slearothermophilus*, which can be purified by heat treatment (50-80° C., 10 to 60 minutes). The cell lysate is heat-treated and centrifuged, and the supernatant containing the three enzymes described above is mixed, which can be used for the conversion of D-xylose to L-arabinose.

Construction of Screening Plasmid pGS-X4E and Screening Host *Escherihia coli* JZ919

The screening plasmid pGS-Xu4E includes mCherry gene under the control of a PB, promoter, a wild-type araC gene under the control of a $P_{AraC}$ promoter, and an xu4e gene under the control of a $P_{tac}$ promoter. In *E. coli* cells, a Xu4E-positive mutant can produce more L-arabinose, which induce *E. coli* cells to express higher levels of mCherry fluorescent protein, resulting in a stronger fluorescent signal. Screening plasmids are constructed using standard DNA assembly techniques.

*E. coli* JZ919 (TOP10ΔxylB::araA) is constructed as a screening host and used with the screening plasmid pGS-Xu4E. The screening plasmid pGS-Xu4E carries a gene sensor that can detect the intracellular L-arabinose concentration and display the mCherry fluorescent signal. To accumulate L-arabinose, two genes related to D-xylulose and L-ribulose utilization are knocked out in *E. coli* host cells, and the araA gene is inserted into the *E. coli* genome. Starting from *E. coli* Top10 (ΔaraABCD), the xylB gene in the genome is replaced by the araA gene, and the knockout and insertion are performed simultaneously.

Construction of Xu4E Mutant Library

A mutant library of the xu4e gene is established using error-prone PCR (ep-PCR) with a low mutation rate.

With plasmid pET28a-UxaE as a DNA template, primers are: MUxaE-IF (SEQ ID NO: 127): 5'-CCATATGGTCTTGAA-3'; MUxaE-IR (SEQ ID NO: 128): 5'-GGTGGGTGGCTCGAGCCCCTCCAGCAGATCCACG TGCC-3'.

The mutant library is obtained by PCR amplification. MUxaE-IF is a 5'-terminal phosphorylated primer. The last 28 bp sequence at the 5' end of MUxaE-IR is a homologous complementary sequence to the sequence of the plasmid backbone. A 50 μl ep-PCR reaction system contains 1 ng/μl plasmid pGS-Xu4E, 0.2 mM dATP, 0.2 mM dGTP, 1 mM dCTP, 1 mM dTTP, 5 mM MgCl2, 0.05 mM $MnCl_2$, 0.4 μM primers (MUxaE-IF and MUxaE-IR) and 0.05 U/μl NEB Taq polymerase.

High-Throughput Screening of Xu4E Mutant Library

Chemically competent cells of *E. coli* JZ919 can be prepared according to the prior art, for example, by the method described in "Molecular Biology Experiment Guide". Further, *E. coli* JZ919 cells carrying a uxaE mutant library are cultured on LB solid medium containing D-xylose. After incubation at 37° C. for 12 hours, the colony color is observed every 4 hours. Positive clones are picked by detecting fluorescence intensity of the colonies by eye observation or by UV radiation. Clones showing stronger fluorescence intensity are picked and cultured in a 96 deep-well plate containing 0.5 ml of LB medium supplemented with D-xylose for 12 hours at 37° C. Fluorescence signals from cell culture media in the 96-well plate are measured using a SynergyMx multi-function microplate reader (Berton, Vt., USA). Fluorescence excitation scan is carried out at 589 nm, and emission scan is carried out at 610 nm.

Assay Method for Determining Whether a Polypeptide/Enzyme has Xu4E Enzymatic Activity Preparation of D-xylose/D-xylulose mixture. The D-xylose/D-xylulose mixture is prepared in 1 ml of 50 mM HEPES buffer (pH 7.5) containing 1 M xylose, 5 mM $MgCl_2$ and 50 mg of immobilized D-XI, wherein XI is purchased from Sigma-Aldrich (G4166). After an overnight reaction at 70° C., the immobilized XI is removed by centrifugation. The D-xylose/D-xylulose mixture contains approximately 700 mM xylose and 300 mM xylulose.

The enzyme activity assay of Xu4E is carried out using a step-by-step enzyme activity assay method. The reaction solution is a 50 mM Tris buffer containing 70 mM xylose, 30 mM xylulose and 0.2 mM $Co^{2+}$ or 2 mM $Zn^{2+}$. Unless otherwise specified, Xu4E enzyme activity assay is carried out at 30-80° C. for 15 minutes to 24 hours, and the enzyme protein solubility is 0.001-10 g/L. After Xu4E catalyzed the reaction, 65 μL of the reaction solution is drawn and mixed with 35 μL of 1.88M $HClO_4$, and the mixture was neutralized by adding 13.5 μL of 5M KOH. After centrifugation to remove the precipitate, the second step of transformation reaction is carried out in 50 mM HEPES buffer (pH 7.5) containing 10 U/mL (excess) L-AI and 1 mM $Mn^{2+}$, and the supernatant containing L-ribulose is converted into L-arabinose. The enzymatic reaction is carried out at 50° C. for 15 min. L-arabinose concentration is determined with a Megazyme L-arabinose/D-galactose assay kit (K-ARGA, Bray, Ireland).

To determine kinetic parameters, enzyme activity assays of Xu4E are carried out in 50 mM Tris buffer (pH 8.5) containing 0.2 mM $Co^{2+}$ at 50° C. The total concentration of D-xylose and D-xylulose is 1.5 to 1000 mM, and the concentration of D-xylulose is 0.5 to 300 mM. Enzyme activity assays are carried out at 50° C. for 15 min. A nonlinear fitting of the apparent $K_m$ and $k_{cat}$ constants of Xu4E for D-xylulose based on the Michaelis-Menten equation is calculated using GraphPad Prism 5 software (Graphpad Software, Inc., Los Angeles, CA, USA).

Production of L-Arabinose from D-Xylose

The production of L-arabinose from 50 mM D-xylose is carried out in a 1 mL reaction system which is 100 mM HEPES buffer (pH 8.0) containing 0.2 mM $Co^{2+}$, 1 mM $Mn^{2+}$, 1 g/L Xu4E (a wild type, its DNA sequence SEQ ID No: 1, and a representative mutant M8, its amino acid sequence SEQ ID No: 40), 1 U/mL D-XI and 1 U/mL L-AI. When L-arabinose is produced from 500 mM D-xylose, the concentration of Xu4E is increased to 10 g/L, while the concentrations of D-XI and L-AI are also increased to 10 U/mL. The reaction solution reacts at 50° C. after the three enzymes are mixed. The concentration of L-arabinose is determined using a Megazyme L-arabinose/D-galactose assay kit (K-ARGA, Bray, Ireland), whereas D-xylose, D-xylulose and L-ribulose have their concentrations detected using a Shimadzu high performance liquid chromatography equipped with a refractive index detector and are separated with a Bio-Rad Aminex HPLC HPX-87H liquid column.

Confirmation that the Product Produced by Xu4E Using D-Xylulose is L-Ribulose

A product L-ribulose obtained by a wild-type or mutant Xu4E is analyzed using LC-ESI-QTOF-MS. A 1 mL reaction system contains 50 mM Tris buffer (pH 8.5), 10 mM D-xylulose, 0.2 mM $Co^{2+}$ and 1 g/L Xu4E. After carrying out at 50° C. for 1 hour, the reaction is stopped by the addition of 538 μL of $HClO_4$. The mixture is neutralized by adding 207 μL of 5M KOH. Inactivated proteins and precipitates are removed by centrifugation, the sample is separated by Shimadzu high performance liquid chromatography, and the product is detected by quadrupole time-of-flight tandem mass spectrometry QTOF (compact QTOF, Bruker, Germany) equipped with electrospray ionization (ESI). A Waters Sugar Pak I calcium ion exchange column (300×6.5 mm, a particle size of 10 μm) is used as a stationary phase for sample separation (Waters Co, Milford, MA, USA). The mobile phase is deionized water, the flow rate is 0.5 mL/min, the column temperature is 80° C., and the loading volume is 20 82 l. ESI uses a negative ion mode. The capillary voltage is 4500 V, the sprayer pressure is 2 bar, the drying heater is 200° C., and the drying airflow is 8 L/min.

Fermentation Product or Cell Lysate

The present disclosure also relates to a fermentation product or a cell lysate comprising the polypeptide of the present disclosure. The fermentation product further comprises additional components used in the fermentation process, such as whole cells (including host cells containing genes encoding the polypeptide of the present disclosure, which are used to produce the polypeptide of interest), or cell lysates. In some embodiments, the composition contains whole cells with inactivated enzymes, cell lysates with inactivated enzymes and whole culture fluid with media and inactivated cells.

Simulated Moving Bed Separation

Simulated moving bed (SMB) is a mass transfer device performing liquid separation operation by using a principle of adsorption, which is carried out in a countercurrent continuous operation mode. Industrial SMB has been increasingly used to separate low value-added biological products such as organic acids, amino acids and rare sugars. By combining enzyme immobilization and SMB separation, it is possible to effectively reduce the production cost of the required L-pentose and improve the utilization efficiency of the substrate. Exemplary, SMB resins include a resin used in Shodex Sugar KS-801 sodium ion exchange column, Waters Sugar Pak I calcium ion exchange column, Bio-Rad Aminex HPX-87P lead ion exchange column, or Bio-Rad Aminex HPX-87H hydrogen ion exchange column, or other similar resins, or a series combination thereof.

EXAMPLES

Other objects, features and advantages of the present disclosure will become apparent from the following detailed description. It should be understood, however, that the detailed description and specific examples, while indicating specific embodiments of the present disclosure, are given for illustrative purposes only, because after reading this detailed description, various variations and modifications will become apparent to persons skilled in the art.

All reagents used in the examples, unless otherwise specified, are commercially available.

Materials and Methods

Medicines and Materials

Unless otherwise specified, all medicines were of analytical or higher purity and were purchased from Sigma-Aldrich (St. Louis, Missouri, USA) or China Sinopharm Group (Shanghai, China). The genomic DNA of *Thermotoga maritima* MSB8 and *Aquifex aeolicus* were purchased from American Type Culture Collection (Manassas, Virginia, USA). *E. coli* TOP10 and DH5α (Thermo Fisher Scientific, Waltham, MA, USA) were used for DNA manipulation and plasmid amplification. *E. coli* BL21(DE3) (Invitrogen Biotech Co., Ltd., Carlsbad, CA, USA) was used for the expression of recombinant proteins.

In the technical solutions of the present disclosure, the meanings represented by the numbers in the nucleotide and amino acid sequence listings of the specification are as follows:

SEQ ID NO: 1 shows the nucleotide sequence of a wild-type tagaturonate 3-epimerase gene (NCBI reference sequence: WP_004081526.1, KEGG ID TM0440) of *Thermotoga maritima* MSB8;

SEQ ID NO: 2 shows the amino sequence of a wild-type tagaturonate 3-epimerase gene (NCBI reference sequence: WP_004081526.1, KEGG ID TM0440) of *Thermotoga maritima* MSB8;

SEQ ID NO: 3 shows the amino acid sequence of a tagaturonate 3-epimerase gene (NCBI reference sequence: WP_015918744.1) of *Thermotoga neapolitana;*

SEQ ID NO: 4 shows the amino acid sequence of a tagaturonate 3-epimerase gene (NCBI reference sequence: WP_101512888.1) of *Thermotogas sp* SG1;

SEQ ID NO: 5 shows the amino acid sequence of a tagaturonate 3-epimerase gene (NCBI reference sequence: WP_041077375.1) of *Thermotoga caldifontis;*

SEQ ID NO: 6 shows the amino acid sequence of a tagaturonate 3-epimerase gene (NCBI reference sequence: WP_012002872.1) of *Pseudothermotoga lettingae;*

SEQ ID NO: 7 shows the amino acid sequence of a tagaturonate 3-epimerase gene (NCBI reference sequence: WP_081374543.1) of *Halanaerobium congolense;*

SEQ ID NO: 8 shows the amino acid sequence of a 4-epimerase gene (NCBI reference sequence: TYP53248.1) of *Thermosedimibacter litoriperuensis;*

SEQ ID NO: 9 shows the amino acid sequence of a 4-epimerase gene (NCBI reference sequence: WP_012844026.1) of *Rhodothermus marinus;*

SEQ ID NO: 10 shows the amino acid sequence of a 4-epimerase gene (NCBI reference sequence: WP_066188474.1) of *Gracilibacillus timonensis;*

SEQ ID NO: 11 shows the amino acid sequence of a 4-epimerase gene (NCBI reference sequence: HCZ06146.1) of *Thermotogae bacterium;*

SEQ ID NO: 12 shows the amino acid sequence of a 4-epimerase gene (NCBI reference sequence: RKX45454.1) of *Thermotogae bacterium;*

SEQ ID NO: 13 shows the amino acid sequence of a 4-epimerase gene (NCBI reference sequence: HAF71394.1) of *Candidatus Acetothermia bacterium;*

SEQ ID NO: 14 shows the amino acid sequence of a 4-epimerase gene (Kegg ID: Theth_1083) of *Pseudothermotoga thermarum;*

SEQ ID NO: 15 shows the amino acid sequence of a 4-epimerase gene (Kegg ID: Tthe_2391) of *Thermoanaerobacterium thermosaccharolyticum* DSM 571;

SEQ ID NO: 16 shows the amino acid sequence of a 4-epimerase gene (Kegg ID: TCARB_0828) of *Thermofilum adornatus* 1505;

SEQ ID NO: 17 shows the amino acid sequence of a 4-epimerase gene (Kegg ID: Thit_1746) of *Thermoanaerobacter italicus;*

SEQ ID NO: 18 shows the amino acid sequence of a 4-epimerase gene (Kegg ID: Tnap_0222) of *Thermotoga naphthophila;*

SEQ ID NO: 19 shows the amino acid sequence of a 4-epimerase gene (Kegg ID: Cst_c08510) of *Thermoclostridium stercorarium* DSM 8532;

SEQ ID NO: 20 shows the amino acid sequence of a 4-epimerase gene (Kegg ID: DICTH_1923) of *Dictyoglomus thermophilum;*

SEQ ID NO: 21 shows the amino acid sequence of a 4-epimerase gene (Kegg ID: STHERM_c04350) of *Spirochaeta thermophila* DSM 6192;

SEQ ID NO: 22 shows the amino acid sequence of a 4-epimerase gene (Kegg ID: Sinac_2806) of *Singulisphaera acidiphila;*

SEQ ID NO: 23 shows the amino acid sequence of a D-xylulose 5-phosphate 4-epimerase gene (Kegg ID: TM0283) of *Thermotoga maritima* MSB8;

SEQ ID NO: 24 shows the amino acid sequence of a D-xylulose 5-phosphate 4-epimerase gene (NCBI Reference Sequence: WP_041077291.1) of *Thermotoga caldifontis;*

SEQ ID NO: 25 shows the amino acid sequence of a D-xylulose 5-phosphate 4-epimerase gene (GenBank: ACM22577.1) of *Thermotoga neapolitana* DSM 4359;

SEQ ID NO: 26 shows the amino acid sequence of class II aldolase of *Pseudothermotoga lettingae* (GenBank: KUK21094.1);

SEQ ID NO: 27 shows the amino acid sequence of a D-xylulose 5-phosphate 4-epimerase gene (Kegg ID: BSU28780) of *Bacillus subtilis;*

SEQ ID NO: 28 shows the amino acid sequence of a D-xylulose 5-phosphate 4-epimerase gene (NCBI Reference Sequence: WP_060788488.1) of *Geobacillus zalihae;*

SEQ ID NO: 29 shows the amino acid sequence of a D-xylulose 5-phosphate 4-epimerase gene (GenBank: KFL15052.1) of *Geobacillus stearothermophilus;*

SEQ ID NO: 30 shows the amino acid sequence of a D-xylulose 5-phosphate 4-epimerase gene (NCBI Reference Sequence: WP_042385633.1) of *Parageobacillus thermoglucosidasius;*

SEQ ID NO: 31 shows the amino acid sequence of a D-xylulose 5-phosphate 4-epimerase gene (NCBI Reference Sequence: WP_094043878.1) of *Thermoanaerobacterium thermosaccharolyticum;*

SEQ ID NO: 32 shows the amino acid sequence of a D-xylulose 5-phosphate 4-epimerase gene (Kegg ID: b0061) of *Escherichia coli* K-12MG1655.

SEQ ID NOs: 33-122 show mutants constructed by the inventors. For the specific mutation positions of the mutants, please refer to the description in Table 3 of the present disclosure.

It should be noted that, according to the contents disclosed in databases (e.g., GenBank) of the prior art, nucleotide sequences corresponding to the amino acid sequences as set forth in SEQ ID NOs: 3-32 am also contents known by persons skilled in the art.

Example 1 Separation and Detection of Pentoses

D-xylose, D-xylulose, D-ribulose and L-arabinose were separated by using any of the methods described in (1)-(4) below:

(1) Separation was carried out with a Bio-Rad Aminex HPLC HPX-87H liquid-phase ion exchange column, under the following separation conditions: a column temperature was 60° C., a mobile phase was 5 mM sulfuric acid, and a flow rate was 0.6 mL/min.

(2) Bio-Rad Aminex HPX-87P lead ion exchange column, the column temperature was 80° C., the mobile phase was deionized water, and the flow rate was 0.6 mL/min;

(3) Waters Sugar Pak I calcium ion exchange column, the column temperature was 80° C., the mobile phase was deionized water, and the flow rate was 0.5 mL/min.

(4) Shodex Sugar KS-801 sodium ion exchange column, the column temperature was 70° C., the mobile phase was deionized water, and the flow rate was 0.5 mL/min.

For D-xylose, D-xylulose, D-ribulose and L-arabinose separated by the methods of (1)-(4) above, the concentration thereof could be detected using a Shimadzu high performance liquid chromatography equipped with a differential refractive index detector.

Figure 4:
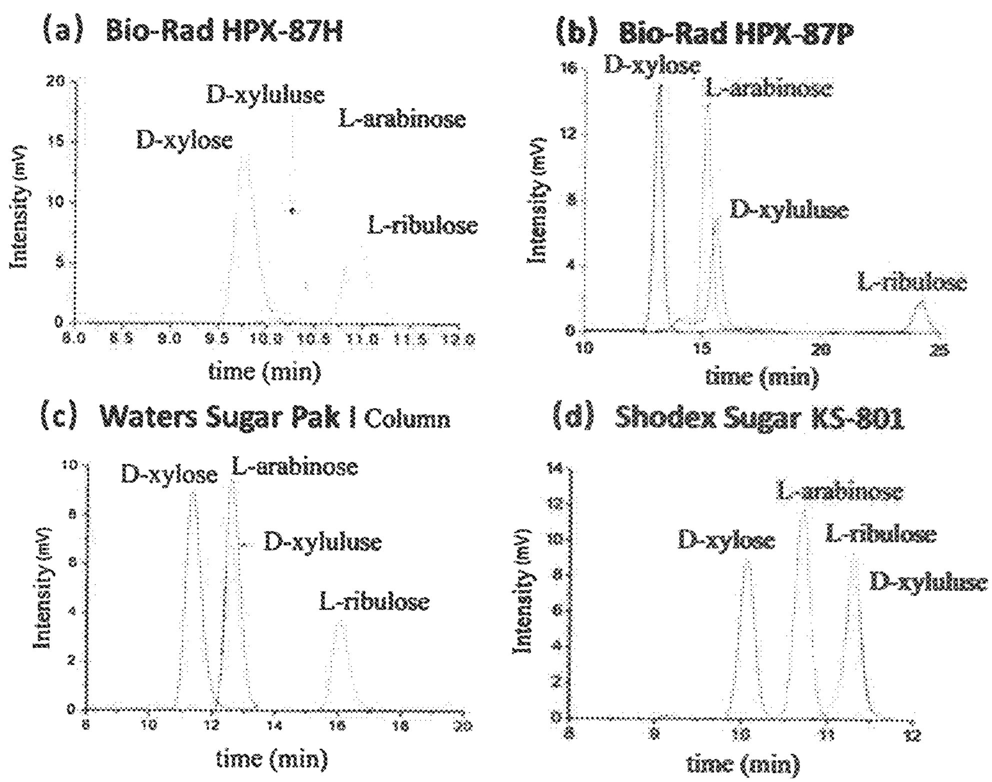
FIG. 4 shows the results of HPLC chromatographic separation of four rare sugars. Wherein, (a) shows the use of Bio-Rad Aminex HPX-87H hydrogen ion exchange column, of which the separation conditions are as follows: a column temperature of 60° C., a mobile phase being 5 mM sulfuric acid, and a flow rate of 0.6 mL/min. (b) shows the use of Bio-Rad Aminex HPX-87P lead ion exchange column, of which the separation conditions are as follows: a column temperature of 60° C., a mobile phase being deionized water, and a flow rate of 0.6 mL/min. (c) shows the use of Waters Sugar Pak 1 calcium ion exchange column, of which the separation conditions are as follows: a column temperature of 80° C., a mobile phase being deionized water, and a flow rate of 0.5 mL/min. (d) shows the use of Shodex Sugar KS-801 sodium ion exchange column, of which the separation conditions are as follows: a column temperature of 70° C., a mobile phase being deionized water, and a flow rate of 0.5 mL/min.

Experimental results: for D-xylose, D-xylulose, D-ribulose and L-arabinose, the effect of chromatographic separation by HPLC shown in (1)-(4) above is shown in FIG. 4. Among them, the HPLC separation conditions shown in (1) had the best separation effect.

Example 2 Mining of Enzymes with Xu4E Function from L-Ribulose-5-Phosphate 4-Epimerase Considering similarity of the substrate structure and possible enzymatic catalysis mechanism, we selected from the L-ribulose-5-phosphate 4-epimerase family (RP4E, EC 5.1.3.4) an Xu4E enzyme that may have a function of converting D-xylulose to L-ribulose. We cloned four RP4Es from *Bacillus subtilis* 168, *Geobacillus slearothermophilus, Escherichia coli*, and *T. maritima*, respectively, and cloned them to pET plasmids. *E. coli* BL21 (DE3) carrying an expression plasmid was cultured and expressed a recombinant protein.

After a protein with His-tag was purified by affinity adsorption, the obtained recombinant protein was detected by the "*Assay method for determining whether a polypeptide/enzyme has Xu4E enzymatic activity*" described in the present disclosure. According to the detection results, three RP4Es derived from *T. marbnus, B. subtilis* 168 and *G. steaothermophilus* showed a certain Xu4E activity, and a specific activity thereof was about 0.0002-0.0003 U/mg, while the *E. coli*-derived RP4E had a specific activity lower than 0.0001 U/mg.

Based on the above experimental results, we cloned corresponding rp4e genes from more microorganisms with L-ribulose-5-phosphate 4-epimerase family (RP4E, EC5.1.3.4) and cloned them to pET plasmids. *E. coli* BL21 (DE3) carrying said expression plasmid was cultured and expressed a recombinant protein. Further, the obtained recombinant protein was detected by the "Assay method for determining whether a polypeptide/enzyme has Xu4E enzymatic activity" described in the present disclosure.

By said experimental method, it was found that natural enzymes with Xu4E enzyme activity were enzymes encoded by sequences as set forth in SEQ ID NOs: 23-32.

Example 3 Mining New Enzymes with Xu4E Function from Tagaturonate 3-Epimerase Considering similarity of the substrate structure and possible enzymatic catalysis mechanism, we adopted a method similar to that in Example 2, and selected new enzymes that have the potential to convert D-xylulose to L-ribulose from tagaturonate 3-eimerase (UxaE, EC 5.1.2.7). We cloned multiple uxae genes from different microorganisms and cloned them into pET plasmids. *E. coli* BL21 (DE3) carrying an expression plasmid was cultured and expressed a recombinant protein.

After a protein with His-tag was purified by affinity adsorption, the obtained recombinant protein was detected by the "*Assay method for determining whether a polypeptide/enzyme has Xu4E enzymatic activity*" described in the present disclosure. According to the detection results, the tagaturonate 3-epimerase (Tm0440) from *Thermus marinus* showed a specific enzyme activity of about 0.012 U under unoptimized reaction conditions (70° C., 5 mM $Zn^{2+}$) U/mg.

By said experimental method, it was found that natural enzymes with Xu4E enzyme activity were enzymes encoded by sequences as set forth in SEQ ID NOs: 2-22.

Example 4 Xu4E Mutant M4 with Enhanced Activity

We used tagaturonate 3-epimerase (TmXu4E), which was derived from *Thermospora marina* and had high thermal stability and high catalytic promiscuous activity, as a natural enzyme for directed evolution, wherein the amino acid sequence of said TmXu4E is a sequence as set forth in SEQ ID NO: 2, and the nucleotide sequence encoding said amino acid is a sequence as set forth in SEQ ID NO: 1.

We used error-prone PCR with a low mutation rate (i.e., generating ~1 mutation position per gene) to construct a library of xu4e mutants. The library of mutants inserted into plasmid pGS-Xu4E was transformed into a host *E. coli* JZ919 and plated on a solid plate of LB medium containing D-xylose. Approximately 10,000 clones were screened on the plate, and positive mutants were picked and seeded into a 96-well plate and cultured in LB medium containing D-xylose. By using the "*High-throughput screening of Xu4E mutant library*" method described in the present disclosure, we used a microplate reader to detect fluorescent signals of the cell culture fluid in the microplate to confirm positive mutants. Several positive mutants were picked in each round.

Figure 5:
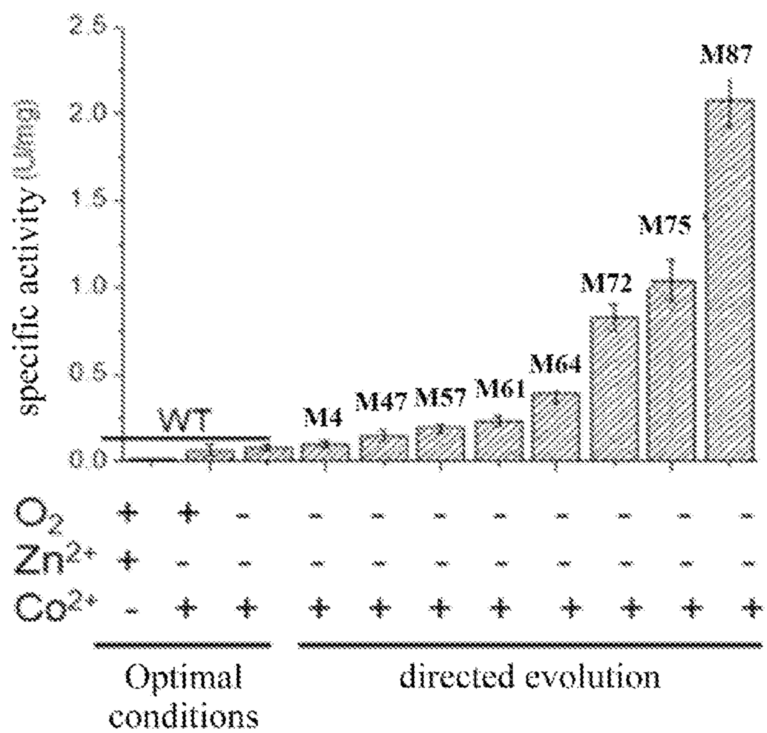
FIG. 5 shows a comparison of the specific enzymatic activities of wild-type Xu4E and 8 representative Xu4E mutants obtained by directed evolution under different reaction conditions.

From the screened mutants, we selected a mutant M4 containing S125D. We tested the specific enzyme activity of mutant M4. It was found that M4 exhibited a 25% increase in specific enzyme activity relative to the native enzyme (FIG. 5).

Example 5 Xu4E Mutant M47 with Further Enhanced Activity

Starting from the mutant M2 selected in Example 4, we used error-prone PCR with a low mutation rate (i.e., generating ~1 mutation position per gene) to construct a library of xu4e mutants. The library of mutants inserted into plasmid pGS-Xu4E was transformed into a host *E. coli* JZ919 and plated on a solid plate of LB medium containing D-xylose. Approximately 10,000 clones were screened on the plate, and positive mutants were picked and seeded into a 96-well plate and cultured in LB medium containing D-xylose. We used a microplate reader to detect fluorescent signals of the cell culture fluid in the microplate to confirm positive mutants.

From the screened mutants, we selected a mutant M47 containing two amino acid mutations S125D/N297F. We tested the specific enzyme activity of said mutant M47. It was found that M47 exhibited higher specific enzymatic activity (FIG. 5).

Example 6 Xu4E Mutant M57 with Further Enhanced Activity

Starting from the mutant M47 selected in Example 5, we used error-prone PCR with a low mutation rate (i.e., generating ~1 mutation position per gene) to construct a library of xu4e mutants. The library of mutants inserted into plasmid pGS-Xu4E was transformed into a host *E. coli* JZ919 and plated on a solid plate of LB medium containing D-xylose. Approximately 10,000 clones were screened on the plate, and positive mutants were picked and seeded into a 96-well plate and cultured in LB medium containing D-xylose. We used a microplate reader to detect fluorescent signals of the cell culture fluid in the microplate to confirm positive mutants.

From the screened mutants, we selected a mutant M57 containing three amino acid mutations S125D/V267I/N297F. We tested the specific enzyme activity of said mutant M57. It was found that M57 exhibited higher specific enzymatic activity (FIG. 5).

Example 7 Xu4E Mutant M61 with Further Enhanced Activity

Starting from the mutant M57 selected in Example 6, we used error-prone PCR with a low mutation rate (i.e., generating ~1 mutation position per gene) to construct a library of xu4e mutants. The library of mutants inserted into plasmid pGS-Xu4E was transformed into a host *E. coli* JZ919 and plated on a solid plate of LB medium containing D-xylose. Approximately 20,000 clones were screened on the plate, and positive mutants were picked and seeded into a 96-well plate and cultured in LB medium containing D-xylose. We used a microplate reader to detect fluorescent signals of the cell culture fluid in the microplate to confirm positive mutants.

From the screened mutants, we selected a mutant M61 containing four amino acid mutations S125D/V163K/V267I/N297F. We tested the specific enzyme activity of said mutant M61. It was found that M61 exhibited higher specific enzymatic activity (FIG. 5).

Example 8 Xu4E Mutant M64 with Further Enhanced Activity

Starting from the mutant M61 selected in Example 7, we used error-prone PCR with a low mutation rate (i.e., generating ~1 mutation position per gene) to construct a library of xu4e mutants. The library of mutants inserted into plasmid pGS-Xu4E was transformed into a host *E. coli* JZ919 and plated on a solid plate of LB medium containing D-xylose. Approximately 15,000 clones were screened on the plate, and positive mutants were picked and seeded into a 96-deep well plate and cultured in LB medium containing D-xylose. We used a microplate reader to detect fluorescent signals of the cell culture fluid in the microplate to confirm positive mutants.

From the screened mutants, we selected a mutant M64 containing five amino acid mutations S125D/V163K/V267I/N297F/Y403W. We tested the specific enzyme activity of said mutant M64. It was found that M64 exhibited higher specific enzymatic activity (FIG. 5).

Example 9 Xu4E Mutant M72 with Further Enhanced Activity

Starting from the mutant M64 selected in Example 8, we used error-prone PCR with a low mutation rate (i.e., generating ~1 mutation position per gene) to construct a library of xu4e mutants. The library of mutants inserted into plasmid pGS-Xu4E was transformed into a host *E. coli* JZ919 and plated on a solid plate of LB medium containing D-xylose. Approximately 12,000 clones were screened on the plate, and positive mutants were picked and seeded into a 96-well plate and cultured in LB medium containing D-xylose. We used a microplate reader to detect fluorescent signals of the cell culture fluid in the microplate to confirm positive mutants.

From the screened mutants, we selected a mutant M72 containing six amino acid mutations S125D/V163K/V267I/N297F/S402V/Y403W. We tested the specific enzyme activity of said mutant M72. It was found that M72 exhibited higher specific enzymatic activity (FIG. 5).

Example 10 Xu4E Mutant M75 with Further Enhanced Activity

Starting from the mutant M72 selected in Example 9, we used error-prone PCR with a low mutation rate (i.e., generating ~1 mutation position per gene) to construct a library of xu4e mutants. The library of mutants inserted into plasmid pGS-Xu4E was transformed into a host *E. coli* JZ919 and plated on a solid plate of LB medium containing D-xylose. Approximately 18,000 clones were screened on the plate, and positive mutants were picked and seeded into a 96-well plate and cultured in LB medium containing D-xylose. We used a microplate reader to detect fluorescent signals of the cell culture fluid in the microplate to confirm positive mutants.

From the screened mutants, we selected a mutant M75 containing seven amino acid mutations S125D/V163K/V267I/N297F/W306M/S402V/Y403W. We tested the specific enzyme activity of said mutant M75. It was found that M75 exhibited higher specific enzymatic activity (FIG. 5).

Example 11 Xu4E Mutant M87 with Further Enhanced Activity

Starting from the mutant M72 selected in Example 9, we used error-prone PCR with a low mutation rate (i.e., generating 1 to 2 mutation positions per gene) to construct a library of xu4e mutants. The library of mutants inserted into plasmid pGS-Xu4E was transformed into a host *E. coli* JZ919 and plated on a solid plate of LB medium containing D-xylose. Approximately 25,000 clones were screened on the plate, and positive mutants were picked and seeded into a 96-deep well plate and cultured in LB medium containing D-xylose. We used a microplate reader to detect fluorescent signals of the cell culture fluid in the microplate to confirm positive mutants.

From the screened mutants, we selected a mutant M87 containing nine amino acid mutations S125D/R131S/V163K/V267I/N297F/W306M/Q318K/S402V/Y403W. We tested the specific enzyme activity of said mutant M87. It was found that the amino acid sequence of said mutant M87 is the sequence as set forth in SEQ ID NO:119.

Example 12 Determination of Specific Enzyme Activity of Mutant M87

We compared the specific enzyme activity of the mutant M87 obtained in Example 11 with wild-type Xu4E (FIG. 5).

According to the comparison results, the specific enzyme activity of the mutant M87 was about 2 U/mg. That is to say, the mutant had significantly increased specific enzyme activity as compared with the wild-type Xu4E.

Example 13 Preparation of Mutants with Single Point Amino Acid Mutation

Starting from a wild-type TmXu4E, by the method of "*Construction of Xu4E mutant library*" described in the present disclosure, we prepared a library of mutants at nine single amino acid positions by changing one amino acid residue in wild-type TmXu4E by site-saturation mutagenesis. Wherein, the amino acid sequence of said wild-type TmXu4E was the sequence as set forth in SEQ ID NO: 2, and the nucleotide sequence encoding said amino acid was the sequence as set forth in SEQ ID NO: 1.

The nine amino acid mutation positions were selected from mutant M87, and they were serine at position 125, arginine at position 131, valine at position 161, valine at position 267, and asparagine at position 297, tryptophan at position 306, glutamine at position 318, serine at position 402, or tyrosine at position 403. The library of the nine mutants was inserted into plasmid pGS-Xu4E of host *E. coli* JZ919 and plated on each LB medium containing D-xylose. Positive mutants were screened by the "*High-throughput screening of Xu4E mutant library*" method described in the present disclosure. As compared to the wild-type enzyme, positive mutants were validated in 96-well microplates and sequenced by DNA sequencing.

From the mutants obtained from the screening, we selected the following 9 mutants: S125D, R131S, V163K, V267I, N297F, W306M, Q318K, S402V and Y403W, wherein the amino acids in said mutants were all numbered according to SEQ ID NO: 2.

Figure 6:
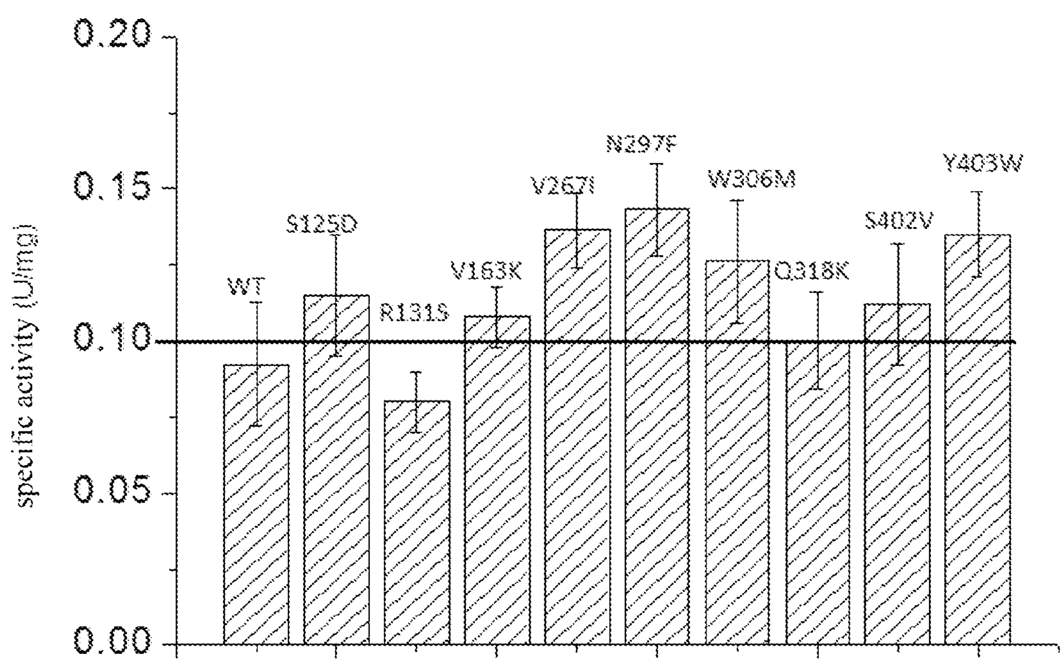
FIG. 6 shows the effect of single amino acid residue changes based on wild-type TmXu4E on its specific activity.

The 9 mutants were overexpressed in *E. coli* BL21(DE3) and purified by affinity adsorption on a nickel-containing ion resin. The specific activities of Xu4E enzymes of mutants S125D, V163K, V267I, N297F, W306M, Q318K, S402V and Y403W are shown in FIG. 6. Among them, eight mutants had higher specific activities than wild-type TmXu4E, while one mutant, the R131S variant, had a slightly lower specific activity than wild-type TmXu4E.

Example 14 Preparation and Specific Enzyme Activity Determination of Multipoint Amino Acid Xu4E Mutants By the same method as Example 4 to Example 11, we further screened Xu4E mutants.

After screening, we obtained the following multipoint amino acid mutants based on Xu4E (wherein, the Xu4E mutants were all numbered according to SEQ ID NO: 2):

M41 (double mutation): V267I/N297F;

M46 (double mutation): W306M/Y403W;

M50 (triple mutation): V163K/V267I/Y403W;

M58 (quadruple mutations): V163K/V267I/N297F/Y403W;

M68 (sextuple mutations): V163K/V267I/N297F/W306M/S402V/Y403W;

M78 (septuple mutations): R131S/V163K/V267I/N297F/W306M/S402V/Y403W.

The specific enzyme activity of said mutants was detected by the method of "*Xu4E enzyme activity assay*" described in the present disclosure.

From the experimental results, the enzymatic activities of M41, M46, M50, M58, M68, and M78 were about 0.30 U/mg, 0.21 U/mg, 0.18 U/mg, 0.33 U/mg, 0.41 U/mg, 0.57 U/mg, respectively.

Example 15 Preparation and Specific Enzyme Activity Determination of Single-Point Amino Acid Xu4E Mutants By the same method as Example 4, we obtained a library of Xu4E mutants.

The Xu4E mutants we obtained were as follows (wherein, said Xu4E mutants were all numbered according to SEQ ID NO: 2):

M13 (single mutation): D161A;

M19 (single mutation): E266A;

M1 (single mutation): G102L;

M30 (single mutation): K337D;

M31 (single mutation): D394M.

According to the experimental results, the enzymatic activities of M13, M19, M1, M30, and M31 were about 0.008 U/mg, 0.013 U/mg, 0.03 U/mg, 0.06 U/mg, and 0.04 U/mg, respectively.

In view of the above experimental results, although said Xu4E mutants had specific enzymatic activities reduced to a certain extent as compared with wild-type TmXu4E (0.09 U/mg), they still had Xu4E enzymatic activity.

Example 16 Simple Purification of Recombinant Thermostable Enzymes

Figure 7:
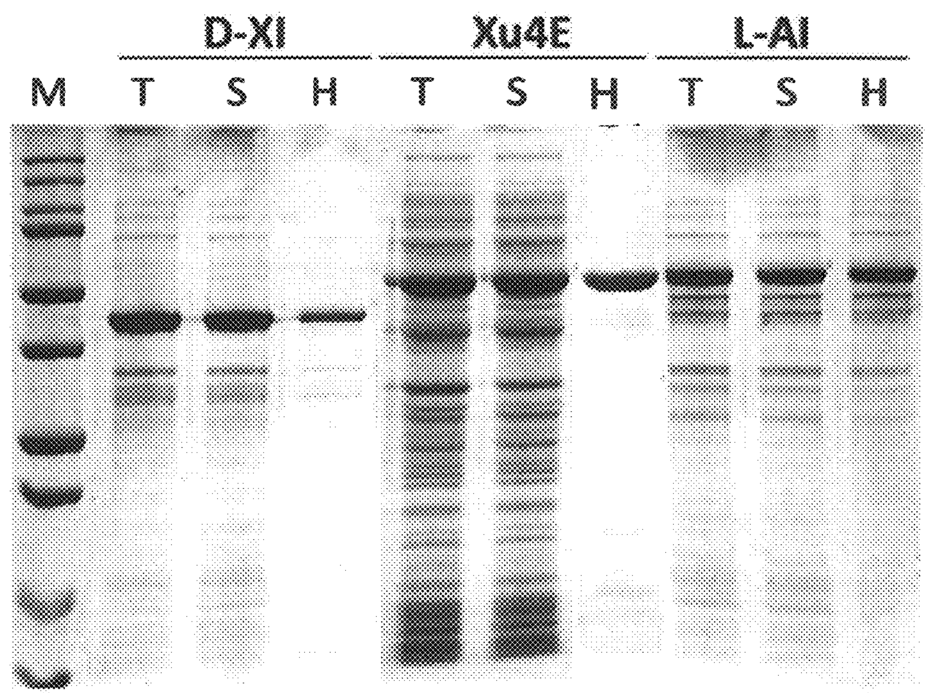
FIG. 7 shows SDS-PAGE analysis of three thermostable enzymes (i.e., D-XI, Xu4E and L-AI) expressed in *E. coli* BL21 (DE3) purified by heat treatment. T: total cell lysate, S: supernatant, H: heat-treated cell lysate.

D-xylose isomerase derived from *T. thermophiles*, Xu4E derived from *T. maritima*, and L-arabinose isomerase derived from *G. stearothermophilus* were heterologously expressed in *E. coli* BL21 (DE3). After the cells were collected and disrupted, the supernatant of the cell lysate was subjected to heat treatment (70° C., 20 min). After centrifugation, the supernatants containing the three thermostable enzymes were mixed for the bioconversion of D-xylose to L-arabinose. The expression level of the target protein and the purity of the purified protein were detected by SDS-PGAE (FIG. 7).

Example 17 Synthesis of L-Ribulose from D-Xylose

We constructed a two-enzyme system comprising D-xylose isomerase (D-XI) and Xu4E mutant M87 with 50 mM D-xylose as a substrate. The reaction mixture comprised 100 mM HEPES buffer (pH 8.0), 0.2 mM $Co^{2+}$, 1 mM $Mn^{2+}$, 1 g/L Xu4E M8 and 1 U/mL XI. The reaction solution was gently mixed and reacted under an anaerobic condition at 50° C.

After 12 hours of reaction, as detected by HPLC, L-ribulose was successfully obtained. It was proved that the artificial route result was consistent with the design.

Example 18 Synthesis of L-Arabinose Using 50 mM D-Xylose

We constructed a three-enzyme system comprising D-xylose isomerase (D-XI), Xu4E mutant M87 and L-arabinose synthase (L-AI) with 50 mM D-xylose as a substrate. The reaction mixture was 100 mM Tris buffer (pH 8.0) comprising 0.2 mM $Co^{2+}$, 1 mM $Mn^{2+}$, 1 g/L Xu4E (wherein Xu4E was selected from the wild type or M87 mutant), 1 U/mL D-XI and 1 U/mL L-AI. The three enzymes mixed with the reaction solution containing the substrate and reacted at 50° C.

Figure 8:
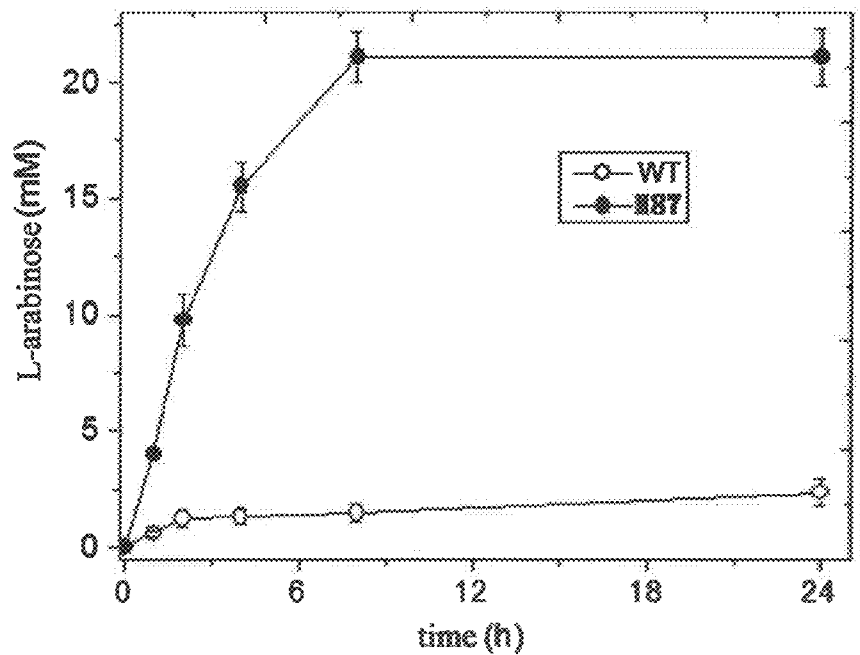
FIG. 8 shows the one-pot production of L-arabinose from 50 mM D-xylose. L-arabinose is produced in 100 mM HEPES buffer (pH 8.0) containing 1 U/mL XI and 1 U/mL AI, 0.2 mM $Co^{2+}$, 1 mM $Mn^{2+}$, 1 mg/mL Xu4E (wild type or a mutant). The reaction is carried out at 50° C. under an anoxic condition.

The three-enzyme system containing the Xu4E mutant M87 produced 21 mM L-arabinose after 8 hours of reaction, while the three-enzyme system containing the wild type produced only 1.25 mM L-arabinose after 24 hours of reaction (FIG. 8).

Example 19 Synthesis of L-Arabinose Using 500 mM D-Xylose

We constructed a three-enzyme system comprising D-xylose isomerase (D-XI), Xu4E mutant M87 and L-arabinose synthase (L-AI) with 500 mM D-xylose as a substrate. The reaction mixture comprised 100 mM Tris buffer (pH 8.0), 0.2 mM $Co^{2+}$ and 1 mM $Mn^{2+}$. The concentration of Xu4E was 15 g/L, and the concentrations of XI and AI were increased to 20 U/mL.

Figure 9:
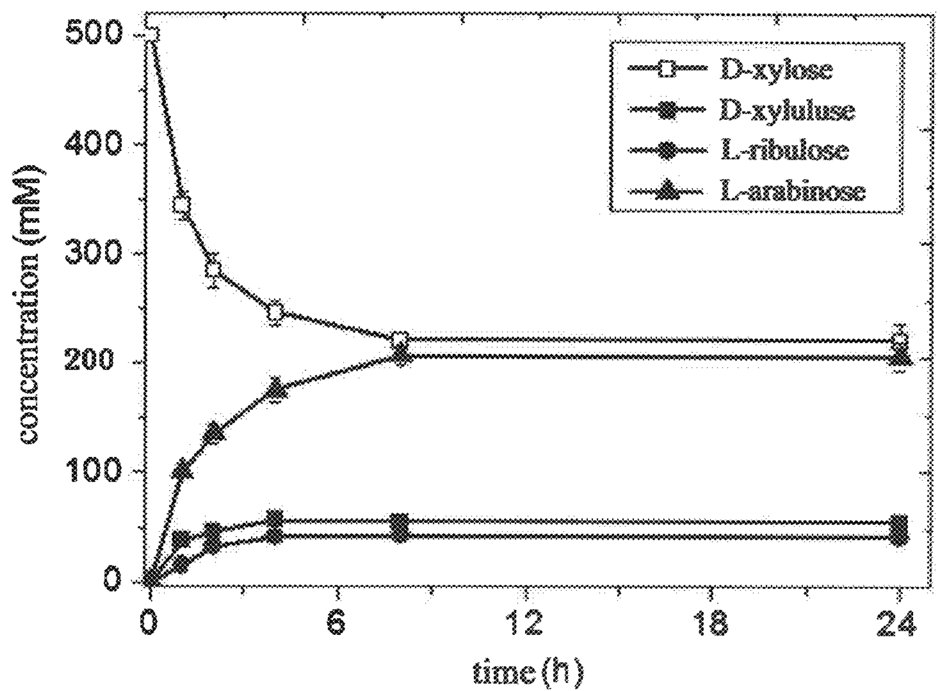
FIG. 9 shows the one-pot production of L-arabinose from 500 mM D-xylose. The reaction is carried out in 100 mM HEPES buffer (pH 8.0) containing 10 U/mL XI and 10 U/mL AI, 0.2 mM $Co^{2+}$, 1 mM $Mn^{2+}$, 10 mg/mL Xu4E M87. The reaction is carried out at 50° C. under an anoxic condition.

The three-enzyme system containing M87 produced 175 mM L-arabinose after 4 hours of reaction. Its specific volume production rate reached 6.56 g L-arabinose/liter/hour. After 8 hours of reaction, when the reaction reached equilibrium, the substrate D-xylose was 207 mM, the intermediate products D-xylulose and L-ribulose were 55 and 42 mM, respectively, and the product L-arabinose was 196 mM (FIG. 9).

Example 20 Production of L-Ribose from D-Xylose

We constructed a three-enzyme system comprising D-xylose isomerase (D-XI), Xu4E mutant M87, and phosphomannose isomerase (MPI) with 50 mM D-xylose as a substrate. mpi gene from *G. thermodenitrificans* was cloned and inserted into a pET plasmid (Kim et al. 2014). The reaction mixture was 50 mM Tris buffer (pH 8.0) comprising 0.2 mM $Co^{2+}$, 1 mM $Mn^{2+}$, 1 g/L Xu4E (M87 mutant), 1 U/mL XI and 1 U/mL MPI. After the three enzymes were mixed with the reaction solution containing the substrate, a catalytic reaction was carried out at 40° C.

After 24 hours of reaction, L-ribose was detected by HPLC, which proved that the result of this artificial route was consistent with the design.

Example 21 Production and Separation of L-Pentose

Figure 10:
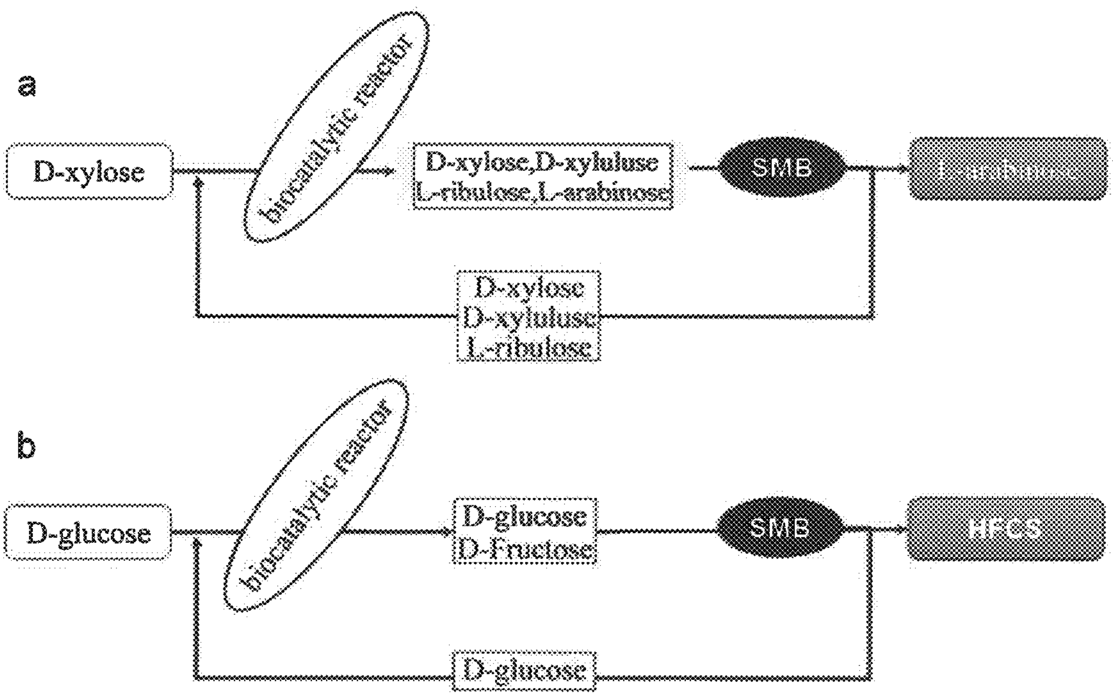
FIG. 10 shows a graph comparing (a) production of L-arabinose by bioconversion and simulated moving bed (SMB) separation with (b) production and separation of industrial high fructose corn syrup (HFCS).

Since the reactions catalyzed by epimerase and isomerase had reaction equilibrium, it was very important to effectively separate the target substrate from the enzyme and the substrate/intermediate. For example, in the production of high fructose syrup using D-glucose, D-glucose and fructose syrup were separated using simulated moving bed (SMB) to obtain high fructose-containing syrup, and the unutilized D-glucose was further recycled (FIG. 10). Immobilized xylose isomerase and immobilized microbial whole cells containing the xylose isomerase had been widely used in the industrial production of high fructose syrup (FIG. 10). Co-immobilization of multiple enzymes, not limited to purified recombinase or cell lysate containing overexpressed recombinase, prolonged the service life of enzymes, facilitated the separation of enzymes and products/intermediates, and reduced the cost of using enzymes. Besides, immobilizing the microbial whole cells containing the enzyme to improve the stability of the biocatalyst and the reusability of the biocatalyst is an optional solution. In addition, in order to increase the reaction rate, permeabilization of microbial whole cells is also an optional solution.

In this example, we used a simulated moving bed (SMB), and the filled resin was not limited to Shodex Sugar KS-801 sodium ion exchange column, Waters Sugar Pak I calcium ion exchange column, Bio-Rad Aminex HPX-87P lead ion exchange column, Bio-Rad Aminex HPX-87H hydrogen ion exchange column, or a chromatographic separation column with similar functions.

Taking the production of L-arabinose as an example, a simulated moving bed (SMB) could be used to separate L-arabinose from unused D-xylose and intermediate products L-ribulose and D-xylulose (FIG. 10).

Example 22 Characterization of Xu4E-Catalyzed Product L-Ribulose

A wild-type Xu4E and Xu4E mutant M87 were used to catalyze the reaction of the substrate D-xylulose. The wild-type Xu4E was used at 50° C. for 24 hours, and Xu4E mutant M87 was used at 50° C. for 10 minutes. The substrate D-xylulose and the product L-ribulose were separated by HPLC equipped with a Waters Sugar Pak column.

Figure 11:
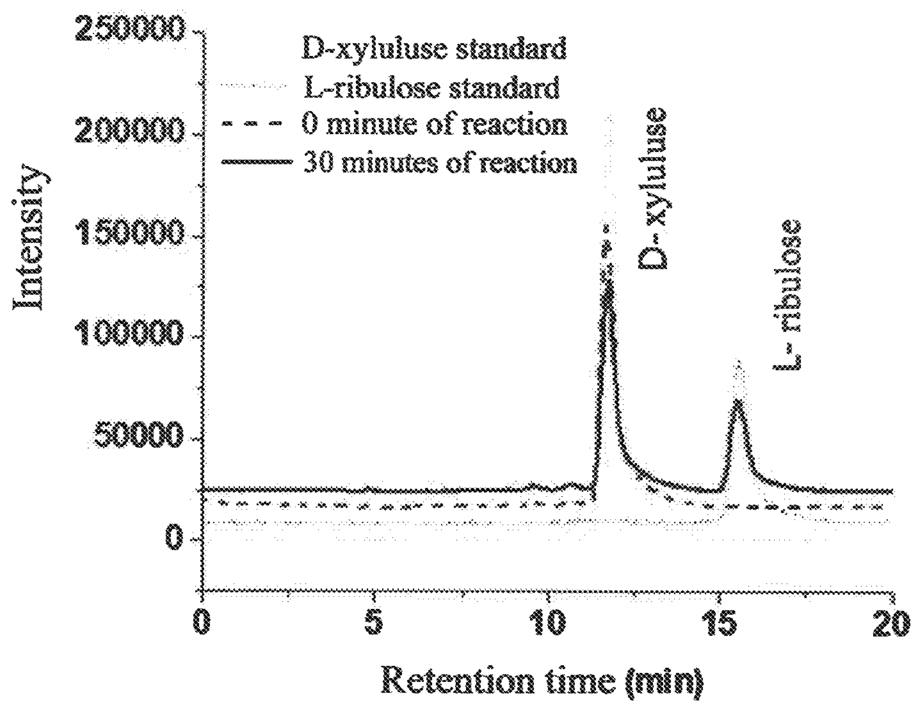
FIG. 11 shows an HPLC separation profile of Xu4E-catalyzed production of product (L-ribulose) from substrate (D-xylulose), wherein the peaks separated by HPLC are verified by primary mass spectrometry (FIG. 12) and secondary mass spectrometry (FIG. 13).
Figure 12:
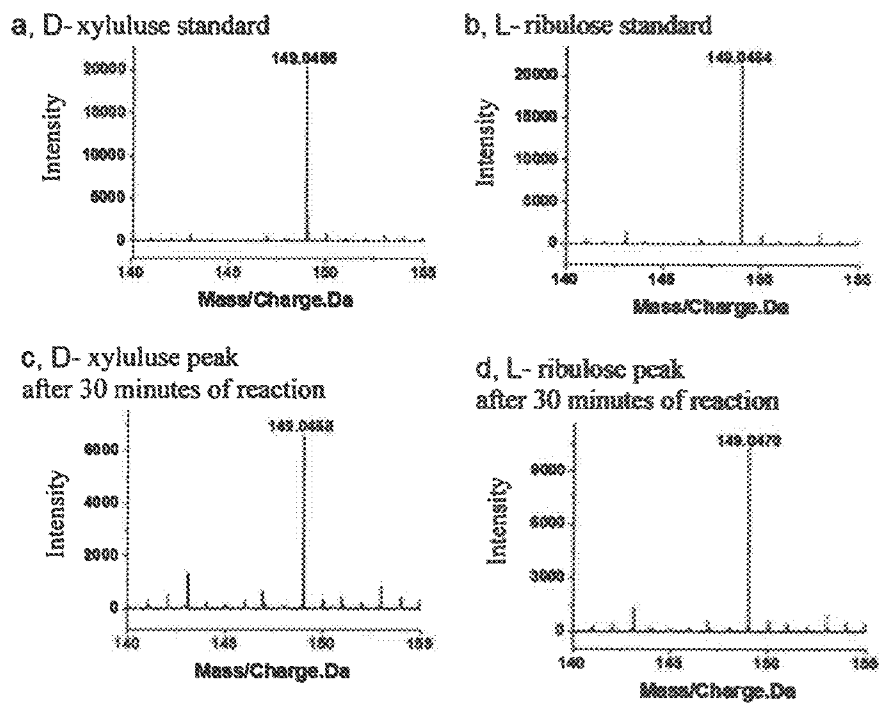
FIG. 12 are primary mass spectrograms showing peaks of HPLC separated substrate (D-xylulose) and product (L-ribulose).
Figure 13:
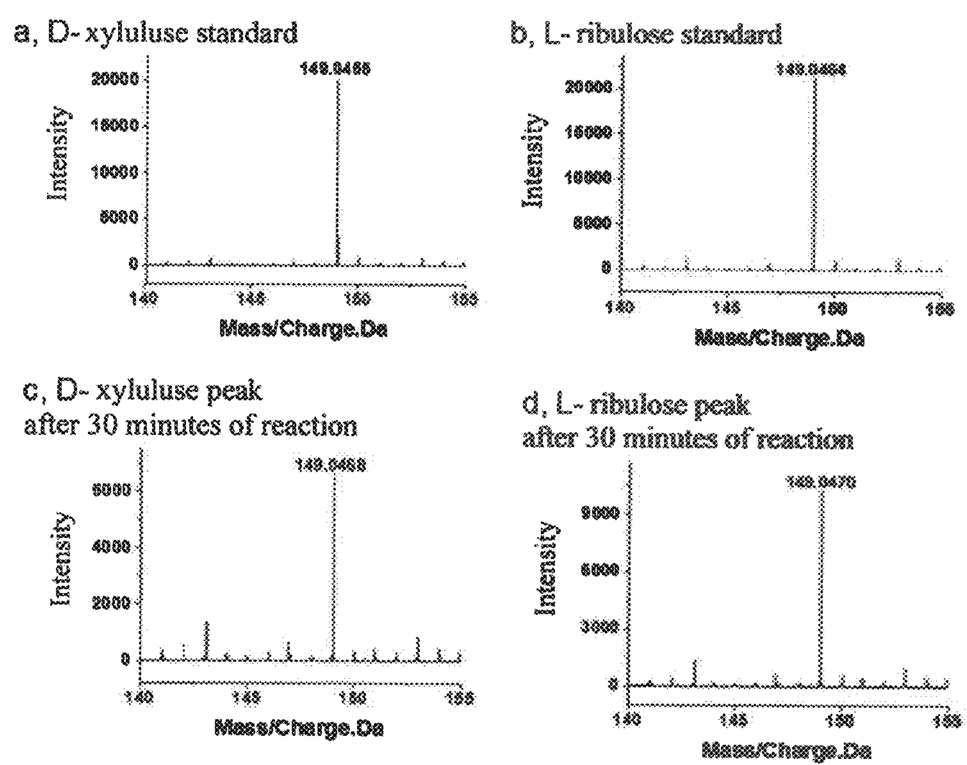
FIG. 13 are secondary mass spectrograms showing peaks of HPLC separated substrate (D-xylulose) and product (L-ribulose).

The HPLC chromatogram was shown in FIG. 11. The retention time of the product (L-ribulose) was a new peak (solid black line) at 15.49 minutes, the same as the retention time of the L-ribulose standard. The HPLC-separated product peaks were characterized by primary mass spectrometry (FIG. 12) and secondary mass spectrometry (FIG. 13) compared to the D-xylulose and L-ribulose standards.

The experimental results clearly demonstrated that the wild-type Xu4E and Xu4E mutant M87 were able to catalyze the enzymatic reaction from D-xylulose to L-ribulose.

Example 23 Functional Testing of Mutants of Wild-Type Xu4E from Different Sources Based on the method of bioinformatics, we analyzed and compared sequences of different wild-type Xu4E obtained in Example 3, Example 14 and Example 15. Among them, * indicates conserved amino acid positions of wild-type Xu4E from different sources.

Meanwhile, by the test method as described in the examples of the present disclosure, the amino acids in said different wild-type Xu4E were numbered according to the numbering when we calculated sequence identity compared to the sequence as set forth in SEQ ID NO: 2.

Figure 14A:
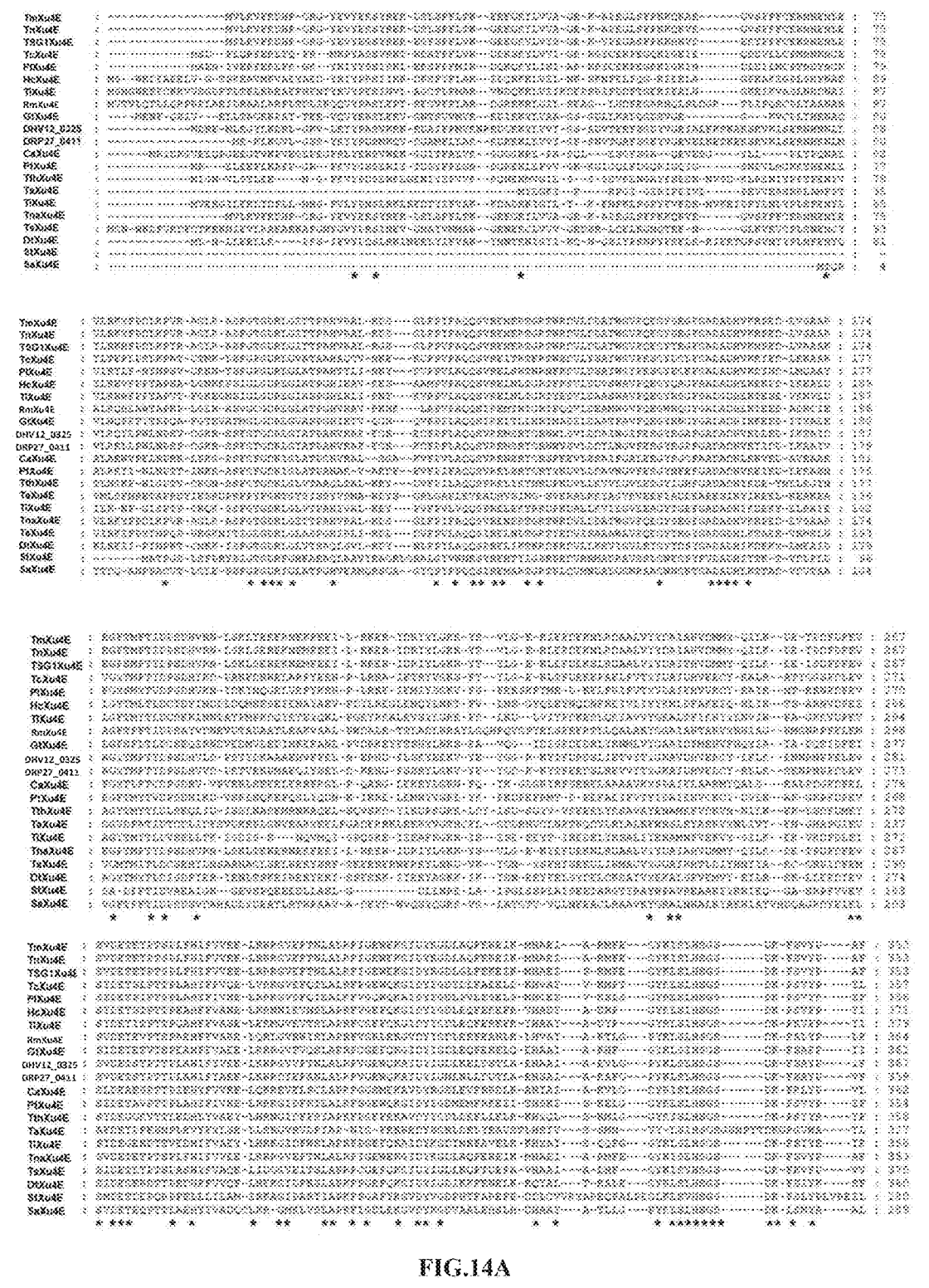
Figure 14B:
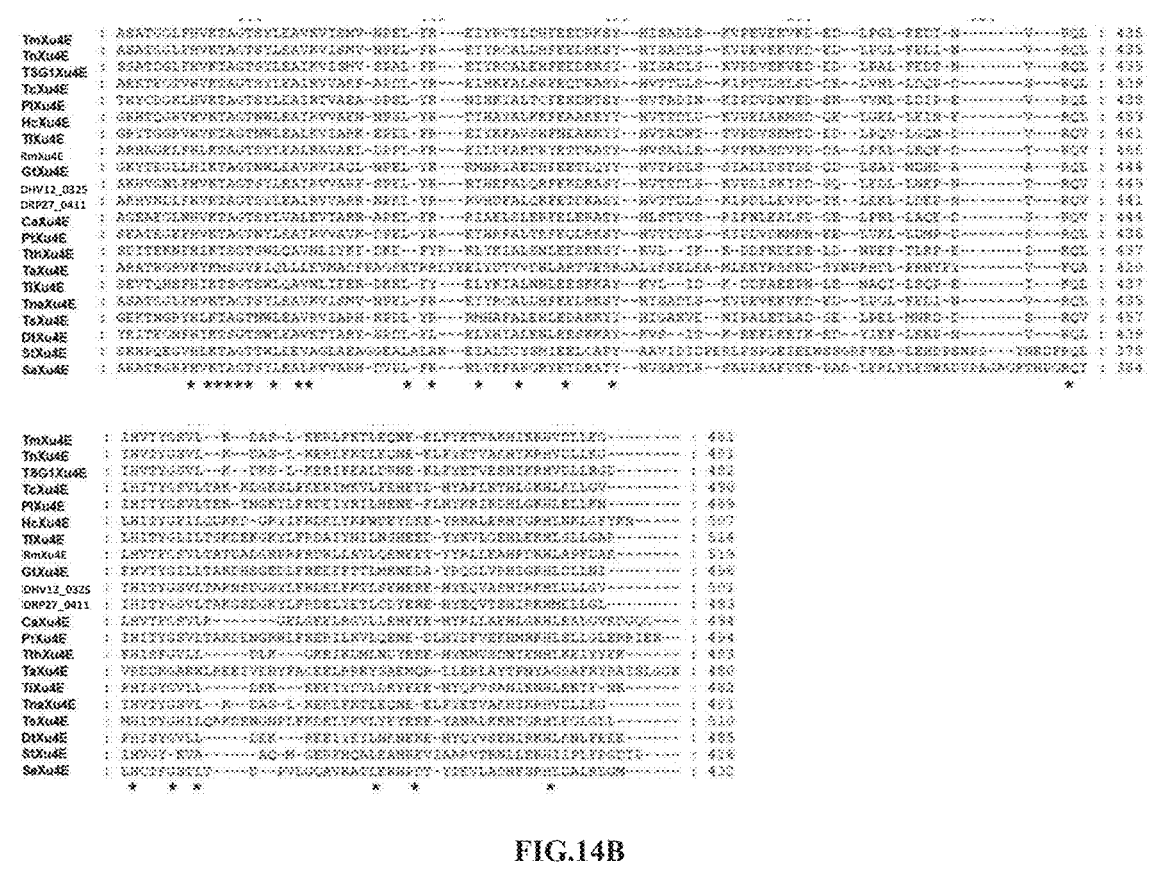

It was found that, as shown in FIG. 14A and FIG. 14B, for the different wild-type Xu4E, when numbered corresponding to the numbers as set forth in SEQ ID NO: 2, after mutation of the amino acids at the following positions corresponding to the numbers as set forth in SEQ ID NO: 2: G102, S125, R131, D161, V163, E266, V267, N297, W306, Q318, K337, D394, S402 and Y403, it still had Xu4E activity.

Example 24 Construction of Xu4E Mutants with Shortened Sequences

We truncated the encoding wild-type Xu4E and removed the amino acid sequences encoding positions 1-86 and 196-236 separately or together, and determined the biological activity of said truncated Xu4E mutant by the method described in the present disclosure.

As shown by the experimental results, the activity of the protein after the sequence truncation still maintained the activity of Xu4E, which was 90% (removal of amino acids 1-86), 87% (removal of amino acids 196-236) or 85% (removal of amino acids 1-86 and amino acids 196-236) of the enzyme activity of wild-type Xu4E.

Example 25 Statistics of Enzymes with Xu4E Activity in the Present Disclosure By the methods described in Examples 4-16 of the present disclosure, we obtained sequences of enzymes with Xu4E activity and experimental results of their enzyme activity.

The experimental results are shown in Table 3.

TABLE 3

Experimental results of enzymes with Xu4E activity in the present disclosure

| Sequence Number | Name | Mutated position 102 | 125 | 131 | 161 | 163 | 266 | 267 | 297 | 306 | 318 | 337 | 394 | 402 | 403 | Number of mutated amino acids | Relative activity |
|---|---|---|---|---|---|---|---|---|---|---|---|---|---|---|---|---|---|
| 1 | WT DNA | | | | | | | | | | | | | | | | |
| 2 | WT | | | | | | | | | | | | | | | | 100 |
| 3-22 | uxae | | | | | | | | | | | | | | | | |
| 23-32 | rp4e | | | | | | | | | | | | | | | | |
| 33 | M1 | L | | | | | | | | | | | | | | 1 | 32 |
| 34 | M2 | | C | | | | | | | | | | | | | 1 | 148 |
| 35 | M3 | | Y | | | | | | | | | | | | | 1 | 136 |
| 36 | M4 | | D | | | | | | | | | | | | | 1 | 125 |

TABLE 3-continued

| Experimental results of enzymes with Xu4E activity in the present disclosure | | | | | | | | | | | | | | | | | |
|---|---|---|---|---|---|---|---|---|---|---|---|---|---|---|---|---|---|
| Sequence | | Mutated position | | | | | | | | | | | | | | Number of mutated | Relative |
| Number | Name | 102 | 125 | 131 | 161 | 163 | 266 | 267 | 297 | 306 | 318 | 337 | 394 | 402 | 403 | amino acids | activity |
| 37 | M5 | | Q | | | | | | | | | | | | | 1 | 112 |
| 38 | M6 | | E | | | | | | | | | | | | | 1 | 120 |
| 39 | M7 | | T | | | | | | | | | | | | | 1 | 105 |
| 40 | M8 | | N | | | | | | | | | | | | | 1 | 110 |
| 41 | M9 | | | T | | | | | | | | | | | | 1 | 125 |
| 42 | M10 | | | D | | | | | | | | | | | | 1 | 120 |
| 43 | M11 | | | E | | | | | | | | | | | | 1 | 95 |
| 44 | M12 | | | S | | | | | | | | | | | | 1 | 87 |
| 45 | M13 | | | | A | | | | | | | | | | | 1 | 4 |
| 45 | M14 | | | | | K | | | | | | | | | | 1 | 117 |
| 47 | M15 | | | | | R | | | | | | | | | | 1 | 128 |
| 48 | M16 | | | | | S | | | | | | | | | | 1 | 105 |
| 49 | M17 | | | | | I | | | | | | | | | | 1 | 132 |
| 50 | M18 | | | | | M | | | | | | | | | | 1 | 110 |
| 51 | M19 | | | | | | A | | | | | | | | | 1 | 8 |
| 52 | M20 | | | | | | | I | | | | | | | | 1 | 148 |
| 53 | M21 | | | | | | | L | | | | | | | | 1 | 152 |
| 54 | M22 | | | | | | | M | | | | | | | | 1 | 165 |
| 55 | M23 | | | | | | | | F | | | | | | | 1 | 157 |
| 56 | M24 | | | | | | | | Y | | | | | | | 1 | 120 |
| 57 | M25 | | | | | | | | K | | | | | | | 1 | 165 |
| 58 | M26 | | | | | | | | | S | | | | | | 1 | 147 |
| 59 | M27 | | | | | | | | | M | | | | | | 1 | 137 |
| 60 | M28 | | | | | | | | | T | | | | | | 1 | 105 |
| 61 | M29 | | | | | | | | | | K | | | | | 1 | 109 |
| 62 | M30 | | | | | | | | | | | D | | | | 1 | 64 |
| 63 | M31 | | | | | | | | | | | | M | | | 1 | 40 |
| 64 | M32 | | | | | | | | | | | | | L | | 1 | 135 |
| 65 | M33 | | | | | | | | | | | | | V | | 1 | 122 |
| 66 | M34 | | | | | | | | | | | | | F | | 1 | 102 |
| 67 | M35 | | | | | | | | | | | | | C | | 1 | 105 |
| 68 | M36 | | | | | | | | | | | | | Y | | 1 | 108 |
| 69 | M37 | | | | | | | | | | | | | | T | 1 | 155 |
| 70 | M38 | | | | | | | | | | | | | | I | 1 | 130 |
| 71 | M39 | | | | | | | | | | | | | | W | 1 | 147 |
| 72 | M40 | | | | | | | | | | | | | | F | 1 | 123 |
| 73 | M41 | | | | | | | I | F | | | | | | | 2 | 468 |
| 74 | M42 | | | | | | | I | K | | | | | | | 2 | 520 |
| 75 | M43 | | | | | | | L | F | | | | | | | 2 | 555 |
| 76 | M44 | | | | | | | M | K | | | | | | | 2 | 600 |
| 77 | M45 | | | | | | | | | S | | | | | T | 2 | 340 |
| 78 | M46 | | | | | | | | | M | | | | | W | 2 | 266 |
| 79 | M47 | | D | | | | | | F | | | | | | | 2 | 188 |
| 80 | M48 | | C | | | | | | K | | | | | | | 2 | 156 |
| 81 | M49 | | Y | | | | | | F | | | | | | | 2 | 210 |
| 82 | M50 | | | | | K | | I | | | | | | | W | 3 | 338 |
| 83 | M51 | | | | | I | | I | | | | | | | W | 3 | 335 |
| 84 | M52 | | | | | K | | L | | | | | | | T | 3 | 321 |
| 85 | M53 | | | | | K | | L | | | | | | | F | 3 | 311 |
| 86 | M54 | | C | | | | | I | K | | | | | | | 3 | 237 |
| 87 | M55 | | C | | | | | L | K | | | | | | | 3 | 310 |
| 88 | M56 | | D | | | | | L | Y | | | | | | | 3 | 245 |
| 89 | M57 | | D | | | | | I | F | | | | | | | 3 | 238 |
| 90 | M58 | | | | | K | | I | F | | | | | | W | 4 | 438 |
| 91 | M59 | | | | | I | | L | Y | | | | | | W | 4 | 375 |
| 92 | M60 | | | | | I | | M | K | | | | | | T | 4 | 475 |
| 93 | M61 | | D | | | K | | I | F | | | | | | | 4 | 288 |
| 94 | M62 | | E | | | I | | L | F | | | | | | | 4 | 251 |
| 95 | M63 | | C | | | K | | I | Y | | | | | | | 4 | 311 |
| 96 | M64 | | D | | | K | | I | F | | | | | | W | 5 | 488 |
| 97 | M65 | | D | | | K | | I | Y | | | | | | W | 5 | 512 |
| 98 | M66 | | E | | | K | | I | Y | | | | | | T | 5 | 476 |
| 99 | M67 | | D | | | K | | L | F | | | | | | W | 5 | 523 |
| 100 | M68 | | | | | K | | I | F | M | | | | V | W | 6 | 525 |
| 101 | M69 | | | | | K | | L | Y | M | | | | V | W | 6 | 475 |
| 102 | M70 | | | | | K | | I | F | M | | | | V | T | 6 | 563 |
| 103 | M71 | | | | | K | | L | F | S | | | | L | T | 6 | 578 |
| 104 | M72 | | D | | | K | | I | F | | | | | V | W | 6 | 1038 |
| 105 | M73 | | E | | | R | | L | F | | | | | L | W | 6 | 1024 |
| 106 | M74 | | Y | | | R | | M | K | | | | | F | F | 6 | 1123 |
| 107 | M75 | | D | | | K | | I | F | M | | | | V | W | 7 | 1300 |
| 108 | M76 | | E | | | K | | I | F | M | | | | V | W | 7 | 1125 |
| 109 | M77 | | E | | | K | | M | Y | S | | | | F | T | 7 | 1427 |
| 110 | M78 | | | S | | K | | I | F | M | | | | V | W | 7 | 1025 |

TABLE 3-continued

| Experimental results of enzymes with Xu4E activity in the present disclosure | | | | | | | | | | | | | | | | | |
|---|---|---|---|---|---|---|---|---|---|---|---|---|---|---|---|---|---|
| Sequence | | Mutated position | | | | | | | | | | | | | | Number of mutated | Relative |
| Number | Name | 102 | 125 | 131 | 161 | 163 | 266 | 267 | 297 | 306 | 318 | 337 | 394 | 402 | 403 | amino acids | activity |
| 111 | M79 | | D | | | K | | I | F | M | K | | | V | W | 8 | 1700 |
| 112 | M80 | | E | D | | K | | M | Y | S | | | | F | T | 8 | 1665 |
| 113 | M81 | | E | S | | K | | M | F | M | K | | | V | W | 9 | 2472 |
| 114 | M82 | | E | S | | K | | I | F | M | K | | | V | W | 9 | 2300 |
| 115 | M83 | | D | T | | K | | I | F | M | K | | | C | W | 9 | 2800 |
| 116 | M84 | | D | S | | K | | M | F | M | K | | | V | W | 9 | 3100 |
| 117 | M85 | | Y | S | | K | | L | Y | T | K | | | L | T | 9 | 2400 |
| 118 | M86 | | E | D | | R | | I | K | S | K | | | Y | I | 9 | 2750 |
| 119 | M87 | | D | S | | K | | I | F | M | K | | | V | W | 9 | 2600 |
| 120 | M88 | Amino acid sequence 1-86 was truncated, and 87-481 was retained. | | | | | | | | | | | | | | | |
| 121 | M89 | Amino acid sequence 196-236 was truncated, 1-195 and 237-481 were fused and expressed. | | | | | | | | | | | | | | | |
| 122 | M90 | Amino acid sequences 1-86 and 196-236 were truncated, and 87-195 and 237-481 were fused and expressed. | | | | | | | | | | | | | | | |

All of the technical features disclosed in this specification can be combined in any combination. Each feature disclosed in this specification may also be replaced by another feature having the same, equivalent or similar function. Therefore, unless stated otherwise, each feature disclosed is only examples of a series of equivalent or similar features.

Furthermore, from the above description, persons skilled in the art can readily appreciate the key features of the present disclosure, and can make many modifications to the invention to adapt it for various purposes and conditions of use without departing from the spirit and scope of the present disclosure, so such modifications are intended to fall within the scope of the appended claims.

What is claimed is:

1. A polypeptide having D-xylulose 4-epimerase activity, wherein the polypeptide comprises the amino acid sequence of SEQ ID NO: 113, 115, 116, 118 or 119.

2. An isolated polynucleotide, wherein the polynucleotide comprises a nucleotide sequence encoding the polypeptide according to claim 1.

3. A method for producing a polypeptide, wherein the method comprises:

culturing an isolated cell that produces the polypeptide under conditions sufficient for the cell to produce the polypeptide; wherein the cell comprises the polynucleotide according to claim 2.

4. A method for converting D-xylulose to L-ribulose, wherein the method comprises performing a catalytic reaction using the polypeptide according to claim 1.

5. A method for preparing L-pentose, wherein the method comprises:

converting D-xylulose to L-ribulose using a D-xylulose 4-epimerase, wherein the D-xylulose 4-epimerase is the polypeptide according to claim 1.

6. The method according to claim 5, wherein the method further comprises:

(i) converting L-ribulose to L-arabinose using a L-arabinose isomerase, wherein the L-pentose is L-arabinose;

(ii) converting L-ribulose to L-ribose using a L-ribose isomerase, a mannose 6-phosphate isomerase, or a combination thereof, wherein the L-pentose is L-ribose;

(iii) converting L-ribulose to L-xylulose using a L-ribulose 3-epimerase, wherein the L-pentose is L-xylulose;

(iv) converting L-ribulose to L-xylulose using a L-ribulose 3-epimerase, and converting L-xylulose to L-xylose using a L-fucose isomerase, a D-arabinose isomerase, or a L-rhamnose isomerase, wherein the L-pentose is L-xylose; or (v) converting L-ribulose to L-xylulose using a L-ribulose 3-epimerase and converting L-xylulose to L-lyxose using a L-rhamnose isomerase, wherein the L-pentose is L-lyxose.

7. The method according to claim 5, wherein the reaction system of the method comprises an enzyme reaction solution.

8. The method according to claim 5, wherein the method is carried out under an aerobic, microaerobic or anaerobic condition.

9. The method according to claim 5, wherein the method is carried out under an anaerobic condition of a temperature of 45 to 55° C., pH of 8.0, and a metal ion of $Co^{2+}$, $Mg^{2+}$, $Mn^{2+}$, or a combination thereof.

10. The method according to claim 5, wherein the method comprises an in vitro catalytic reaction or a whole cell biocatalytic reaction.

11. The method according to claim 10, wherein the enzyme in the in vitro catalytic reaction exists in one or more forms of free enzyme, cell lysate containing the enzyme, whole cells containing the enzyme, and immobilized enzyme.

12. The polypeptide of claim 1, wherein the polypeptide comprises the amino acid sequence of SEQ ID NO: 113.

13. The polypeptide of claim 1, wherein the polypeptide comprises the amino acid sequence of SEQ ID NO: 115.

14. The polypeptide of claim 1, wherein the polypeptide comprises the amino acid sequence of SEQ ID NO: 116.

15. The polypeptide of claim 1, wherein the polypeptide comprises the amino acid sequence of SEQ ID NO: 118.

16. The polypeptide of claim 1, wherein the polypeptide comprises the amino acid sequence of SEQ ID NO: 119.

17. A recombinant expression vector expressing the polypeptide according to claim 1.

18. An isolated recombinant host cell expressing the polypeptide according to claim 1.

* * * * *